United States Patent
Yeakley et al.

(10) Patent No.: US 9,740,905 B2
(45) Date of Patent: *Aug. 22, 2017

(54) DATA COLLECTION SYSTEM HAVING RECONFIGURABLE DATA COLLECTION TERMINAL

(71) Applicant: Hand Held Products, Inc., Fort Mill, SC (US)

(72) Inventors: Daniel D. Yeakley, Monroe, NC (US); Aldo Mario Caballero, Durham, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,145

(22) Filed: Feb. 5, 2016

(65) Prior Publication Data

US 2016/0154986 A1   Jun. 2, 2016

Related U.S. Application Data

(60) Continuation of application No. 14/499,303, filed on Sep. 29, 2014, now Pat. No. 9,256,772, which is a
(Continued)

(51) Int. Cl.
*G06K 7/10* (2006.01)
*G06F 17/22* (2006.01)
(Continued)

(52) U.S. Cl.
CPC ..... *G06K 7/10881* (2013.01); *G06F 3/04842* (2013.01); *G06F 17/227* (2013.01);
(Continued)

(58) Field of Classification Search
CPC ............ G06K 7/0008; G06K 19/0723; G06K 2207/1017; G06K 7/10227; G06K 7/1095;
(Continued)

(56) References Cited

U.S. PATENT DOCUMENTS 4,091,270 A   5/1978   Musch et al.
4,654,514 A   3/1987   Watson et al.
(Continued)

FOREIGN PATENT DOCUMENTS

JP   2002366883 A   12/2002
WO   2004092853 A2   10/2004

OTHER PUBLICATIONS

Wavelink Corporation, Wavelink TelnetCE Client User's Guide, wltn-wince-20050805-03, Revised Aug. 5, 2005, 258 pgs. Previously provided in Parent Application.
(Continued)

*Primary Examiner* — Thien M Le
(74) *Attorney, Agent, or Firm* — Additon, Higgins & Pendleton, P.A

(57) ABSTRACT

There is provided in one embodiment a data collection system including a data collection terminal having an encoded information reader device and a computer spaced apart from the data collection terminal. The data collection terminal in one embodiment can be configured to be responsive to configuration data expressed in an extensible markup language.

20 Claims, 40 Drawing Sheets

Related U.S. Application Data continuation of application No. 13/098,711, filed on May 2, 2011, now Pat. No. 8,851,383, which is a division of application No. 11/582,151, filed on Oct. 17, 2006, now Pat. No. 7,934,660.

(60) Provisional application No. 60/757,217, filed on Jan. 5, 2006.

(51) Int. Cl.
   *G06F 3/0484* (2013.01)
   *G06F 17/30* (2006.01)
(52) U.S. Cl.
   CPC .... *G06F 17/2247* (2013.01); *G06F 17/30153* (2013.01); *G06F 17/30911* (2013.01); *G06K 7/1095* (2013.01); *G06K 7/10227* (2013.01); *G06K 7/10237* (2013.01)
(58) Field of Classification Search
   CPC ... G07G 1/009; H04L 67/18; H04L 29/12066; H04L 29/12216; H04L 29/12801; H04L 29/12924; H04L 41/0806; H04L 41/0843
   USPC ........................................ 235/472.01–472.03
   See application file for complete search history.

(56) References Cited

U.S. PATENT DOCUMENTS

| | | | |
|---|---|---|---|
| 4,721,849 A | 1/1988 | Davis et al. |
| 4,761,544 A | 8/1988 | Poland |
| 4,774,715 A | 9/1988 | Messenger |
| 4,825,058 A | 4/1989 | Poland |
| 4,841,132 A | 6/1989 | Kajitani et al. |
| 4,864,302 A | 9/1989 | Bowers |
| 4,868,375 A | 9/1989 | Blanford |
| 4,945,216 A | 7/1990 | Tanabe et al. |
| 4,964,167 A | 10/1990 | Kunizawa et al. |
| 5,046,066 A | 9/1991 | Messenger |
| 5,101,406 A | 3/1992 | Messenger |
| 5,120,943 A | 6/1992 | Benz |
| 5,185,514 A | 2/1993 | Wike, Jr. et al. |
| 5,206,881 A | 4/1993 | Messenger et al. |
| 5,208,449 A | 5/1993 | Eastman et al. |
| 5,256,865 A | 10/1993 | Wike, Jr. et al. |
| 5,317,136 A | 5/1994 | Hasegawa et al. |
| 5,347,113 A | 9/1994 | Reddersen et al. |
| 5,389,917 A | 2/1995 | La Manna et al. |
| 5,488,223 A | 1/1996 | Austin et al. |
| 5,510,606 A | 4/1996 | Worthington et al. |
| 5,532,692 A | 7/1996 | Tatsuya |
| 5,557,095 A | 9/1996 | Clark et al. |
| 5,579,487 A | 11/1996 | Meyerson et al. |
| 5,602,377 A | 2/1997 | Beller et al. |
| 5,610,595 A | 3/1997 | Garrabrant et al. |
| 5,640,684 A | 6/1997 | Konosu et al. |
| 5,644,601 A | 7/1997 | Kawaguchi |
| 5,646,389 A | 7/1997 | Bravman et al. |
| 5,668,803 A | 9/1997 | Tymes et al. |
| 5,744,788 A | 4/1998 | Metlitsky et al. |
| 5,748,904 A | 5/1998 | Huang et al. |
| 5,754,587 A | 5/1998 | Kawaguchi |
| 5,764,774 A | 6/1998 | Liu |
| 5,777,315 A | 7/1998 | Wilz et al. |
| 5,793,903 A | 8/1998 | Lopresti et al. |
| 5,794,145 A | 8/1998 | Milan |
| 5,802,179 A | 9/1998 | Yamamoto |
| 5,804,802 A | 9/1998 | Card et al. |
| 5,805,779 A | 9/1998 | Christopher et al. |
| 5,815,811 A | 9/1998 | Pinard et al. |
| 5,818,032 A | 10/1998 | Sun et al. |
| 5,837,986 A | 11/1998 | Barile et al. |
| 5,838,720 A | 11/1998 | Morelli |
| 5,848,064 A | 12/1998 | Cowan |
| 5,859,970 A | 1/1999 | Pleso |
| 5,869,819 A | 2/1999 | Knowles et al. |
| 5,905,251 A | 5/1999 | Knowles |
| 5,912,921 A | 6/1999 | Warren et al. |
| 5,924,040 A | 7/1999 | Trompower |
| 5,945,660 A | 8/1999 | Nakasuji et al. |
| 5,946,344 A | 8/1999 | Warren et al. |
| 5,965,863 A | 10/1999 | Parker et al. |
| 5,973,681 A | 10/1999 | Tanigawa et al. |
| 5,992,752 A | 11/1999 | Wilz, Sr. et al. |
| 6,026,397 A | 2/2000 | Sheppard |
| 6,027,024 A | 2/2000 | Knowles |
| 6,045,048 A | 4/2000 | Wilz, Sr. et al. |
| 6,068,188 A | 5/2000 | Knowles |
| 6,072,401 A | 6/2000 | Kumar |
| 6,119,944 A | 9/2000 | Mulla et al. |
| 6,147,767 A | 11/2000 | Petteruti et al. |
| 6,176,427 B1 | 1/2001 | Antognini et al. |
| 6,178,426 B1 | 1/2001 | Klein et al. |
| 6,182,897 B1 | 2/2001 | Knowles et al. |
| 6,199,044 B1 | 3/2001 | Ackley et al. |
| 6,208,980 B1 | 3/2001 | Kara |
| 6,321,989 B1 | 11/2001 | Wilz, Sr. et al. |
| 6,321,991 B1 | 11/2001 | Knowles |
| 6,321,992 B1 | 11/2001 | Knowles et al. |
| 6,343,101 B1 | 1/2002 | Dong et al. |
| 6,345,764 B1 | 2/2002 | Knowles |
| 6,347,743 B2 | 2/2002 | Wilz, Sr. et al. |
| 6,384,744 B1 | 5/2002 | Philyaw et al. |
| 6,386,453 B1 | 5/2002 | Russell et al. |
| 6,389,010 B1 | 5/2002 | Kubler et al. |
| 6,412,699 B1 | 7/2002 | Russell et al. |
| 6,507,856 B1 | 1/2003 | Chen et al. |
| 6,507,864 B1 | 1/2003 | Klein et al. |
| 6,525,835 B1 | 2/2003 | Gulati |
| 6,529,146 B1 | 3/2003 | Kowalski et al. |
| 6,535,493 B1 | 3/2003 | Lee et al. |
| 6,539,360 B1 | 3/2003 | Kadaba |
| 6,539,422 B1 | 3/2003 | Hunt et al. |
| 6,540,140 B1 | 4/2003 | Knowles et al. |
| 6,540,142 B1 | 4/2003 | Alleshouse |
| 6,568,596 B1 | 5/2003 | Shaw |
| 6,622,919 B1 | 9/2003 | Wilz et al. |
| 6,655,593 B2 | 12/2003 | Alleshouse |
| 6,677,852 B1 | 1/2004 | Landt |
| 6,697,805 B1 | 2/2004 | Choquier et al. |
| 6,747,692 B2 | 6/2004 | Patel et al. |
| 6,758,403 B1 | 7/2004 | Keys et al. |
| 6,764,009 B2 | 7/2004 | Melick et al. |
| 6,764,011 B2 | 7/2004 | Entani |
| 6,772,947 B2 | 8/2004 | Shaw |
| 6,776,342 B1 | 8/2004 | Thuries et al. |
| 6,823,388 B1 | 11/2004 | Philyaw et al. |
| 6,873,435 B1 | 3/2005 | Tehranchi et al. |
| 6,902,114 B2 | 6/2005 | Hashimoto et al. |
| 6,908,034 B2 | 6/2005 | Alleshouse |
| 6,942,150 B2 | 9/2005 | Knowles |
| 6,976,062 B1 | 12/2005 | Denby et al. |
| 6,987,927 B1 | 1/2006 | Barraglia et al. |
| 7,026,935 B2 * | 4/2006 | Diorio ................ G06K 19/0723 340/572.1 |
| 7,054,881 B2 | 5/2006 | Arcand et al. |
| 7,075,676 B2 | 7/2006 | Owen |
| 7,114,021 B2 | 9/2006 | Seshadri |
| 7,159,214 B2 | 1/2007 | Rajaram et al. |
| 7,227,998 B2 | 6/2007 | Nakayama et al. |
| 7,263,699 B2 | 8/2007 | Jacquemot et al. |
| 7,317,394 B2 | 1/2008 | Koh et al. |
| 7,353,995 B2 | 4/2008 | Strickland |
| 7,450,012 B2 * | 11/2008 | Harmon ............... G06K 7/0008 235/375 |
| 7,461,384 B2 | 12/2008 | Herrod et al. |
| 7,567,179 B2 | 7/2009 | Stephensen et al. |
| 7,568,628 B2 | 8/2009 | Wang et al. |
| 7,648,070 B2 | 1/2010 | Droms et al. |
| 7,780,089 B2 | 8/2010 | Wang |
| 7,934,660 B2 | 5/2011 | Yeakley et al. |
| 8,408,255 B1 | 4/2013 | Wade et al. |
| 8,851,383 B2 | 10/2014 | Yeakley et al. |
| 9,256,772 B2 | 2/2016 | Yeakley et al. |

(56) References Cited

U.S. PATENT DOCUMENTS

| | | |
|---|---|---|
| 2002/0150245 A1 | 10/2002 | Sugimoto et al. |
| 2002/0171745 A1 | 11/2002 | Ehrhart |
| 2002/0185540 A1 | 12/2002 | Hashimoto et al. |
| 2003/0042311 A1 | 3/2003 | Longacre et al. |
| 2003/0132292 A1 | 7/2003 | Gomez et al. |
| 2004/0002943 A1 | 1/2004 | Merrill et al. |
| 2004/0194081 A1 | 9/2004 | Qumei et al. |
| 2004/0212493 A1* | 10/2004 | Stilp .............. G06K 7/0008 340/531 |
| 2005/0005102 A1 | 1/2005 | Meggitt et al. |
| 2005/0036034 A1* | 2/2005 | Rea .............. H04N 1/00281 348/207.1 |
| 2005/0039092 A1 | 2/2005 | Soule et al. |
| 2005/0099269 A1 | 5/2005 | Diorio et al. |
| 2005/0253722 A1 | 11/2005 | Droms et al. |
| 2005/0269407 A1 | 12/2005 | Harmon |
| 2006/0006231 A1 | 1/2006 | Anson et al. |
| 2006/0161878 A1 | 7/2006 | Koh et al. |
| 2006/0163338 A1 | 7/2006 | Allen et al. |
| 2006/0202038 A1 | 9/2006 | Wang et al. |
| 2006/0248524 A1 | 11/2006 | Seely |
| 2007/0063049 A1 | 3/2007 | Anson et al. |
| 2007/0099623 A1* | 5/2007 | Stephensen .......... H04W 4/02 455/446 |
| 2007/0112574 A1 | 5/2007 | Greene |
| 2007/0152058 A1 | 7/2007 | Yeakley et al. |
| 2007/0241195 A1 | 10/2007 | Hussey et al. |
| 2007/0273517 A1 | 11/2007 | Govind |
| 2007/0284443 A1 | 12/2007 | Anson et al. |
| 2007/0295799 A1 | 12/2007 | Chibel et al. |
| 2008/0041930 A1 | 2/2008 | Smith et al. |
| 2008/0266095 A1 | 10/2008 | Hanebeck |
| 2008/0266096 A1 | 10/2008 | Hanebeck |
| 2009/0172384 A1* | 7/2009 | Anson ............ G06F 9/44505 713/2 |
| 2010/0090007 A1 | 4/2010 | Wang et al. |
| 2012/0194320 A1* | 8/2012 | Yeakley ........... G06F 17/2247 340/10.1 |

OTHER PUBLICATIONS

International Search Report, International application No. PCT/US2007/000365, 4 pages, Apr. 29, 2008. Previously provided in Parent Application.

Written Opinion of the International Searching Authority, International application No. PCT/US2007/000365, 11 pages, Apr. 29, 2008. Previously provided in Parent Application.

Hand Held Products, Screen shots produced using Quick Load for Windows, Program was publicly used more than one year prior to the earliest priority date of Jul. 3, 2003, 7 pgs. Previously provided in Parent Application.

Hand Held Products, Screen shots produced using Quick Load for DOS, Program was publicly used more than one year prior to the earliest priority date of Jul. 3, 2003, 5 pgs. Previously provided in Parent Application.

Hand Held Products, Dolphin.TM. 7200 Handheld Computer and HomeBase.TM. User's Guide, 7200/UG Rev. D, Document was published more than one year prior to the earliest priority date of Jul. 3, 2003, 168 pgs. Previously provided in Parent Application.

* cited by examiner

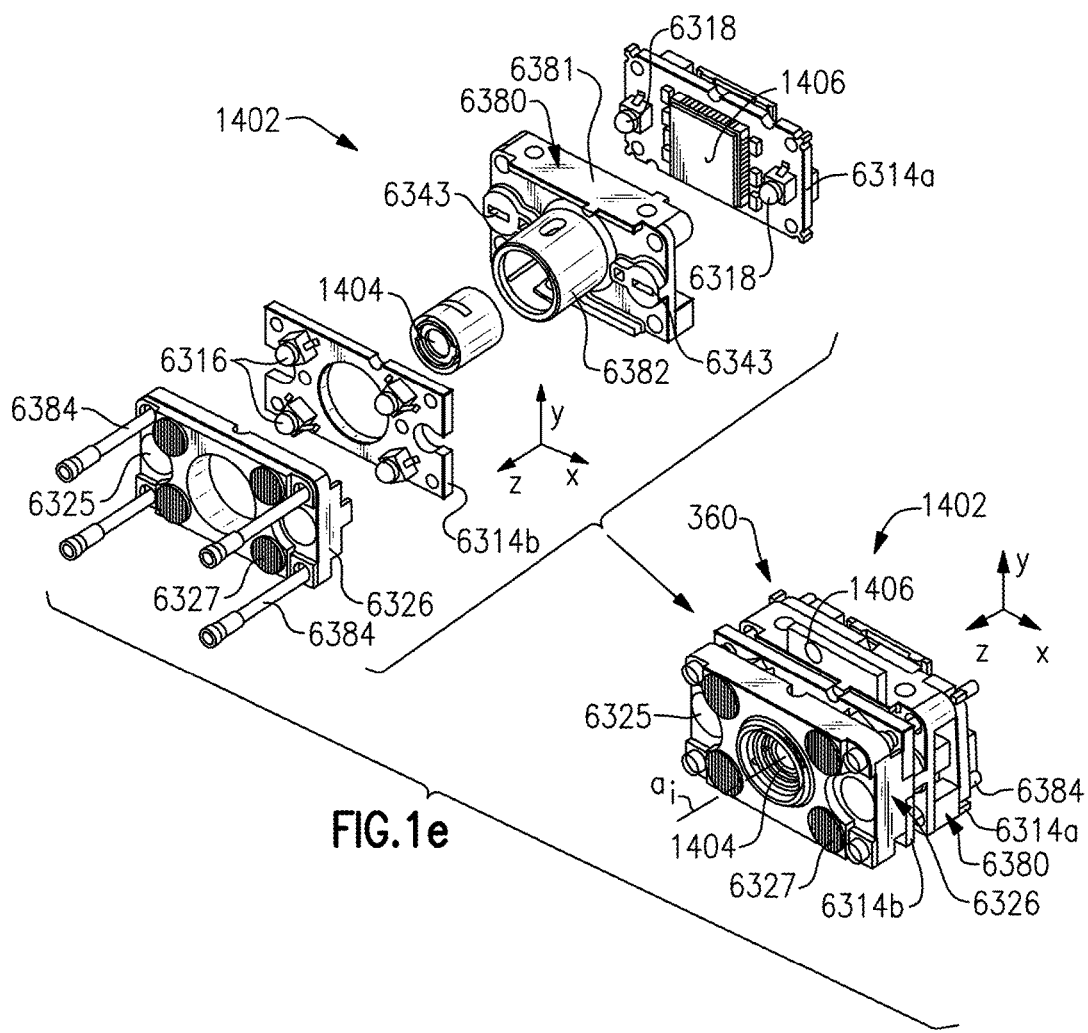
FIG.1e
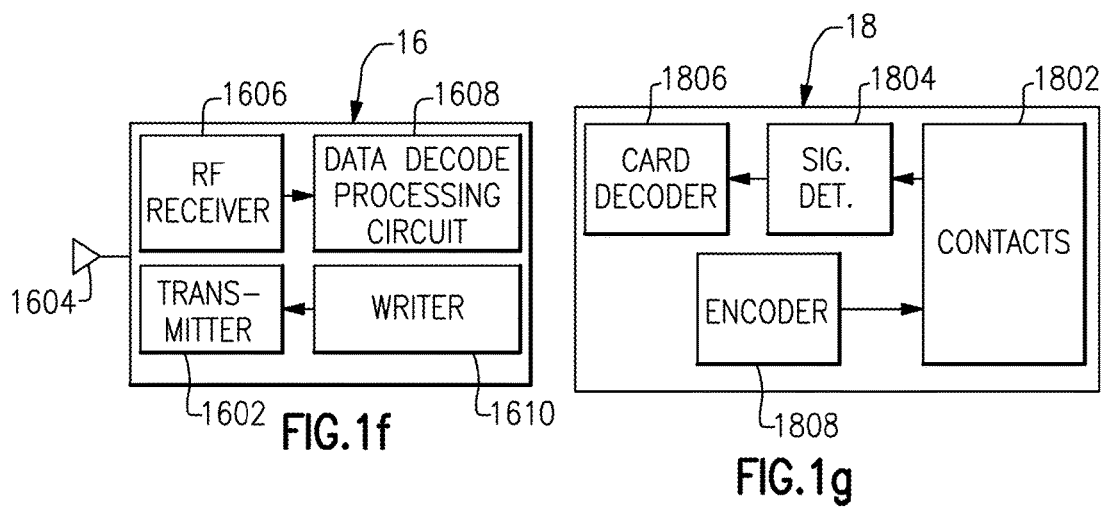
FIG.1f
FIG.1g

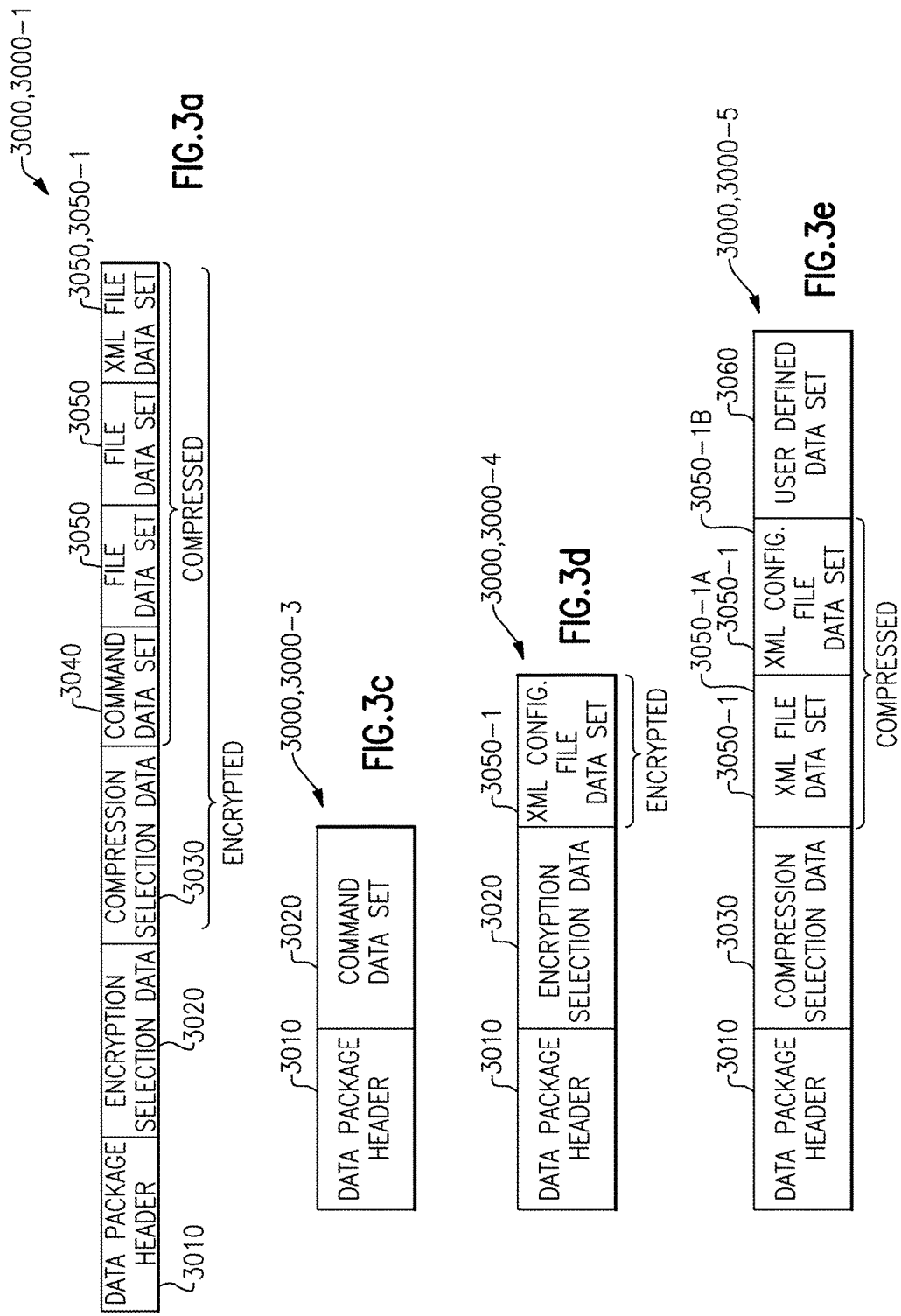

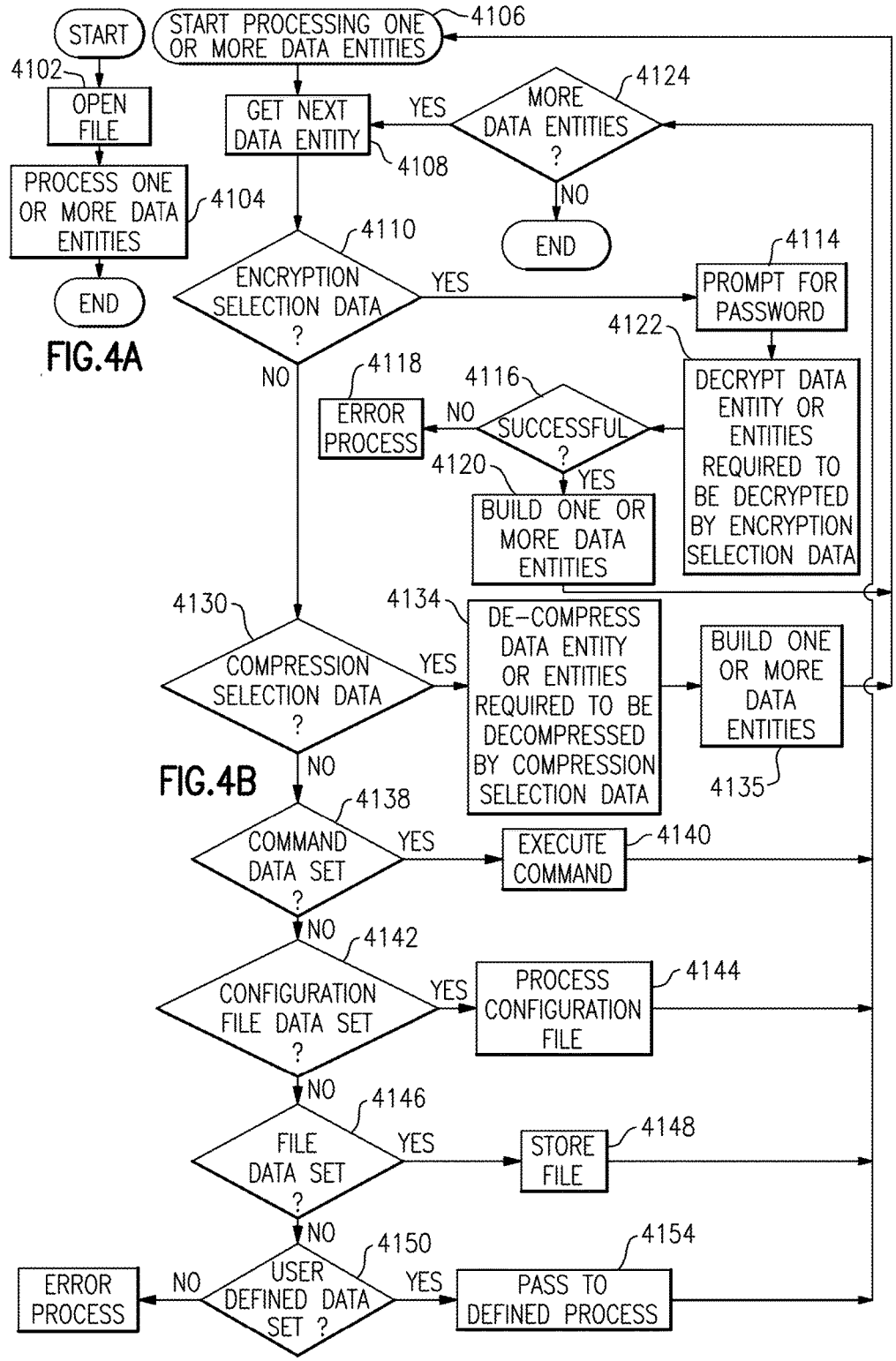

DATA COLLECTION SYSTEM HAVING RECONFIGURABLE DATA COLLECTION TERMINAL

CROSS-REFERENCE TO RELATED APPLICATIONS

The present application claims the benefit of U.S. patent application Ser. No. 14/499,303 for a Data Collection System having Reconfigurable Data Collection Terminal filed Sep. 29, 2014 (and published Jan. 29, 2015 as U.S. Patent Publication No. 2015/0029002), now U.S. Pat. No. 9,256, 772, which claims the benefit of U.S. patent application Ser. No. 13/098,711 for a Data Collection System having Reconfigurable Data Collection Terminal filed May 2, 2011 (and published Aug. 2, 2012 as U.S. Patent Application Publication No. 2012/0194320), now U.S. Pat. No. 8,851,383, which is a division of U.S. patent application Ser. No. 11/582,151 for a Data Collection System having Reconfigurable Data Collection Terminal filed Oct. 17, 2006 (and published Jul. 5, 2007 as U.S. Patent Application Publication No. 2007/0152058), now U.S. Pat. No. 7,934,660, which claims the benefit of U.S. Patent Application No. 60/757,217 for a Data Collection System having Reconfigurable Data Collection Terminal filed Jan. 5, 2006. Each of the foregoing patent applications, patent publications, and patents is hereby incorporated by reference in its entirety.

FIELD OF INVENTION

The present invention relates to data collection terminals in general and particularly to a data collection terminal in communication with a host computer spaced apart from the data collection terminal.

BACKGROUND

In recent years significant advances have been made in the art of data collection terminals and networks containing the same.

In U. S. Patent Publication No. 2002/0171745, a data collection terminal is described having a bar code reading device which is in communication with a remote computer. The bar code reading terminal sends image data and associated bar code data to a remote computer. In one combined bar code/image data transmission scheme described in the above patent application publication decoded bar code message data identifying a parcel is stored within an open byte header location of an image file including an image representation of the parcel. In U. S. Patent Publication No. 2002/0171745, an image data file in .PDF, .TIF, or .BMP file format is created at a data collection terminal which includes an image representation of a decoded bar code message and an image representation of the package including the bar code encoding the decoded message. In U. S. Patent Publication No. 2003/0132292, a data collection terminal is described having a data collection terminal including a bar code reading device, an RFID reading device, a mag stripe data reading device, a chip card reading device, and a fingerprint reading device. The terminal is coupled to a network, which is configured to facilitate financial transactions involving data collected utilizing the various reading devices.

As significant as the above developments are, shortcomings have been noted with the operation of presently available data collection terminals and the systems in which they are incorporated. For example with continual up featuring of data collection terminals, data collection terminals have become increasingly difficult to use. While data collection terminals may have a plurality of available functions users of such devices find it difficult or practically impossible to access all of the functions incorporated in the devices that they operate. For example, configuring a radio transceiver of a data collection terminal to operate within a specific network has become a daunting task and one that involves a selection of tens of users' selectable options. As a result, users of data collection terminals have been observed to delay or avoid the process of configuring terminal radio transceivers for operation in a specific network and instead operate their terminals in long periods of time in batch mode or serial hardwire connection mode for long periods of time in spite of the availability of wireless connectivity.

A problem with reconfiguring certain types of data collection terminals such as hand held data collection terminals is their small size. Configuration setting screens on data collection terminals are sometimes difficult to view on account of being of small size. The smallness of keyboard buttons and other user interface buttons such as pointer controllers on certain types of data collection terminals also makes the setting of configuration parameter settings with such terminals difficult.

While some attempts to use a spaced apart computer with a larger keyboard and display screen for configuration of a data collection terminal have significantly simplified the task of reconfiguring a data collection terminal, other reconfiguration methods involving use of a computer spaced apart from a data collection terminal have been noted to be time consuming and have also been noted to result in entry errors.

A known method of configuring a data collection terminal uses a general purpose computer to create or edit a text based configuration file containing parameters for each device or program the user desires to configure. A common type of text file used to configure devices and programs is the ".INI file" format. The .INI file format was developed by MICROSOFT, Inc for use in configuring WINDOWS operating system and other programs running on a WINDOWS platform. However, developers have been observed to use the .INI file format for other configuration applications running on WINDOWS platforms. Generally, an .INI file will contain a somewhat organized list of parameter settings that are encoded as "key values." Elements of a data pair, e.g., the key and key value encoding one or more parameter settings, may be separated by a predetermined character such as an equal sign ("="). If the key value comprises a plurality of values, individual elements may be separated by, for example, a comma. Data pairs may be separated by a predetermined character such as a return character. Further, data pairs may be organized into sections based on a system or sub-system relevant to the data pair. Such configuration files are typically created and edited using a general text editor (e.g., WORDPAD or NOTEPAD).

To prepare an .INI file a user must be familiar with the various available configuration parameter settings, their permissible values, and be willing to hunt through a list of data pairs to identify those data pairs that relate to settings of interest. Once completed the .INI file is transferred to the data collection terminal over a communication path. When residing at a data collection terminal parameter settings encoded in the .INI file may be accessed by a program of the data collection terminal.

In many cases, to adequately provision a data collection terminal for operations, not only do parameters settings need to be set, but certain files, such as applications and databases, need to be transferred and stored on the data collection terminal. In the past, such transfers were manually handled using an OS related synchronization software, such as MICROSOFT ACTIVESYNC for the WINDOWS MOBILE OS. In general a user would queue up each file (typically by dragging and dropping each file into a predetermined folder) for transfer and executing an active sync (in the case of WINDOWS MOBILE). According to a known method for sending files to a data collection terminal an active sync can be executed for each file to be transferred. Also, several files can be included in a single CAB file (.CAB) file and a .CAB file can be transferred to a data collection terminal using an active sync.

There is a need for further advances in data collection terminals and systems in which they are connected.

BRIEF DESCRIPTION OF THE DRAWINGS

FIG. 1b is a block electrical diagram illustrating electrical hardware devices of a host computer and a data collection terminal as shown in FIG. 1a.

FIG. 1c is a software module diagram including various software modules which can be incorporated into the host computer and the data collection terminal shown in FIG. 1a;

FIG. 1e is a perspective view of an imaging module which may be incorporated as part of a bar code reader device of a data collection terminal, wherein the view includes a cutaway portion to show a two dimensional image sensor of the imaging module;

FIG. 1f is a block diagram of an RFID reader device that can be incorporated in a data collection terminal;

FIG. 1g is a block diagram of an integrated circuit card (otherwise termed a smart card reader device) which can be incorporated into a data collection terminal and which reads data from a financial transaction card and writes data to a financial transaction card incorporating an integrated circuit for storing data;

FIG. 3a is a diagram illustrating an exemplary architecture for a data package;

FIGS. 3c-3g are schematic diagrams illustrating alternative constructions for data packages for use in particular applications;

FIGS. 4a and 4b are flow diagrams illustrating exemplary processing for de-packaging a data package that can be defined at a host computer;

FIGS. 7a-7l and 8a-8q are screen shots illustrating various graphical user interface display screens that can be displayed on a display of a host computer for either building or editing a configuration file or for defining and building a data package.

DETAILED DESCRIPTION

I. System Overview

In a data collection system including a data collection terminal that can have an encoded information reader device and a computer spaced apart from the data collection terminal, the data collection terminal can be configured to be responsive to configuration data expressed in an extensible markup language. The computer in one embodiment can use an existing extensible markup language document to create a data entry screen to receive desired parameter settings for the data collection terminal within data entry fields of the data entry screen. The computer can further combine the extensible markup language document with the desired parameter settings to create configuration data and can initiate a transfer of the configuration data to the data collection terminal.

The computer in one embodiment can be used to create for transfer to the data collection terminal a data package that may include file data corresponding to one or more selected files selected for transfer to the data collection terminal, together with additional data. The one or more selected files can include a configuration document file expressed in an extensible markup language that has been created using the computer. The additional data can include command data corresponding to commands to be executed by the data collection terminal, compression selection data for the data package and encryption selection data for the data package, and action indicators indicating action to be taken by the data collection terminal when processing file data and command data of the data package.

The system can be used to transfer data, including but not limited to configuration data between computers other than data collection terminals.

The subheadings herein, e.g., "I. System Overview," "II. System Schematic Diagrams" are provided for general guidance only, and it will be understood that there is significant overlap between subject matter contained under the various subheadings.

II. System Schematic Diagrams

Figure 1A:
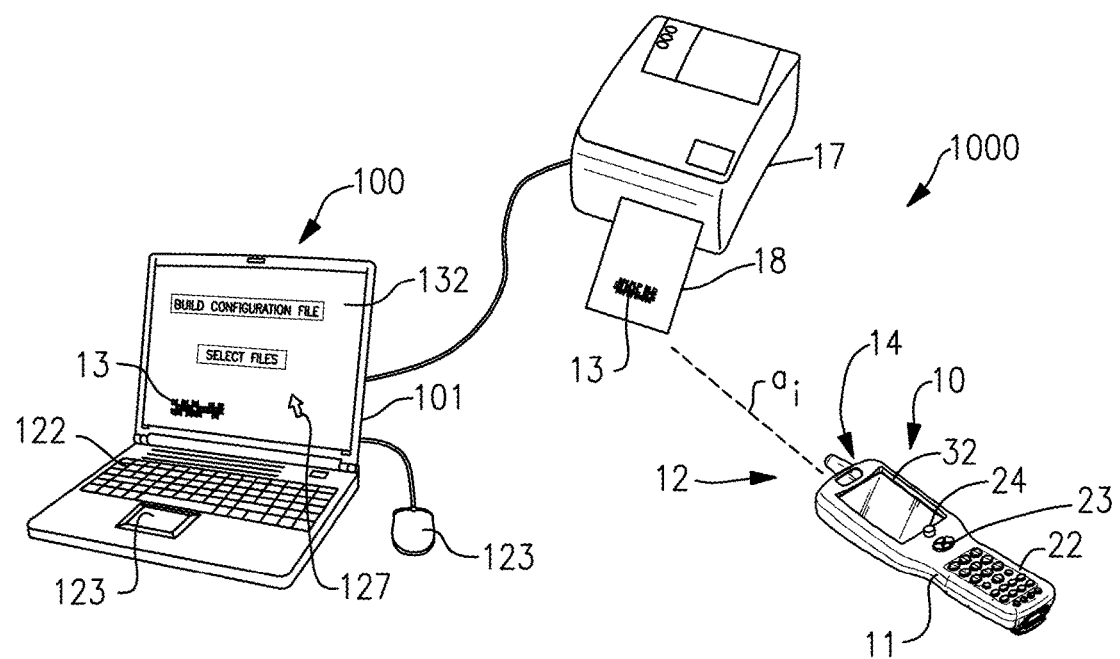
FIG. 1a is a schematic physical view of a system in an illustrative embodiment including a host computer provided by a laptop personal computer, a bar code symbol printer, and data collection terminal wherein a data package built at the host computer can be transferred to the data collection terminal by way of a process including the steps of encoding the package data and utilizing the data collection terminal to decode the package data or by utilization of a suitable data transmission protocol to transfer the data package from the host computer to the data collection terminal.

Referring to FIG. 1a, there is provided a system 1000 for reprogramming data collection terminal 10 with use of a host computer 100. As shown in FIG. 1a, system 1000 can include a host computer 100 shown as being provided by a portable laptop personal computer PC and a data collection terminal 10 having an encoded information reader device shown as being provided by a bar code reader device 14. Host computer 100 can include a keyboard 122 and a display 132 disposed in portable housing 101. Data collection terminal 10 can include an encoded information reader device, e.g., bar code reader device 14. Data collection terminal 10 can also include a display 32, trigger 24, and keyboard 22 all disposed in and supported by portable hand held housing 11. System 1000 can further include a bar code label printer 17 for printing a bar code 13. Bar code symbol printer 17 can be in communication with host computer 100, such that host computer 100 can send print commands to printer 17.

Hardware devices that can be incorporated in host computer 100 and data collection terminal 10 are described in connection with FIG. 1b. Host computer 100 can include a control circuit 140 such as may be provided by a micro processor IC chip in communication with a memory 142, a user input interface 120 and a user output interface 130. Memory 142 of host computer 100 can include a read only memory device, ROM 146, and a random access memory device RAM 148. ROM 146 can be e.g., an EROM or an EPROM. In addition Memory 142 of host computer 100 can include storage memory 145 such as a hard drive and a flash memory device 149. Memory 142 of host computer 100, among other types of files, can retain XML configuration files which can be edited and transferred to data collection terminal 10. User input interface 120 can include keyboard 122 and pointer controller 123, e.g., a mouse or track ball. User output interface 130 can include a display 132 which can also be regarded as a display device. Referring to additional devices of host computer 100, host computer 100 can include a power distribution circuit 190 for powering integrated circuit of host computer 100. Power distribution circuit 190 receives electrical power from a plurality of alternative sources, e.g., serial block 192 such as may be provided by a USB cable, a transformer based AC to DC power supply 194, and rechargeable battery 196. Host computer 100 can include a long term storage device such as 145 which may include, e.g., a hard disk and/or a CD disk drive. Host computer 100 can also include a wireless radio communication interface 160 including one or more radio transceiver devices, e.g., 802.11 radio transceiver device 162 and Bluetooth radio transceiver device 164. Host computer 100 can also include a serial input/output interface device 180 which can include one or more of, e.g., an RS232 serial port, an ETHERNET serial port, or a USB serial port. The various devices of host computer 100 can be in communication via system bus 115. The various devices of host computer 100 can have associated registers and device processors, sometimes referred to as device controllers.

Data collection terminal 10 can include a control circuit 40 such as may be provided by a microprocessor integrated circuit chip, memory 42, a user input interface 20, a user output interface 30, and an encoded information reader device 12. Memory 42 can include a read only memory device or ROM 46 and a random access memory device 48. ROM 46 can be e.g., an EROM or EPROM. Memory 42 can include a storage memory 45 such as a hard drive, and a flash memory device 49. A memory of device 10 e.g., Memory 42 can retain among numerous types of files including XML configuration files for configuring a device of terminal 10 such as a radio transceiver device or a bar code reader device. System 1000 can be operated so that such XML configuration files are retrieved from data collection terminal 10 by host computer 100, edited at host 100, then transferred back to data collection terminal 10. User input interface 20 can include pointer controller 23, keyboard 22, touch panel 25, and trigger 24. User output interface 30 can include display 32 and acoustic output 33. Encoded information reader device unit 12 can include one or more of bar code reader device 14, RFID reader device 16, and card reader device 18. Bar code reader device 14 may be provided, e.g., by an IT4XX/5XX Imaging Module with decode out circuit of the type available from Hand Held Products, Inc. of Skaneateles Falls, N.Y. The IT4XXX/5XXX Imaging Module with decode out circuit provides decoding of a plurality of different types of bar code symbols and other decodable symbols such as PDF 417, Micro PDF 417, Maxicode, Data Matrix, QR Code, Aztec, Aztec Mesa, Code 49, UCC Composite, Snowflake, Data Gliffs, Code 39, Code 128, Codabar, UPC, EAN, Interleave 205, RSS, Code 93, Codablock, BC412, Postnet, Planet Code, BPO Forcedate, Canadian Forcedate, Japanese Post, KIX (Dutch Post), OCR A and OCR B. Encoded information reader device unit 12 can also include an RFID reader device 16 such as that may be provided by a Skytek Sky Module M1 reader and card reader device 18 which may include an integrated circuit card (IC CARD) reader device otherwise known as a smart card reader device. Referring to additional features of data collection terminal 10, data collection terminal 10 can include a power distribution circuit 90 which receives power from a variety of different power sources including serial power source 92 (e.g., a USB cable, a transformer based AC to DC power supply 94, and rechargeable battery 96). Data collection terminal 10 can also include a radio communication interface device unit 60. Radio communication interface device unit 60 can include one or more radio transceiver devices such as IEEE 802.11 radio transceiver device 62, Bluetooth radio transceiver device 64, WIMAX radio transceiver device 66 and cellular radio transceiver device 68. Data collection terminal 10 can also include a serial input/output interface 80. Serial input/output interface 80 can include one or more of an RS232 port, USB port, and an ETHERNET port. The various devices of data collection terminal 10 can have associated registers and processors sometimes referred to as device controllers.

Data collection terminal 10 can include one or more of the additional devices that are described in U.S. patent application Ser. No. 11/174,447, filed Jun. 3, 2005 entitled, "Digital Picture Taking Optical Reader Having Hybrid Monochrome And Color Image Sensor Array," U.S. Provisional Patent Application No. 60/721,518, filed Sep. 28, 2005 entitled, "Data Collection Terminal And Network Having Radio Signal Responsive Mode Switching," and U.S. Provisional Patent Application No. 60/725,001, filed Oct. 7, 2005 entitled, "Data Collection Terminal Having Dynamic Access To Multiple Wireless Networks," all of which are incorporated herein by reference in their entirety. The above mentioned U.S. Provisional Patent Application No. 60/721,518, filed Sep. 28, 2005 is attached hereto as Appendix D. For example, in addition to the devices of FIG. 1b, data collection device can include a VOICE CODEC, and microphone and a location detection circuit. A parts list for data collection terminal 10 in one illustrative embodiment is provided in Table A.

TABLE A

| Bar Code Reader Device 14 | Hand Held Products IT4xxx/80 Image Engine Imaging Module With Decode Out Circuit |
|---|---|
| RFID Reader Device 16 | Skytek Sky Module M1, Sky Module M8 |
| Card Reader Device 18 | Panasonic ZU-9A36CF4 |

Referring now to FIG. 1e, FIG. 1e shows an imaging module 1402 that can form part of a bar code reader device 14 of data collection terminal 10. Imaging module 1402 can be provided by an IT4XXX imaging module that type available from Hand Held Products, Inc. of Skaneateles Falls, N.Y. Imaging module 1402 can include first circuit board 6314A, second circuit board 6314B, support assembly 6380 and optical plate 6326 including aiming optics such as aiming optics 6325 and illumination optics 6327. Imaging module 1402 can include a lens 1404 provided by e.g., a lens singlet, lens doublet or lens triplet. Lens 1404 focuses an image of a bar code symbol 13 onto two-dimensional image sensor 1406 which can comprise a plurality of pixels formed in a plurality of rows and a plurality of columns. Imaging module 1402 can also include conductive support posts 6384 holding together the devices of the circuit board and delivery power between circuit boards of the imaging module. Imaging module 1402 when provided by an IT4XXX imaging module the type available from Hand Held Products, Inc. is available in a form with an associated decode out circuit for decoding bar code symbols and other decodable indicia such as MaxiCode PDF 417, Micro PDF 417, Data Matrix, QR Code, Aztec Code, RSS Code, Postal Codes, Code 39, Code 93, Interleave205, Code 128, UPC, EAN and UPC/EAN, OCR A and OCR B. Imaging module 1402 can include support assembly 6381 supporting devices of imaging module 1402 such as lens 1404 and circuit board 6314a, and 6314b. Imaging module 1402 can include aiming LEDs 6318 mounted on circuit board 6314b. Light from aiming LEDs is shaped by slits 6343 of support assembly 6381 which slits are imaged onto a substrate e.g., paper 18 by lenses 6325 as shown in FIG. 1a to form an aiming pattern on bar code 13. Light from LEDs 6316 is shaped in part by optics to illuminate an area that substantially corresponds to a field of view of imaging module 1402. It will be seen that system 1000 can include XML configuration files configuring bar code reader device 14 including imaging module 1402. For example, an XML configuration file such as the file of Table 2 can include a bar code reader device specific elements having a name attribute corresponding to bar code reader device 14, and subsidiary elements having content parameter settings for controlling the operation of bar code reader device 14. Such parameter setting values can include e.g., delay parameter settings for controlling timing of activation of aiming LEDs 6318, centering parameters for controlling an area of interest of a captured image captured by activation of image sensor 1406, and suffix parameter setting values for controlling which, if any, characters will be appended to a decoded out message. XML configuration files retained on data collection terminal 10 (i.e., in a memory) can be transferred (e.g., copied) to host computer 100, edited, then transferred back to data collection terminal 10. When residing at a data collection terminal, parameter settings of an XML configuration file may be utilized to reconfigure a bar code reading device in a number of different ways, e.g., the parameter settings can be accessed by a program operating a bar code reader device 14, may be parsed and passed to program for operating the bar code reading device 14, or may be parsed and passed to a register of the data collection terminal. Bar code reader device 14 can be configured to attempt to read bar codes and to read bar codes in response to a trigger signal being initiated. Data collection terminal 10 can be configured so that such a trigger signal is initiated, e.g., when trigger 24 or another button of terminal 10 is depressed, or when a trigger signal command is received from an external computer, such as host computer 100. Bar code reader device 14 can also be a laser scanning type bar code reading device, e.g., such as may be provided by an MS-3 Laser Scanner OEM Module available from MICROSCAN.

Referring to FIG. 1f, FIG. 1f shows a block diagram of a RFID reader/writer device 16 that can be incorporated in data collection terminal 10. RFID reader/writer device 16 (referred to herein simply as an "RFID reader device") can include transmitter 1602, antenna 1604, receiver 1606, data decode processing circuit 1608 and writer 1610 which can also be termed an encoder, which can serve as encoding module 5012 (encoder) of host computer 100 of system 1000 as described in connection with FIG. 1d. RFID reader/writer device 1602 can be used to activate a passive tag 1620 as shown in FIG. 1d. Passive tag 1620 can include a storage device 1622, a transponder 1626 and an antenna 1628. For activation of a passive tag 1620 (FIG. 1d), transmitter 1602 can send an activation radio signal over antenna 1604 which is received by antenna 1628 for activation of transponder 1626. In response to the receipt of the activation signal, transponder 1626 is actuated to transmit a radio signal representing identification data encoded into passive tag 1620. RF receiver circuit 1606 in turn receives the radio signal from the passive tag 1620 and converts the data into a processable digital format. Data decode processing circuit 1608 of RFID reader/writer device 16 typically includes a low cost micro controller IC chip and decodes the received radio signal information received to decode the identification data originally encoded into RFID tag 1620. RFID tag 1620 can be applied to e.g., articles for sale in a retail store, or to an identification card such as a credit or debit card. RFID tag 1620 can also be used independent of an identification application. For example, RFID tag 1620 can be used as a token in security applications or as a tool for use in reconfiguring a data collection terminal. RFID reader device 16 can be operated in a continuous read mode or in an active read mode. In an active read mode, RFID reader device 16 attempt to read and reads data from a tag 1620 in response to a trigger signal initiated. Data collection terminal 10 can be configured so that a trigger signal is initiated by e.g., depressing trigger 24 (FIG. 1a) or another button of data collection terminal 10.

Referring to FIG. 1g, FIG. 1g shows a block diagram of card reader device 18 that can be incorporated into data collection terminal 10. Card reader device 18 can have reading and/or writing functionality and can be a card reader device for reading financial transaction cards. Card reader 18 can be an integrated circuit card reader device also known as a smart card reader device which can read data from and write data to a smart card. Card reader device 18 can include electrical contacts 1802, signal detection circuit 1804, card decoder 1806 and encoder 1808 which can serve as encoding module 5012 (encoder) of host computer 100 of system 1000 as described in connection with FIG. 1d. Contacts 1802 of card reader device 18 are adapted for making contact with an integrated circuit 1822 of an integrated circuit card 1820 (Smart Card) which may be, e.g., credit card, a debit card, an electronic benefits card or a customer loyalty card or simply an integrated circuit card used as a token for security applications or as a tool for use in reconfiguring data collection terminal 10. When contacts 1802 are in contact with integrated circuit 1822 of card 1820, signal detection circuit 1804 picks up an electrical signal and information stored on integrated circuit 1822 is then decoded by card decoder 1806. Card reader device 18 further includes an encoder 1808 for encoding data which is to be written into card 1820. When card 1820 is in contact with card reader device 18, card reader device 18 can be activated so that encoded data for encoding a card is written onto integrated circuit chip integrated circuit 1822 of card 1820.

Figure 1B:
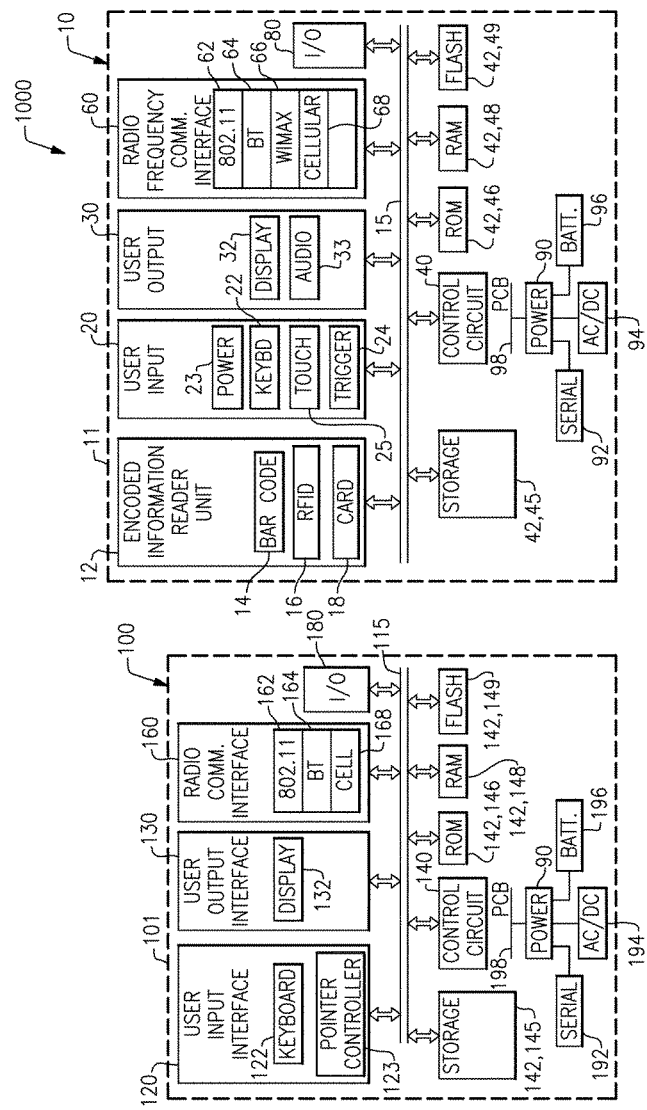
Figure 1C:
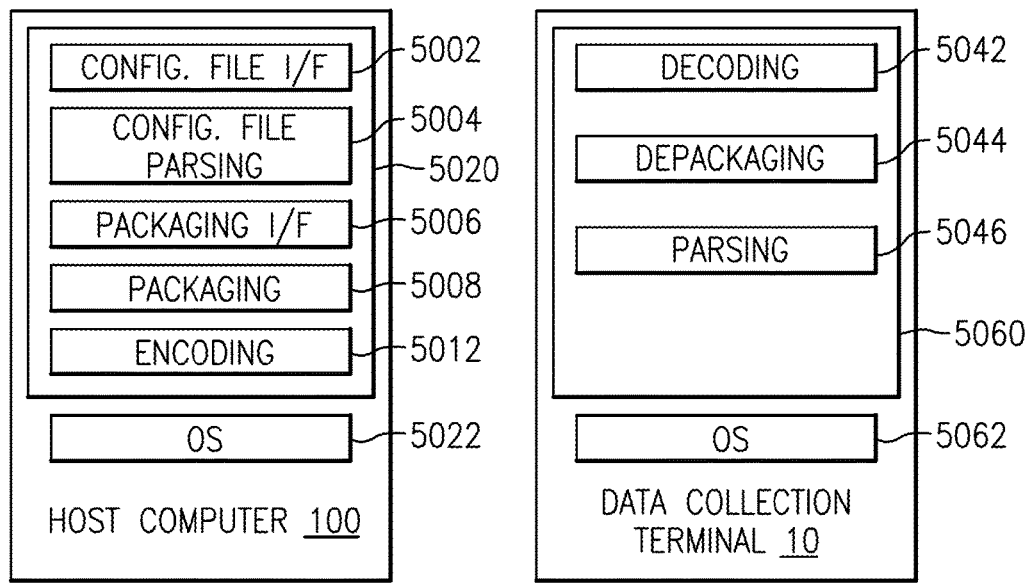
Figure 1D:
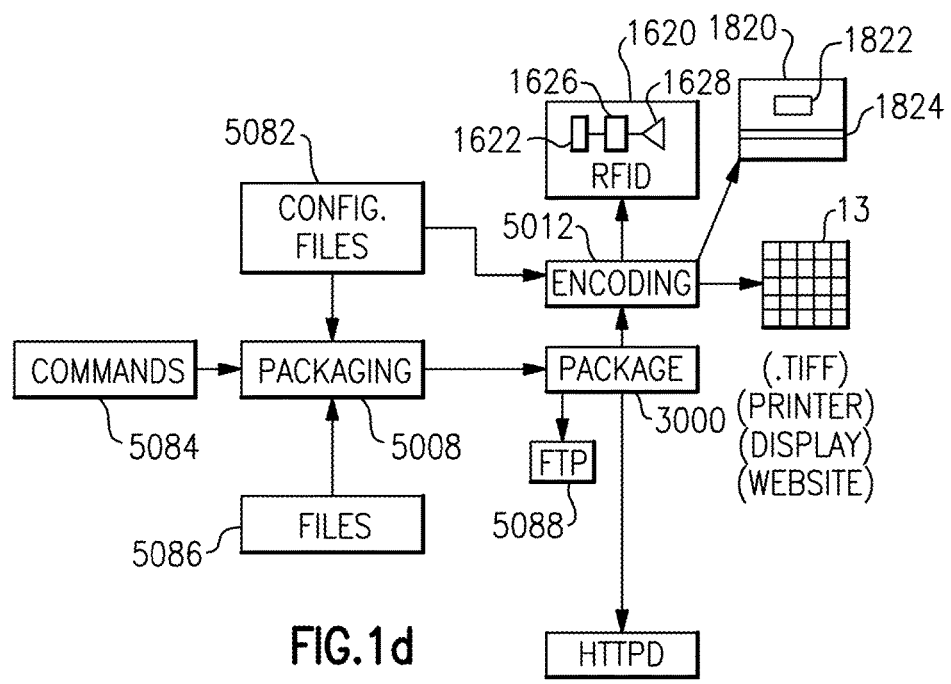
FIG. 1d is a flow diagram illustrating interactions between processing modules of a host computer of a data collection system.
Figure 1H:
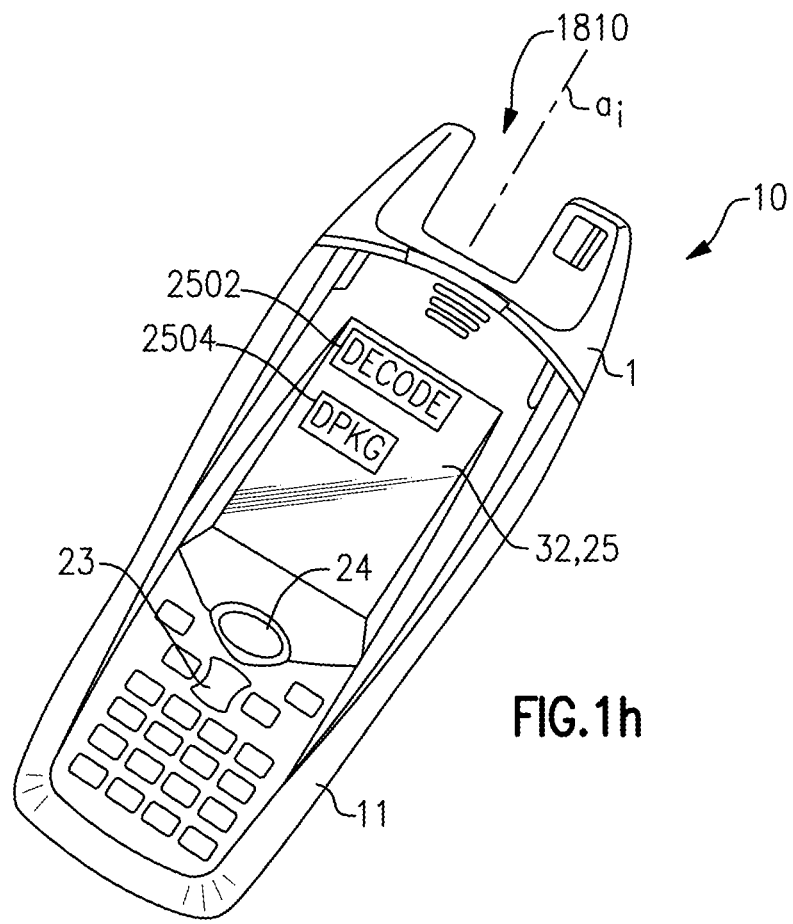
FIG. 1h is a perspective view of a hand held data collection terminal which can incorporate the devices of the data collection terminal of FIG. 1b and which may be incorporated as part of a system including a data collection terminal and a host computer.
Figure 1I:
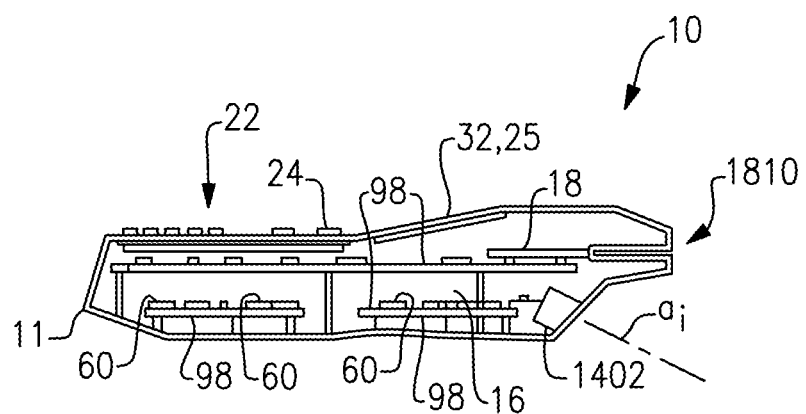
FIG. 1i is a cutaway side view of the hand held data collection terminal of FIG. 1h.
Figure 1J:
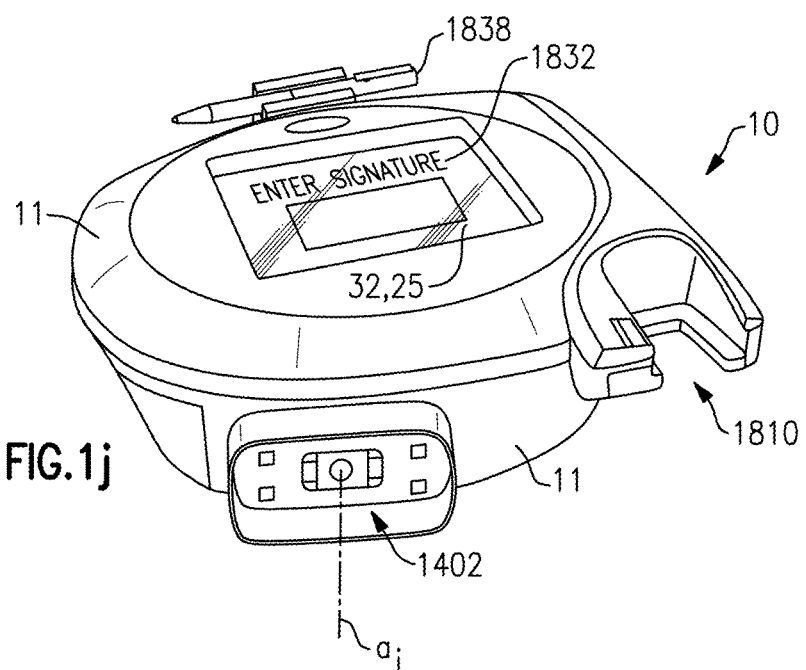
FIG. 1j is a perspective view of an alternative data collection terminal which like the version of FIGS. 1h and 1i can incorporate the electrical devices of the data collection terminal shown in the block diagram of FIG. 1b.
Figure 1K:
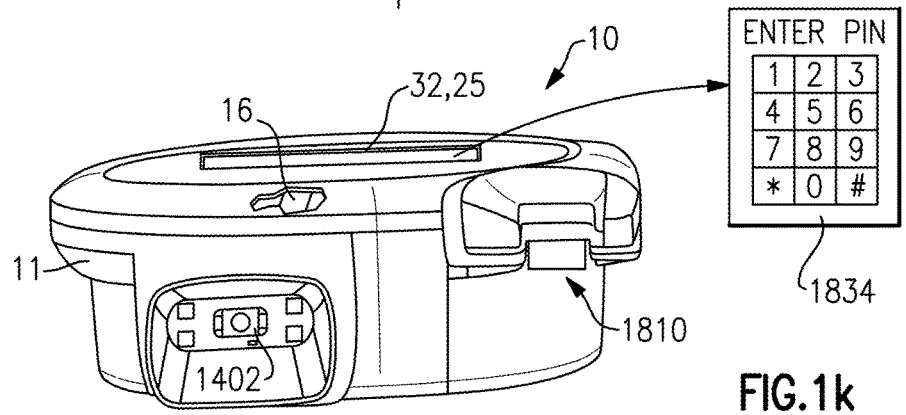
FIG. 1k is a front perspective view of the data collection terminal of FIG. 1j.
Figure 1L:
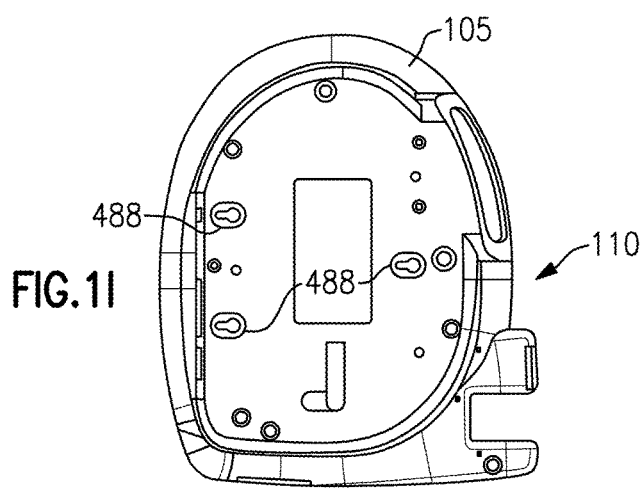
FIG. 1l is a bottom view of the data collection terminal shown in FIGS. 1j and 1k.

Referring now to FIGS. 1h-1l, various housings that can incorporate the circuit devices shown in the data collection terminal 10 of FIG. 1b are shown and described. In the embodiment of FIGS. 1h and 1i, data collection terminal 10 is provided by a hand held data collection terminal 10 in a form factor commonly referred to as a portable data terminal (or PDT) which is best seen in the side view of FIG. 1i. The hand held data collection terminal of FIGS. 1i and 1h incorporates imaging module 1402 as shown in FIG. 1e with imaging access a, of imaging module 1402 extending forwardly from the data collection terminal 10. Also, as seen from the side view of FIG. 1i, encoded information reader devices of data collection terminal 10 can be mounted on various circuit boards 98 that are supported internally within an interior of housing 11 of data collection terminal 10. Namely, RFID reader device 16 and card reader device 18 can be mounted on circuit boards 98 disposed within an interior of housing 11. Imaging module 1402 of bar code reader device 14 can also be mounted within housing 11 while an associated decode out circuit (not shown) associated with imaging module 1402 can be mounted on a printed circuit board 98 in an interior of housing 11. FIGS. 1j, 1k and 1l illustrate an alternative housing 11 for data collection terminal 10. Alternative housing 11 as shown in FIGS. 1j, 1k and 1l is in a form factor commonly referred to as a transaction terminal. In the embodiment of the FIGS. 1j, 1k and 1l, data collection terminal 10 incorporates imaging module 1402 as shown in FIG. 1e. Data collection terminal 10 like the data collection terminal as shown in FIGS. 1h and 1i as shown in FIGS. 1j, 1k and 1l also includes card reader 1810. Card reader 1810 includes card reader device 18 together with the portion of housing 11 that is formed to guide a card 1820 so that card 1820 makes contact with contacts 1802. In an aspect of system 1000, host computer 100 can have the form factor of one of the described data collection terminals. Because host computer 100 can have a form factor of one of the described data collection terminals, host computer 100 can be portable and can incorporate one or more encoded information reader devices.

Data collection terminal 10 as illustrated in FIGS. 1j and 1k can have a plurality of operating modes which are operative to prompt a user to enter certain information into data collection terminal 10. As indicated by the view of FIG. 1j, data collection terminal 10 can have a signature entry mode wherein the ENTER SIGNATURE prompt 1832 is displayed on display 32 prompting the user to enter the signature into touch screen overlay 25 utilizing stylus 1838. Data collection terminal 10 is indicated by the view of FIG. 1k can also have a personal identification number ("PIN") entry mode wherein data collection terminal 10 displays PIN entry prompt 1834 on display 32 prompting the user to enter PIN data into touch screen overlay 25. As indicated by the bottom view of FIG. 1l, data collection terminal 10 can be configured to be demountably mounted on a fixed member. Terminal 10 can execute such signature and pin entry modes when provided in the form factor of FIGS. 1h and 1i. As seen in the view of FIG. 1l, data collection terminal 10 can include key shaped formations 1840 which enable data collection terminal 10 to be mounted on a fixed member such as a fixed member having screw heads extruding therefrom in the spacing relation of formations 1840 of housing 11 to enable data collection terminal 10 to be mounted on the fixed member such as a desktop, a shelf, a post or a wall and then readily removed from the fixed member when it is desired to move data collection terminal 10 to another location.

III. Host Computer and Data Collection Terminal Applications

Referring to FIGS. 1a, 1b and 1c host computer 100 can be configured to perform a variety of functions. For example, host computer 100 can parse data from an extensible markup language configuration file, such as an XML configuration file and can display such data on a configuration graphical user interface display screen. The parsed data can include parameter settings and descriptions of parameters. Host computer 100 in another aspect can receive user input parameter settings into the displayed graphical user interface display screen and combine such settings into data of an existing extensible markup language configuration file to generate an edited extensible markup language configuration file.

In another aspect, host computer 100 can build for transfer to a data collection terminal 10 a data package including file data corresponding to one or more files and other data such as command data, encryption selection data, compression selection data, and action indicators. For use in defining a data package, host computer 100 can display on display 132 a package building graphical user interface display screen enabling a user to select file data corresponding to one or more files and the above noted other data for inclusion in a data package. The file data selected for inclusion in a data package can include, for example, file data of an XML configuration file that has been previously built using the above noted configuration file graphical user interface display screen, and file data corresponding to, e.g., other text files, executable files, image files, and audio files. The command data selected for inclusion in a data package can include command lines to be run by a command line interpreter of a data collection terminal 10 and script commands to be run by an interpreter of data collection terminal 10 other than a command line interpreter. With use of the package building graphical user interface a user can select encryption selection data and compression selection data for inclusion in a data package. In accordance with the selected encryption selection data, and compression selection data, the host computer 100 can encrypt file data of various files and command data unevenly across a data package and can also compress file data of various files and command data unevenly across various files.

In one aspect the package building graphical user interface display screen of host computer 100 can display a tree diagram indicating data that is designated for inclusion in a data package. Encryption selection and compression selection designators can be inserted into and moved about within the tree diagram to designate which file data and which command data of a data package is to be encrypted or compressed. The package building graphical user interface can also prompt a user to select action indicators including flags each time different file data or a different command is selected for transfer to a data collection terminal. Such action indicators can include action indicators indicating whether a selected file is to be executed when rebuilt at a data collection terminal 10, whether a password is to be entered at a data collection terminal to allow access to a file, whether the selected file is to overwrite an identical named file of the data collection terminal, and the directory of a data collection terminal into which a selected file is to be stored. Action indicators can also be selected for a data package.

When data of a data package has been designated, a data package can be transferred to a data collection terminal either by transferring a data package over a communication path or by encoding a data package into a decodable dataform and then decoding the decodable dataform using that data collection terminal 10.

Referring to aspects of data collection terminal 10, data collection terminal 10 can be configured to receive a data package and de-package a data package. When receiving a data package by way of decoding an encoded dataform having more than one part (such as more than one bar code symbol), the data collection terminal may assemble fields corresponding to each part in an ordering appropriate to reconstruct the data package.

When de-packaging a data package, data collection terminal 10 can read encryption selection data and compression selection data of a received data packaged file in order to decrypt and decompress file data and command data of the data package in the manner required to rebuild the files and commands. After file data corresponding to a certain file selected for transfer is decrypted and decompressed, the file selected for transfer can be regarded as being rebuilt. After command data corresponding to a certain file selected for transfer is decrypted and decompressed, the command selected for transfer can be regarded as being rebuilt. A rebuilt file or command can be buffered in a working memory of data collection terminal 10. When de-packaging a data package data collection terminal can also read action indicators of the data package and take action with respect to rebuilt files and commands in a manner corresponding to the action indicators.

Where a rebuilt file is a configuration file such as an XML configuration file, data collection terminal 10 can parse parameter settings of the configuration file and utilize the parameter settings in reconfiguring a subsystem of the data collection terminal. In utilizing a configuration file to reconfigure a subsystem of data collection terminal 10 data collection terminal 10 can utilize the configuration file to reconfigure a device of data collection terminal 10 such as a bar code reader device 14 or a radio transceiver device 62 or another device. Data collection terminal can reconfigure a device with use of a configuration file, for example, by retaining the configuration file in such manner that parameter settings of the file are accessed by a program running the device or by parsing and passing the parameter to a file or other memory location for access by a program operating a device or by another method. Data collection terminal 10 can also utilize a configuration file to reconfigure a subsystem of data collection terminal 10 by utilizing a configuration file to reconfigure a program of device 10 without affecting operation of a device of terminal 10. For example, in one embodiment, data collection terminal 10 can parse a parameter setting and pass the parameter setting to a WINDOWS Registry, for access by the operating system or by another program (system or application level) where access of the parameter does not result in control of operation of a device being affected.

For carrying out the above noted functions, host computer 100 and data collection terminal 10 can be regarded as having a plurality of software processing modules that can be executed by a microprocessor forming control circuit 40. Because a processor executing a new function can be regarded as a new circuit, the software modules described herein can be alternatively termed "circuits."

Referring to host computer 100, host computer 100 capable of performing the above noted functions can be regarded as having an configuration file interface module 5002 forming the configuration file graphical user interface, a configuration file parsing module 5004 (or parser) for parsing data from a configuration file to be displayed in a specific format in the configuration file graphical user interface display screen, a packaging interface module 5006 forming the package builder graphical user interface display screen and a packaging module 5008 for encrypting and compressing selected filed data and command data of a designated data package in accordance with encryption selection and compression selected data selected by a user, and for incorporating one or more of file data, command data, encryption selection data, compression selection data, and action indicators into a data package that can be used and managed as a file (e.g., can be readily moved between directories of a same or different computers). Host computer 100 can also have an encoding module 5012 for encoding a dataform such as one or more bar codes. Additional processing modules that can be included in host computer 100 are indicated by additional functionalities described herein. A set of processing modules of host computer 100 can be regarded as a host application 5020. The host application 5020 can include one or several programs. For example, each module can be provided with a single program or with several programs. More than one software module can be provided in a single program. The programs defining host application 5020 can be written in a suitable programming language such as C++, C#, .Net, Python. The program or programs of host application 5020 can call pre-compiled sections of code known as libraries, and can run on a suitable operating system 5022, e.g., WINDOWS XP.

Referring to data collection terminal 10, data collection terminal 10 performing the above noted functions can be regarded as having a decoding module 5042 for decoding a dataform, a depackaging module 5044 for decrypting and decompressing file data and command data of a received data package and for taking action with respect to rebuilt files and commands according to action indicators of a data package, and parsing module 5046 (parser) for parsing parameter settings of a configuration file and utilizing such parameter settings to configure a device or program (system or application level) of the data collection device. Additional processing modules that can be included in data collection terminal 10 are indicated by additional functionalities described herein. A set of processing modules of data collection terminal 10 can be regarded as a terminal application 5060. The terminal application 5060 can include one or several programs. For example each module can be provided with a single program or with several programs. More than one software module can be provided in a single program. The programs defining host application 5060 can be written in a suitable programming language such as C++, C#, .Net, Python. The program or programs of host application 5060 can call pre-compiled sections of code known as libraries and can run on a suitable operating system e.g. WINCE. Decoding module 5042 can be provided by, e.g., a decoding module of RFID reader device 16, bar code reader 14, or card reader device 18.

FIG. 1d shows a flow diagram indicating illustrative operations between processing modules of host computer 100. Data of configuration files 5082 which may be built with use of modules 5002, 5004 may be sent to packaging module 5008 or else as indicated later herein, data of a configuration file can be encoded by encoding module 5102 (encoder) such as a bar code encoder, RFID tag encoder, or Smart Card (IC card) encoder without being sent to packaging module 5008. Packaging module 5008 can package data from e.g., configuration files 5082, selected commands 5084 and files 5086. Packaging module 5008 (i.e., host computer 100 in accordance with packaging module 5008) can build a data package 3000 which can be managed as a file and transferred to data collection 10 over a communication path as indicated by FTP block 5088. Also, data package 3000 can be encoded by encoding module 5012 which, as indicated, can be provided by a bar code encoder, RFID tag encoder, Smart Card (IC card) encoder or a USB stub encoder (not shown).

Referring to further aspects of encoder 5012 (encoding module), encoder 5012 can encode data into a physically transportable medium that can be hand carried and physically transported by a user of system 1000 from location to location. For example, encoder 5012 can print decodable bar code symbols onto a physically hand-carryable sheet of paper or card (for example, the printer can print a bar code symbol on a sticker which is applied to a card), can write RFID tag data onto physically transportable RFID tag 1620 that can be hand carried, can write IC card data onto a physically transportable hand carried card 1820, or can write encoded data onto a physically transportable and hand carried USB plug. The physically transportable medium can be carried from terminal to terminal. By reading of the same encoded transportable medium by several different data collection terminals 10 several different data collection terminals can be reconfigured and re-provisioned with new files and other data in a like manner. When the decodable dataform encoded by encoder 5012 is a decodable bar code symbol, an RFID tag or an IC card, the transportable medium onto which the decodable dataform is encoded may be a hand-carryable credit card sized card. The card may be, e.g., a credit card for use in purchase transactions, a debit card, a customer loyalty card or an Identification card (ID card) such as a driver's license, employee ID card or a patient ID card. The card can also be a dedicated "token" card dedicated for the purpose of retaining data packages built by host computer 100 which can be decoded by data collection terminal 10. Another example of a hand-carried physically transportable medium onto which encoder 5012 may encode data of a data package is a hand carried computer having the form of a data collection terminal 10 or another type of hand carried computer such as a cellular telephone. As has been indicated host computer 100 can encode and image representation of a bar code into an image file such as TIF, BMP or other suitable formats. Such an image file containing an image representation of a bar code can be sent by host computer 100 to a hand held computer for display using any IP data communication path. The hand held computer receiving on or more image files including representations of bar codes can be networked to a host computer 100 in the manner of data collection terminal 10, 10-1 or 10, 10-2 of FIG. 2d. The hand held computer can be actuated to display an image file so that an encoded bar code is displayed on a display of the hand held computer. When such an image file is displayed by a first hand held computer a second hand held computer provided by data collection terminal 10 is actuated to read the displayed bar code so that the data collection terminal receives the data package that had been encoded into the bar code. Where data of a data package is large and is encoded into a plurality of bar codes, image representations of each of the bar codes can be encoded into a separate image file. Host computer 100 can send the plurality of image files to a hand held computer. In turn the hand held computer can be actuated to display the plurality of image files on a display thereof in succession. As the succession of image files is being displayed on a display of the hand held computer, data collection terminal 10 can be aimed at the display of the hand held computer with a trigger 24 thereof pressed down so that the data collection terminal 10 reads the succession of displayed bar codes and receives the data package.

IV. Data Package

It has been mentioned that host computer 100 of system 1000 can be used to define and build a data package for transfer to a data collection terminal 10. When a data package 3000 as described herein is defined and built at a host computer 1000, the data package can be manipulated and managed as single file in the same manner as any type of file. For example, with suitable file management software, a data package 3000 can be easily and quickly transferred (e.g., copied) between directories of different computers or copied from a directory of a first computer into multiple directories of the same or different computers (e.g., data collection terminals). However, a data package 3000 of the type that can be defined and built at host computer 100 can include a rather complex arrangement of data. For example, a data package can include file data of more than one file that is selected for transfer to a data collection terminal. A data package 3000 defined at host computer 100 can also include command data corresponding to one or more command. Still further, a data package 3000 can include encryption selection data and compression selection data. In addition, a data package 3000 can include action indications such as flags which are for reading by a data collection terminal to determine the manner in which data of the data package is to be processed at a data collection terminal 100. Referring now to FIGS. 3a-3g, illustrative embodiments of a data package 3000 that can be built with host terminal 100 are described in further detail. In that data package 300 can be manipulated and managed as a single file, or encoded into a dataform and can include a complex arrangement of data, system 1000 provides for the rapid transfer of a complex set of data to data collection terminal 10, or a set of such terminals.

Referring to FIG. 3a, data package 3000 can be built by host computer 100, and can include various data, including command data set 3040 and file data set 3050. File data set 3050 can include file data corresponding to executable files (.EXE), image files (.JPG, .TIF, .BMP), and audio files (.WAV)). File data of data package 3000 can also correspond to custom built XML configuration files built with use of host computer 100 in accordance with XML configurator module 1024. When building of an XML file for use in configuring a device of data collection terminal 10, host computer 100 can edit an existing XML file such as an XML file stored on computer 100, terminal 10, another computer of a local network in which host computer 100 is disposed, or another computer of a network disposed remotely and off-site relative to host computer 100. Where encryption and compression options are selected during the building of data package 3000, data package 3000 can also include an encryption selection data 3020 and a compression selection data 3030. In a further aspect, data package 3000 includes a data package header 3010. Encryption selection data 3020 indicated in the data package of FIG. 3a is global encryption selection data indicating that global encryption for data package 3000 has been selected and compression selection data 3030 is global compression selection data indicating that global compression has been selected for data package 3000.

Data package 3000 built by host computer 100 can also include file data specific and or command data specific encryption and compression selection data for indicating that one or a limited number of file data and/or command data of a package file are to be encrypted and/or compressed. Referring to aspects of package 3000-1, it is seen that encryption selection data 3020 is not encrypted but that data following encryption selection data 3020 are encrypted in accordance with the encryption selection information of encryption selection data 3020. Similarly, while compression selection data 3030 is not compressed, all data following compression selection data 3030 are compressed in accordance with the compression selection information of compression selection data 3030. The architecture of an exemplary data package 3000 is described more fully in connection with FIG. 3b.

Figure 3B:
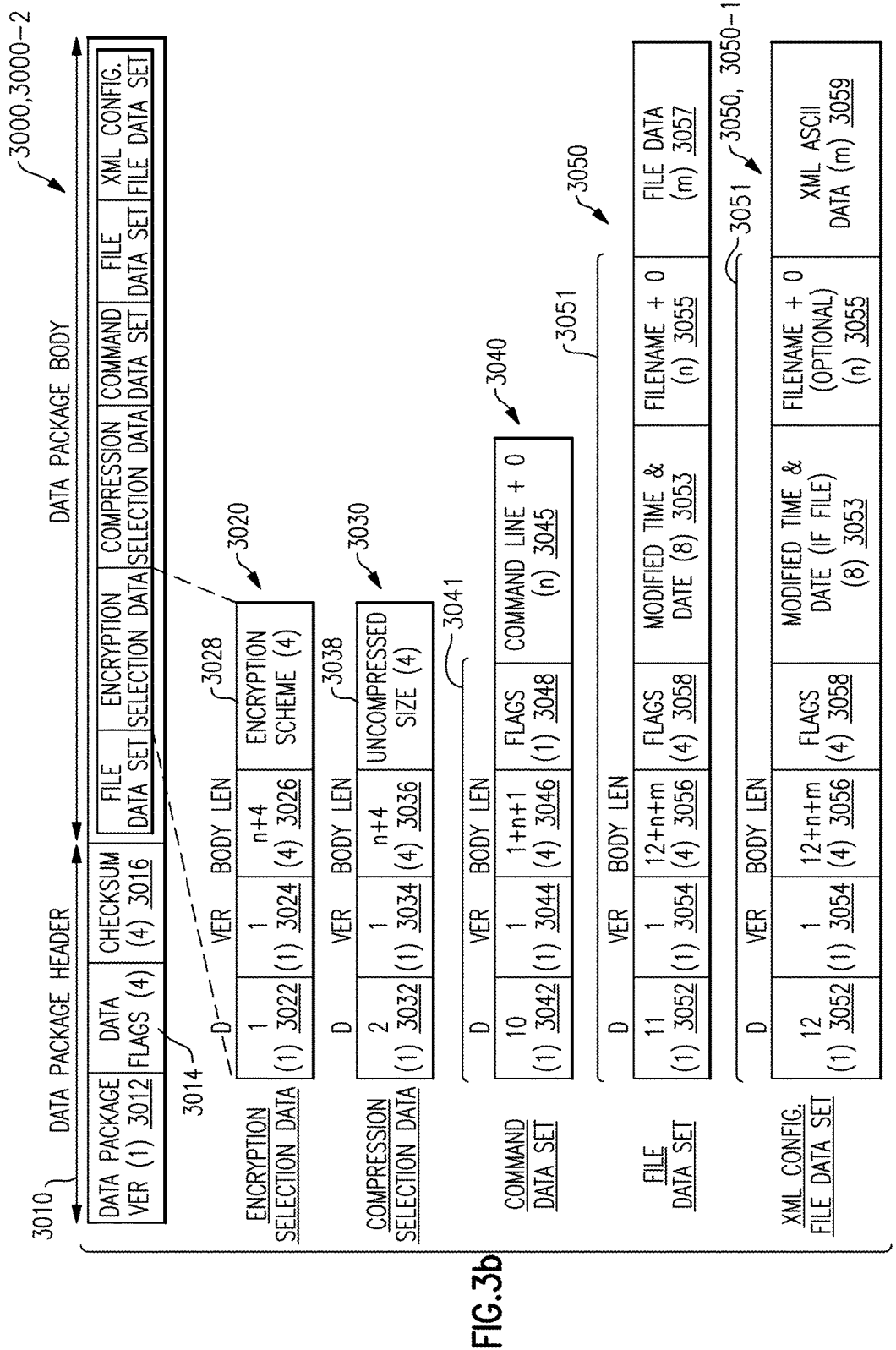
FIG. 3b is a series of schematic diagrams illustrating various architectures for encrypting select data, compression select data, a command data set and a file data set that may be included in a data package.

Referring to FIG. 3b, data package header 3010 includes data set version or "VER" field 3012, data flags field 3014, and checksum field 3016. Data flags field 3014 includes the flags and indicators discussed in connection with Table 1 herein. Among the flags of flag field 3014 is a flag indicating whether data collection terminal 10 will prompt a user to enter a password so that processing of data package 3000-2 can proceed. In FIG. 3b, the number of bytes in each field is indicated by the number in parentheses. For example, data flag field 3014 can include four bytes of data.

Referring to encryption selection data 3220, encryption selection data 3020 can include ID field 3022, VER field 3024, body length field 3026, and encryption scheme field 3022 including an identifier for the selected encryption scheme. The body length field 3026 can indicate the set of ensuing bytes of a data package 3000 that will have been encrypted at host processor 100 and which will require decryption at terminal 10. A flag indicating that a password is required can be included in encryption scheme field 3022. Also, some encryption schemes such as Symmetric encryption normally require a password. Accordingly, an action indicator indicating that a password is to be prompted for at data collection terminal 10 can be included into field 3022 by including therein an indication of a certain type of encryption scheme. In encrypting data host computer 100 can execute, e.g., RC2 block cipher encryption, RC4 block cipher encryption, DES block cipher encryption and/or triple DES block cipher encryption. When a password is entered, host computer 100 can use the password to encrypt data of the data package.

Referring to compression selection data 3030, compression selection data 3030 can include ID field 3032, VER field 3034, body length field 3036, and field 3038 indicating an uncompressed size of the data being subject to compression prior to compression. The body length field 3036 can indicate the set of ensuing bytes of a data package 3000 that will have been compressed at the host computer 100 and which will require decompression at terminal 10. In compressing data, host computer 100 can execute, e.g., run-length compression Huffman-coding compression, and/or Lempel-Ziv compression.

Referring to command data set 3040, header 3041 of command data set 3040 can include ID field 3042, VER field 3044, body length 3046 and flag field 3048 including control flags as are selected by a user of system 1000 during the building of data package 3000. Command data set 3040 also includes command data 3045 such as data corresponding to a command line which is input into a data entry field of host computer 100 for transfer to data collection terminal 10. Flag field 3048 includes the flags and other indicators described in connection with Table 3 herein.

Referring to generic file data set 3050, header 3051 of generic file data set 3050 includes ID field 3052, VER field 3054, body length field 3056, and flag field 3058 as are selected by a user of system 1000 during the defining of data package 3000. Date and time field 3053 indicate the date and time the file corresponding to file data set 3050 was selected for inclusion in package file 3000. File data set 3050 also includes file name field 3055 indicating the name of file selected for transfer to data collection terminal 10 and file data field 3057 corresponding to the selected file selected for transfer to data collection terminal 10. Included in file name field 3055 can be a designated directory of data collection terminal 10 which can be designated by a user using data entry field 8832 (FIG. 8g). When file data 3057 of data package 3000 is processed by data collection terminal 10, data collection terminal 10 rebuilds on terminal 10 the file selected for transfer to terminal 10. The file may be first rebuilt in a working memory of terminal 10, and then transferred to memory storage device, specifically in the directory designated in field 3055 set by a user. Flag field 3058 includes the flags and other indicators described in connection with Table II herein.

Referring to specific XML configuration file data set 3050-1, specific XML file data set 3050-1 has essentially the same structure as generic file data set 3050 except as indicated by reference element 3059. File data 3054 of specific XML information 3050-1 includes binary data mapped to XML ASC II data.

While the data package 3000-1 described with reference to FIG. 3a includes encryption selection data 3020, compression selection data 3030, command data set 3040, and generic file data set 3050 corresponding to two generic files, and a specific XML file data set 3050-1, it will be understood that host computer 100 incorporating packaging module 1006 can be utilized to build data packages having information corresponding to a fewer number of files and commands. For example, referring to FIG. 3c host computer 100 can be utilized to build a data package 3000-3 including a single data set; namely, a command data set 3040. The illustrative embodiment of FIG. 3c illustrates the use case wherein host computer 100 is utilized to select a command line for transfer to and execution by a data collection terminal 10. Command lines that are designated at host computer 100 for execution by data collection terminal 10 can include command lines e.g., to open a file using a certain executable file, to open a browser to request data from an external device, to commence an FTP session to transfer a file from device 10 to an external device, or to send an FTP request to an external device to request a file from an external device. When a command line is selected for transfer to data collection terminal host computer 100 includes command data into a data package 3000. In turn, data collection terminal 10 processes the command data of the data package to rebuild the command line and to run the command line in that same manner that it would execute the command line if the command line were entered into a command line prompt of data collection terminal 10. Command data sets of data package 3000 can include data corresponding to script commands as well as command line commands.

Referring to the illustrative embodiment of FIG. 3*d*, data package 3000-4 includes encryption selection data 3020 and XML configuration file data set 3050-1 including XML file data and header data associated with the XML file data. When data package 3000-4 is processed at receiving data collection terminal 10, XML configuration file data set 3050-1 can be parsed for use in reconfiguring a device of data collection terminal 10 such as a radio transceiver device of data collection terminal 10 or an encoded information reader device such as bar code reader device 14. Specifically, in accordance with parsing module 5046 data collection terminal 10 can reconfigure a device by parsing an XML document rebuilt at data collection device 10 and passing parameter settings of the XML document to internal registers of terminal devices such as radio transceiver device e.g., device 62 or encoded information reader device 12, or can retain the XML configuration file in a memory location for access by a program operating the device, or can reconfigure a device using the XML file by another method. Data collection terminal 10 can also pass parameter value settings of an XML configuration document to Registry where the terminal 10 has a WINDOWS (e.g., WINCE, WINDOWS XP) operating system, and the parameter settings can be accessed by programs running on the device such as the operating system, other system level programs and application level programs. Such other programs can control operation of a device or may not control operation of a device. For reasons that will be discussed further herein an XML file format provides significant advantages in the process of reconfiguring devices of device 10. Specifically, XML files, like REG files have a multi-tiered hierarchy and thus are well adapted for use in updating parameter settings of a Registry. Also, XML files can be processed using widely available XML processing Application Program Interfaces (API's) that can include a set of preconfigured dynamic link libraries (DLLs) and other libraries. XML APIs are widely available and freely downloadable. An originally authored XML parsing application can make use of third party libraries specially made for parsing XML documents. Still further XML files are self-describing. The inventors noted that descriptive data as is exemplified by the "desc" attribute in the exemplary XML documents of Table 1 and Table 2 can readily be included into XML documents in such manner that the descriptive data can be readily parsed out.

Referring to the illustrative embodiment of FIG. 3*e*, data package 3000-5 can include compression selection data 3030, a first XML file data set 3050-1, 3050-1A and a second XML file data set 3050-1, 3050-1B. Host computer 100 can be utilized to build a data package as shown in FIG. 3*e* when more than one device of a data collection terminal 10 requires reconfiguration. For example, a data package in accordance with FIG. 3*e* may be built by host computer 100 when both cellular radio transceiver device 68 and Bluetooth transceiver device 62 of data collection terminal 10 require configuration. Data package 3000-5 also includes user defined data set 3060 which comprises data other than file data or command data. Such user defined data can be e.g., a predetermined text message for display on display 32 which is not formatted in any file format as described previously herein. User defined data set 3060 can comprise a header indicating that the data set is a user defined data set.

Figures 3F, 3G:
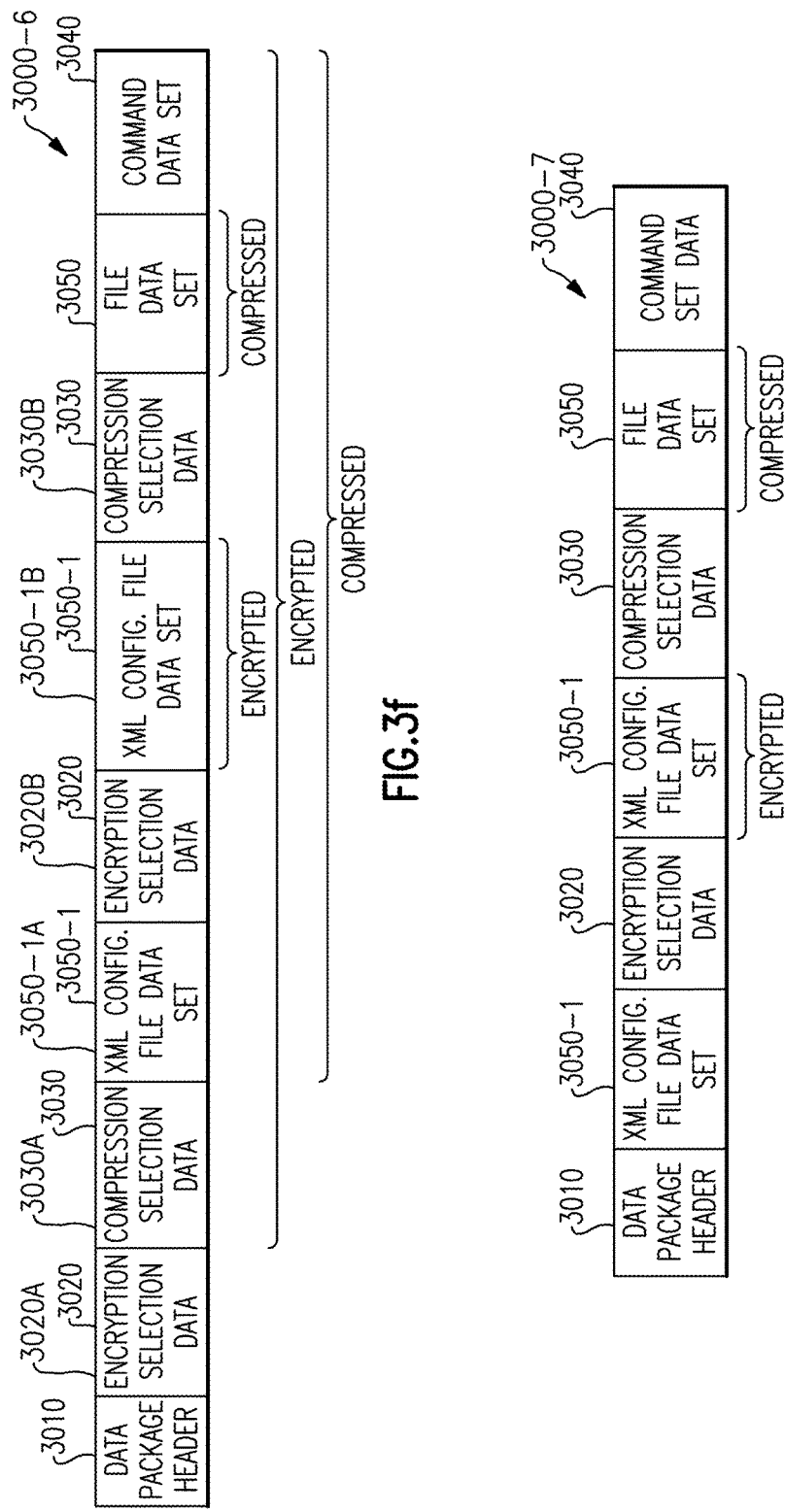

In FIG. 3*f* a complex data package 3000-6 of the type that can be readily made with use of system 1000 is shown. In the illustrative data package of FIG. 3*f*, the elements are labeled in duplicate with generic and specific reference elements so that characteristics of the data package can be better described. For example the element labeled generically as encryption selection data 3020 is also given the reference numeral 3020A for purposes of distinguishing it from the element labeled 3020 and 3020B Complex data package 3000-6 has uneven (inconsistent) compression across file data of the data package. In data package 3000-6, one file data set 3050-1A (the first ordered file data set of the data package) has one layer of encryption and one layer of compression, one file data set 3050-1B has two layers of encryption and one layer of compression, one file data set 3050 has one layer of encryption and two layers of compression, and the command data set 3040 has one layer of encryption and one layer of compression. With global encryption and compression turned OFF, a data package built by host computer 100 can be in the form of data package 3000-7 as shown in FIG. 3*g*. In data package 3000-7 of FIG. 3*g*, the first ordered file data set 3050-1 (from left to right) has no layers of encryption and no layers of compression, the second ordered file data set 3050-1 has an encryption layer but no compression layer, the third ordered file data set 3050 has a compression layer but no encryption layer and the command data set 3040 has no encryption layer or compression layer.

V. De-Packaging and Reconfiguring

In accordance with de-packaging module 544 data collection terminal 10 processes a data package 3000 that has been received by data collection terminal 10. It has been described that in receiving the data package 3000, data collection terminal 10 can either (i) receive the data package typically in a file form over a communication path or (ii) decode a decodable dataform into which the data of the defined data package 3000 has been encoded with use of host computer 100. In de-packaging a data package 3000, data collection terminal 10 can decrypt and decompress file data and command data of the data package 3000 to rebuild files and commands selected for transfer into a buffer memory of data collection terminal 10. In de-packaging a data package 3000, data collection terminal 10 can further take action with respect to rebuilt files selected for transfer and rebuild commands selected for transfer in accordance with action indicators included in the data package 3000. Data collection terminal 10 can be configured to de-package a data package automatically; that is, decrypt and decompress any file data and any command data of a data package and carry out the action of any action indicators of a data package at the time that it is received at the data collection terminal (either by way of file transfer over a communication path, or by way of dataform decoding) without requiring receipt of any further user input commands after the receipt of the data package. Specifically, data collection terminal 10 can be configured to automatically de-package a data package on receipt of the data package pursuant to a file transfer over a communication path and can be further configured to automatically de-package a data package when a data package is rebuilt pursuant to a dataform being decoded as may be initiated by trigger 24 (FIG. 1*a*) being depressed. Also, data collection terminal 10 can be configured so that if a data package in file form already resides in a memory data collection terminal 10 such as storage memory 45 pursuant to a previous file transfer, an application can be initiated by inputting a command into terminal 10 (e.g., by pressing de-package button 2504 (FIG. 1*h*).

Flow diagrams illustrating operation of data collection terminal 10 in de-packaging a data package 3000 are described with reference to FIGS. 4*a* and 4*b*. Data collection terminal 10 at block 4102 opens data package 3000 residing in file form in a buffer memory and at block 4104 processes the one or more "data entities" of the package. "Data entities" as used herein is a generic term to refer to encryption selection data, compression selection data, file data set data, command data set data and any other user defined data set data that may have been included into a data package 3000. In general data collection terminal 10 processes data entities in an order determined by the ordering of the data entities in the package.

An illustrative manner in which data collection terminal 10 can process the data entities is described with reference to the flow diagram of FIG. 4*b* in connection with the data package 3000-6 described in connection with FIG. 3*f* At block 4108 data collection terminal 10 starts the process of processing a set of one or more data entities and at block 4108 data collection terminal 10 gets a next data entity. If global encryption has been selected as in the data package 3000-6 of FIG. 3*f* the first encountered data entity will be encryption selection data 3020A. In accordance with decision block 4110 data collection terminal 10 on determining that the current data entity is encryption selection data collection terminal 10 will proceed to block 4114 to prompt a user to enter a password if password access has been selected. If the decryption is not permitted (e.g., because of a wrong password) terminal 100 may display a wrong password message. If a proper password has been entered, data collection terminal 100 can proceed to block 4122 to decrypt all data entities required by to be decrypted by the preceding encryption selection data, which if the encryption selection data is encryption selection data 3020A of the data package 3000-6 of FIG. 3*f* will be the data entities 3030A, 3050-1A, 3020B, 3050-1B, 3030B, 3050, and 3040. Data collection terminal 10 can be configured as indicated by blocks 4114 and 4118 to execute an error process if decryption is not successful. In buffering the decrypted data entities 3030A, 3050-1A, 3020B, 3050-1B, 3030B, 3050, and 3040 data collection terminal 10 as is indicated by block 4120 can be regarded to have built one or more data entities, namely a set of data entities that are the decrypted version of a set of data entities previously encrypted.

Terminal 10 then returns to block 4106 to recursively start processing the set of data entities built at block 4120 in the manner of the data entities of the original package. If the data package 3000-6 is being processed, the next data entity that is got at block 4108 is the first data entity of the set of data entities built at block 4120, namely global compression selection data 3030A, now in unencrypted form. In accordance with decision block 4130, terminal 10 will proceed to block 4134 to decompress all data entities required to be decompressed by compression selection data 3030A, which in the example of the data package 3000-6 of FIG. 3*f* will be the data entities 3050-1A, 3020B, 3050-1B, 3030B, 3050, and 3040. In buffering the set of decompressed data entities data collection terminal 10 can be regarded to have built a set of data entities as is indicated by block 4135, namely the set of data entities 3050-1A, 3020B, 3050-1B, 3030B, 3050, and 3040 in decompressed form. Terminal 100 then returns to block 4106 to recursively process the set of data entities built at block 4135 in the manner of the data entities of the original data package.

Terminal 10 then proceeds to block 4108 to get a next data entity, namely the first data entity of the set of data entities build at block 4135. In the example of data package 3000-6 the next data entity is configuration file data set 3050-1A, previously encrypted and compressed, now decrypted and decompressed. On determining at decision block 4142 that a configuration file is being handled data collection terminal 10 will proceed to block 4144 to process the configuration file. In processing the configuration file terminal 10 may e.g., pass parameters to a WINDOWS Registry or store the file to an appropriate directory where parameter settings of the file may be accessed by a program such as a program operating a device. Also at block 4144 terminal 10 can carry out all action required of the flags and the action indicators of the configuration file data set. One action indicator can be an action indicator indicating that a rebuilt configuration file is to be stored in a certain directory. Terminal 10 then returns to block 4108 to get a next data entity. On completing processing at block 4144 terminal 10 proceeds to block 4124 to determine if there are additional data entities in the set of data entities currently being processed. Still referring to the data package 3000-6 of FIG. 3*f,* a next data entity to be processed in the ordering of the data package is encryption selection data 3020B, previously encrypted and compressed now decrypted and decompressed. In processing encryption selection data 3020B, terminal 10 will decrypt all data entities required to be decrypted by encryption selection data 3020B; namely, configuration file data set 3050-1B at block 4120 buffers configuration file data set 3050-1 in decrypted form. Terminal 10 will then return to block 4106 to recursively process the data entity built at block 4120 in the manner of the data entities of the original data package. Terminal 10 will then proceed to block 4108 to get the next data entity, namely configuration file data set 3050-1B, previously twice encrypted and once compressed now unencrypted and uncompressed. On determining at decision block 4142 that a configuration file is being handled data collection terminal 10 will proceed to block 4144 to process the configuration file. In processing the configuration file terminal may e.g., pass parameters to a WINDOWS Registry or store the file to an appropriate directory where parameter setting of the file may be accessed by a program such as a program operating a device. Also at block 4144 terminal 10 can carry out all action required of the flags and the action indicators of the configuration file data set.

Terminal 10 then returns to block 4108 to get a next data entity as determined by the ordering of the data entities in data package 3000. In that there are no data entities remaining in the set of data entities built at block 4120 a next data entity of the data package is compression selection data 3030B, previously encrypted and compressed, now unencrypted and uncompressed. In determining that compression selection data is being handled at decision block 4130, terminal 10 proceeds to block 4134 to decompress all data entities required to be decompressed by compression selection data; namely, file data set 3050 of data package 3000-6 and builds a data entity at block 4135 (the decompressed version of file data set). Terminal 10 then proceeds to block 4106 to recursively process the data entity built at block 4135 in the manner of the original data package and then proceeds to block 4108 to get the next data entity of data package 3000-6; namely file data set 3050, previously once encrypted and twice compressed, now unencrypted and uncompressed. On determining that a file data set 3050 is being handled at decision block 4146 terminal 10 proceeds to block 4148 to process the file data set 3050. At block 4148 terminal 10 can carry out the action of the action indicators of the file data set. Namely, terminal 10 can store a file corresponding to file data of the file data set at a specified directory of terminal or may carry out another action indicator of file data set 3050, such as delete the file from the buffer memory, or execute the file if the execute file flag is raised.

Terminal 10 then returns to block 4108 to get the last data entity of data package 3000-6, namely command data set 3040 previously compressed and encrypted now decompressed and decrypted. On determining that a command data set is being handled at block 4138 data collection terminal 10 proceeds to block 4138 to execute the command. If a data package 3000 includes a data entity comprising user defined data other than file data or command data, data collection terminal 10 in determining that such a data entity is present (block 4150) can proceed to block 4145 to pass the user defined data to a defined process. Such user defined data can be e.g., a predetermined text message for display on display 32 which is not formatted in any file format. Terminal 10 can be configure so that on recognizing that a data entity is user-defined data not corresponding to any file or any command, terminal 10 at block 4154 initiates an application to process the user-defined data (e.g., display a message on display 32).

It is seen that the processing described in relation to the flow diagrams of FIGS. 4a and 4b are recursive; that is, where a data package that is processed includes more than one set of encryption selection data and more than one set of compression selection data, data collection terminal 10 will recursively execute decryption and decompression processes the number of times that is necessary to completely decrypt and decompress each file data set, each command data set and each user defined data set of the data package. In certain instances, as in the example described in connection with FIGS. 4a and 4b with reference to data package 3000-6 where data of a data package has multiple levels of encryption and multiple layers of compression, data collection terminal 10 can recursively decrypt data of a data package previously subject to decryption and can recursively decompress data of a data package previously subject to decompression. The processing is recursive for the further reason that at several times during the processing, sets of one or more data entities are built and applied to a common process in the manner of the data entities of the original data package.

Figure 3H:
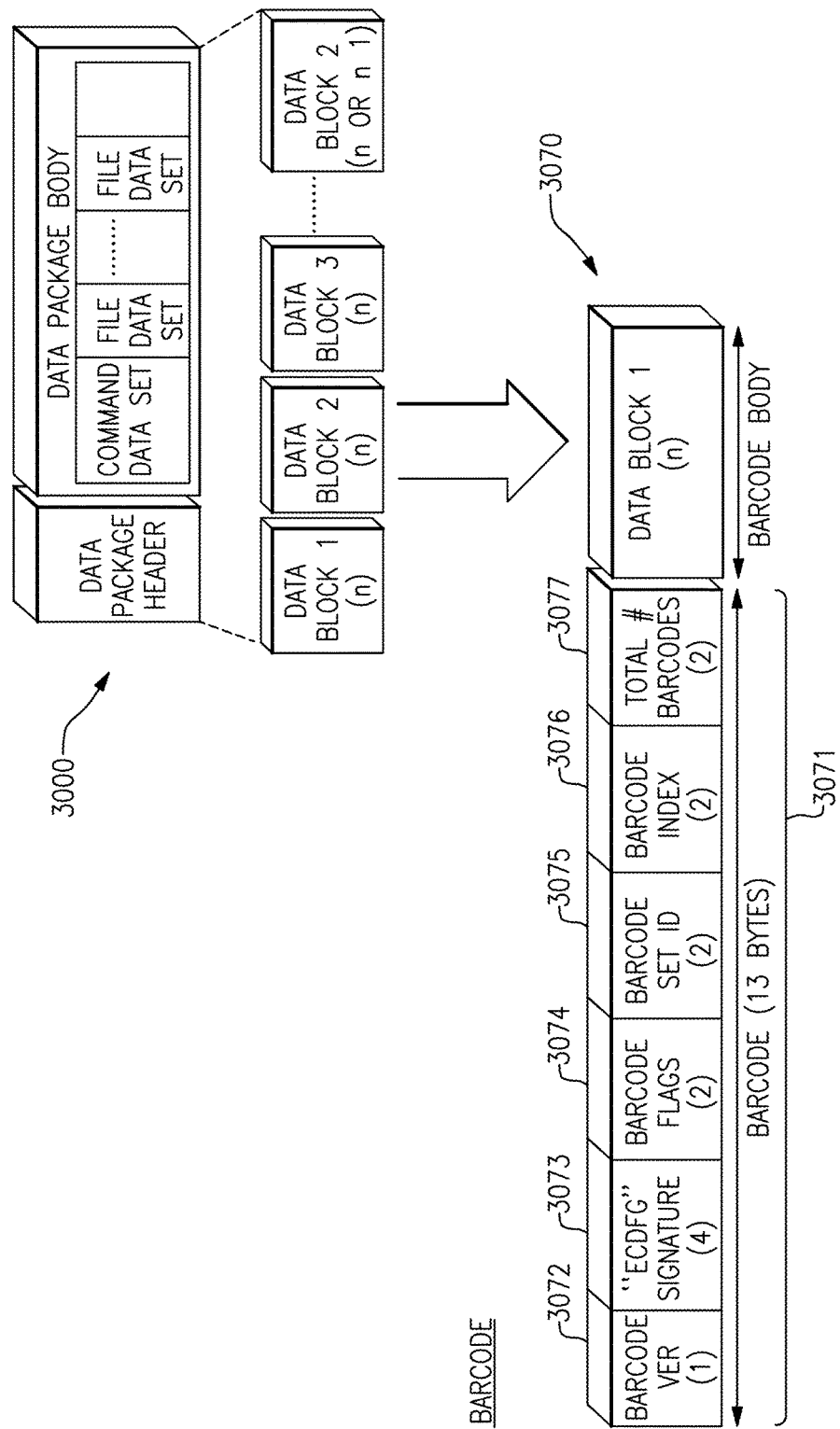
FIG. 3h illustrates a header application process that can be carried out by a host computer when the host computer encodes a plurality of bar code symbols of a bar code symbol set.

When receiving a data package by way of decoding a dataform including a plurality of parts, such as a dataform including a plurality of bar code symbols, data collection terminal 10 can assemble fields corresponding to each part in an ordering appropriate to rebuild the data package. Referring now to FIG. 3h, operation of host computer 100 in accordance with encoding module 5012 when a dataform includes multiple bar code symbols required for encoding or selected for encoding is described. When host computer 100 determines that multiple bar code symbols are required for encoding or have been selected for encoding host computer 100 divides the data of data package 3000 into M equal portions where M is the number of bar code symbols to encode. Host computer 100 can attach a bar code header 3071 to each of the M data blocks. Field 3072 of header 3071 indicates bar code version, field 3073 includes an ECDFG signature, field 3074 includes the status of bar code flags as are controlled by input into the graphical user interface display screen of FIG. 5, field 3075 includes a bar code set ID, field 3076 includes a bar code index, i.e., which bar code of the present bar code is the present bar code, and field 3077 includes the number M, the number of bar code symbols in the present bar code symbol set. Further aspects of the graphical user interface display screen of FIG. 5, and other GUIs that can be incorporated in system 1000 are described herein. Referring to FIG. 6, characteristics of an output interface module of data collection terminal 10 are described. Data collection terminal 10 may display a status window indicating the status of processing being performed by data collection terminal 10 respecting the received data package. As indicated by FIG. 6, data collection terminal 10 can display in accordance with and output interface module graphical user interface window 6032. Graphical user interface window 6032 displays at area 6002 which bar code symbol of a present bar code symbol set is being read or has recently been read. Device 10 in window 6004 may display such data as data indicative commands currently being executed by data collection terminal 10. At area 6010 a user of system 1000 may check on a log parameter. At area 6012 a user may click on a save local copy parameter. At area 6014 a user may click on and accept an unsecured parameter. At area 6116 a user may click on an illumination parameter.

Figure 5:
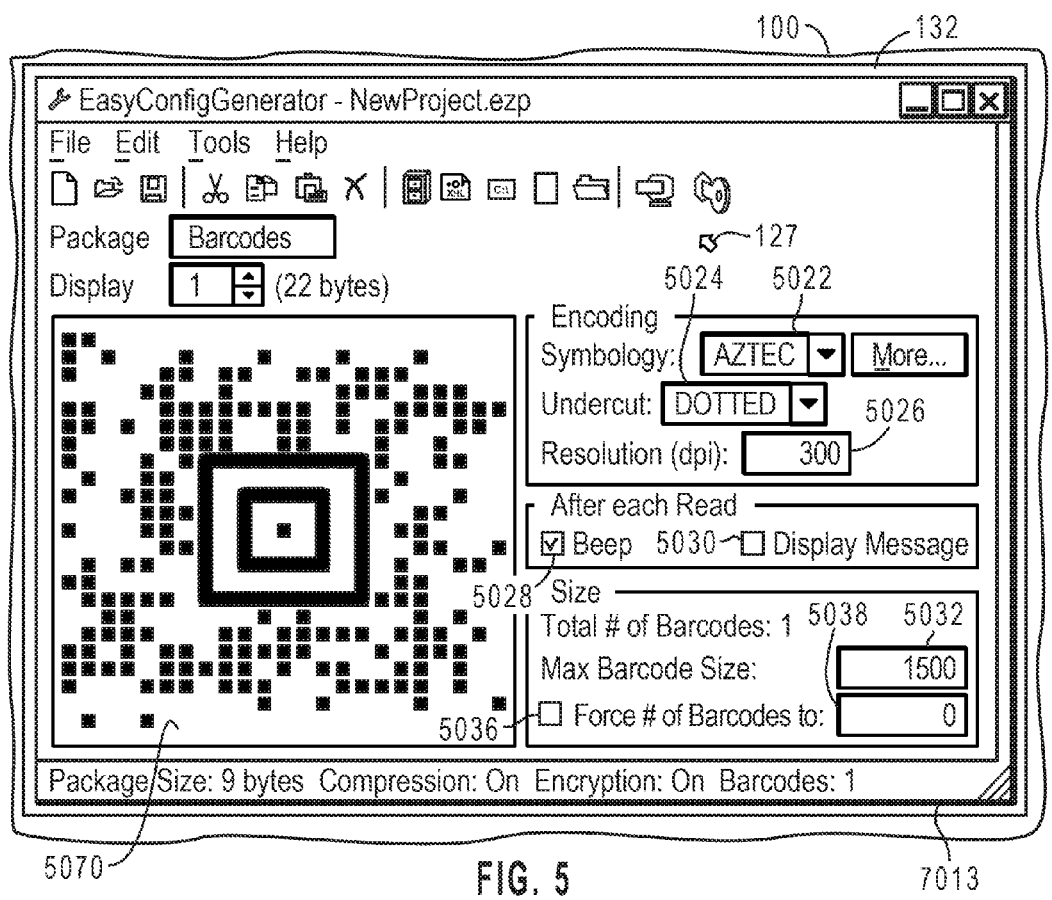
FIG. 5 is a screen shot showing a graphical user interface display screen that can be displayed at a host computer when a host computer encodes a dataform comprising one or more bar codes.
Figure 6:
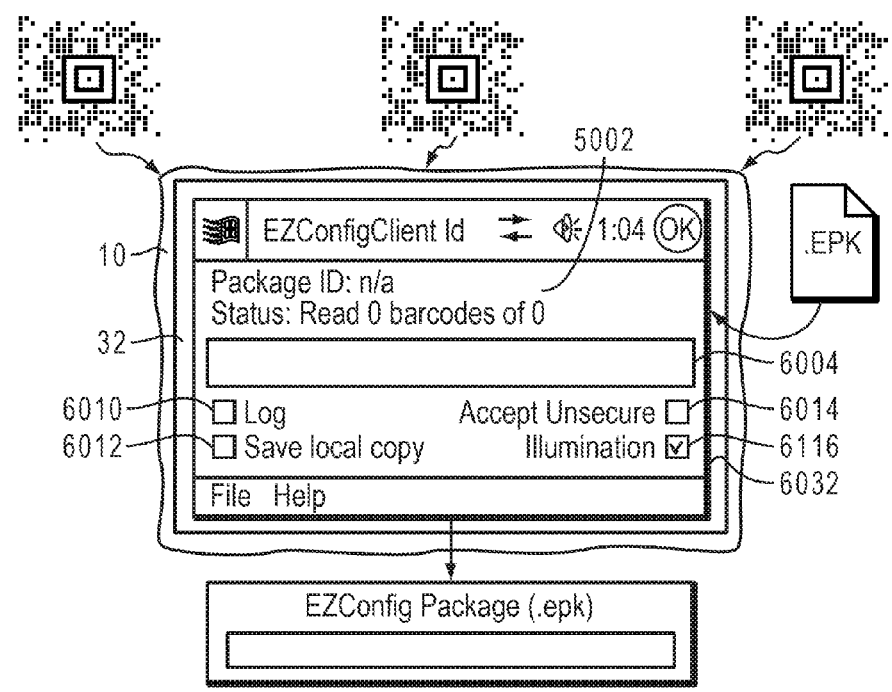
FIG. 6 is a screen shot showing a graphical user interface display screen that can be displayed by a data collection terminal on a display thereof when a data package is being decoded.

With further reference to the screen shot view of FIG. 5, host computer 100 displays on display 132 a bar code that is encoded by encoder 5012. Referring to further aspects of the graphical user interface window 7013 shown in FIG. 6a, data entry field 5022 can be used to designate the symbol type to be encoded by encoder 1026. Data entry field 5024 can be used to select an "undercut" flag and data entry field 5026 can be utilized to select a "resolution" action indicator. Data entry field 5028 can be used to indicate whether data collection terminal 10 when reading the encoded symbol is to emit a beep via audio output device 33 and data entry field 5030 when checked on results in host computer 100 building a flag into an encoded data package indicating that data collection terminal 10 is to display decoded out message data on decoding. In data entry field 3052 a user can designate a maximum bar code size for a bar code symbol to be encoded and utilizing data entry fields 3036 and 5038 a user of system 1000 can indicate whether the user would like to force the number of bar codes created to a fixed number. If an user of system 1000 checks on data entry field 5036 to indicate that there will be a specific number of bar codes encoded, the user may utilize data entry field 5038 to indicate the number (e.g., 2, 4, 10, N) of bar codes (bar code symbols) that are to be created by the bar code encoding process carried out by host computer 100 in accordance with encoding module 5012. As data of the data entry fields is changed by a user, host computer 100 automatically encodes a new bar code symbol or a new set of bar code symbols in accordance with the newly selected action indicators and host computer 100 automatically displays a first of the newly encoded symbols in display area window 5070 of graphical user interface window 7013. Host computer 100 can also be made to display in areas 5070 each symbol of a set of symbols in succession (i.e., one after another) at a common location of display 132. One or more data collection terminals can be positioned to read the successively displayed bar codes displayed at the common location. Thus, multiple bar codes can be read at high speed without movement of data collection terminal 10. A data package file 3000 can be transferred to a data collection terminal 10 by reading the bar code symbol or symbols displayed on display 132 using the data collection terminal 10. The one or more symbols can be read by data collection terminal 10 when the symbols are displayed on display 132, or when symbols have been printed on a transportable medium.

When a file rebuilt at data collection terminal 100 is an extensible markup language configuration file, data collection terminal 10 in accordance with parser module 5042 can utilize the file to reconfigure a subsystem of data collection terminal 10. In utilizing a configuration file to reconfigure a subsystem of data collection terminal 10 data collection terminal 10 can utilize the configuration file to reconfigure a device of data collection terminal 10 such as a bar code reader device 14 or a radio transceiver device 62 or another device. Data collection terminal 10 can reconfigure a device with use of a configuration file, for example, by (i) parsing a parameter setting of the file and passing the parameter to a hardware component associated with the device without modifying a program running the device; (ii) parsing a parameter setting of the file and passing the parameter to a program controlling operation of the device; (iii) parsing the parameter setting and passing the parameter setting to a file (such as an INT or Reg file) that is accessed by a program running the device; (iv) parsing the parameter setting and passing the parameter to a memory location other than a file memory location (such as WINDOWS Registry or a device memory, i.e., a register) that is accessed by a program running the device, the program being run by a processor of the terminal or of the device; or (v) retaining the configuration file in such manner that parameter settings of the file are accessed by a program running the device. In a specific example with reference to (iv) above a driver parameter setting can be parsed from a configuration file and can be passed to a Registry, where it is accessed by a driver. Data collection terminal 10 can also utilize a configuration file to reconfigure a subsystem of data collection terminal 10 by utilizing a configuration file to reconfigure a program of device 10 without affecting operation of a device of terminal 10. For example, in one embodiment, data collection terminal 10 can parse a parameter setting and pass the parameter setting to a WINDOWS Registry, for access by the operating system or by another program (system or application level) where access of the parameter does not result in control of operation of a device being affected. The term "WINDOWS Registry" herein is used to refer to the Registry of any computer having an operating system in the WINDOWS family of operating systems, e.g., WINDOWS XP, WINCE, etc.

VI. Communication Networks

Figure 2A:
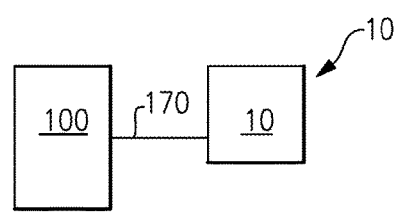
FIG. 2a is a schematic diagram of a system, a host computer, and data collection terminal connected via a serial wireline cable.
Figure 2B:
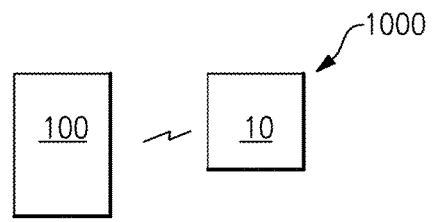
FIG. 2b is a schematic view of a system wherein a host computer and data collection terminal are in wireless point to point communication with one another.
Figure 2C:
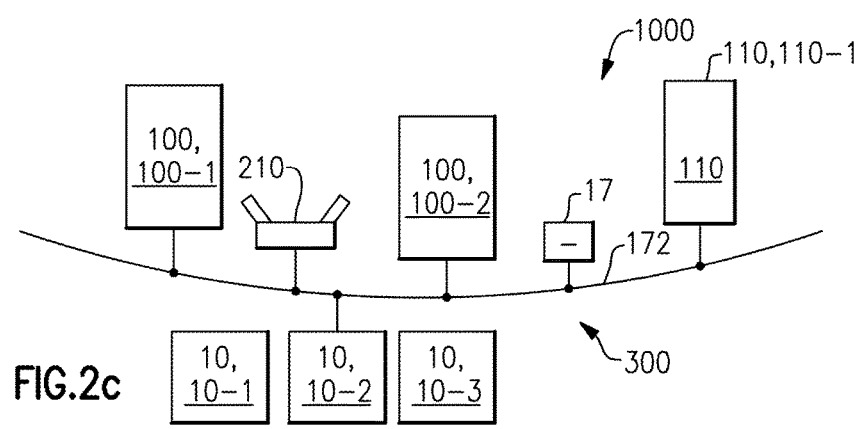
FIG. 2c is a schematic diagram of a system having a host computer building a data package, and a data collection terminal designated to receive the data package are incorporated into a local area network that includes a wireless access point.
Figure 2D:
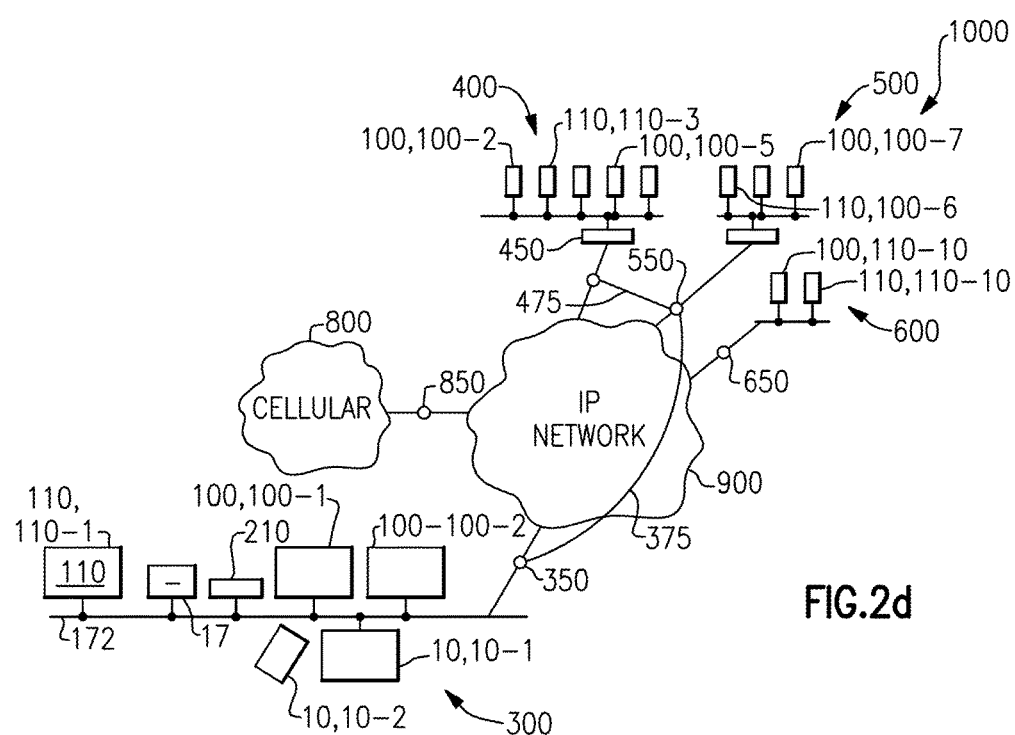
FIG. 2d is a schematic diagram illustrating a system wherein a host computer building a data package can be a remote host computer located miles to thousands of miles away from the data collection terminal designated to receive the package and wherein the host computer and the data collection terminal receiving a data package can be in communication with one another over a wide area IP network or non-IP network.

Referring now to FIGS. 2a through 2d, various technologies for providing communication between host computer 100 and terminal 10 are described. Referring to FIG. 2a, host computer 100 and data collection terminal 10 can be in communication by way of a serial cable 170, e.g., an RS 232 cable keyboard wedge, USB cable or an ETHERNET cable. Data packages can be transmitted from host computer 100 to data collection terminal 10 over serial cable 170 utilizing a higher layer protocol (e.g., FTP or lower layer protocol EG ETHERNET over USB). Referring to FIG. 2b, host computer 100 can send data package 3000 to data collection terminal 10 utilizing a pair of wireless transceivers. For example, host computer 100 and data collection terminal 10 can each incorporate the Bluetooth radio transceiver for providing point to point wireless data communications or 802.11 radio transceivers, in an ad hoc data communication mode for providing point to point data communications between host computer 100 and terminal 10. Higher layer protocols (e.g., the File Transfer Protocol, FTP) can be utilized to transfer data packages from host 100 to data collection 10 in the arrangement shown in the wireless point to point arrangement shown in FIG. 2b. ACTIVESYNC software available from MICROSOFT, INC. can be integrated in host 100 and data collection terminal 10 to provide synchronization between host computer 100 and data collection terminal 10. ACTIVESYNC facilitates data communication over a range of physical communication links, e.g., USB, ETHERNET, 802.11 and IrDA. An FTP data communication session is a selectable option facilitated using ACTIVESYNC. However, non-IP based data communications are also supported using ACTIVESYNC. Referring to FIG. 2c, host computer 100 and data collection terminal 10 can be part of a common local area network 300 having an ETHERNET backbone 1720 and an 802.11 access point 210 and printer 17 connected to ETHERNET backbone 172. All of the apparatuses, 10-1, 10-2, 10-3, 210 and 17 can be allocated IP addresses and each of the apparatuses can be configured to conduct data communications utilizing the TCP/IP protocol stack. Accordingly, where the host computer 100 that builds data package 3000 is host computer 100-1 as shown in FIG. 2c, host computer 100-1 and data collection terminal 10 is data collection terminal 10-1 in wireless communication with access point 210, data packets containing data of data package 3000 may be transmitted utilizing the file transfer protocol over the hop sequence 100-1, 210, 10-1. If the designated data collection terminal is data collection terminal 10-2, the hop sequence for data communication before an FTP file transfer can be the hop sequence 100-1, 210, 10-2 wherein access point 210 and data collection terminal 10-2 are wireline connected via wireline bus 172. Referring to the view of FIG. 2d, a host computer 100 that builds data package 3000 can be a remote host computer located miles to thousands of miles from the facility at which the designated data collection terminal 10 is located. Where system 1000 includes a remote host computer 100, e.g., computer 100-5 that builds data package 3000, and a data collection terminal 10 receiving a data package is at a location of local area network 300, system 1000 can be operated by two users; namely, one user at a location of a remotely located network 400 and a second user at a location of local area network 300. Of course, system 1000 can have more than one user implemented entirely using local area network 300. When host computer 100 of system 1000 is local device 100-1, and data collection terminal 100 is local terminal 10-1, files selected for packaging in data package 3000 can be located in a remote computer, e.g., computer 100-5, 110-6, 100-10. Referring further to the view of FIG. 2d, data collection system 1000 can include a plurality of local area networks local area network 300, which may be located at e.g., at a retail store, a hospital or other patient care center, or a shipping distribution center, local area network 600, server center 500, and server center 400. Networks 300, 400, 500, and 600 may be physically located miles to thousands of miles away from one another. As indicated in the view of FIG. 2d, networks 300, 400, 500, 600 can be in communication with one another over IP network 900 which, in one embodiment, is the Internet. Local area network 600 and/or server center 500 can be network owned and operated by a supplier of data collection terminal 10, e.g., a manufacturer or distributor of data collection terminal 10. Suitable gateways 350, 450, 550 and 650 are provided between the various local networks and IP network 900. In addition, cellular network 800 which can be a GSM/GPRS network can support data communications over the TCP/IP protocol stack. Cellular network 800 can be in communication with IP network 900 via gateway 850. Host computer 100 and data collection terminal 10 can be in communication with base stations of cellular network 800 via cellular transceiver 186 and cellular transceiver 68, respectively. In accordance with system 1000 in one illustrative embodiment, the host computer that builds data package file 3000 for transferring to data collection terminal 10 is host computer 100-5 at server center 400 and the data collection terminal 10 designated to receive the data package is terminal 10-1, at a location of local area network 300. Local area network 300 can be integrated at e.g., a data collection facility such as a shipping distribution center, a retail store, a hospital or a patient care center. In such an illustrative embodiment, data collection terminal 10 and host computer 1050 can be controlled to send a data package built by host computer 10-5 to data collection terminal 10-1 over a path that includes gateway 350 and which utilizes the File Transfer Protocol ("FTP"). Host computer 100-5 in the illustrative embodiment can also be controlled to send the data package 3000 to data collection terminal 10-1 over a data communication path that includes cellular network 800, e.g., a direct cellular network data communication or a data communication over a path that includes gateway 450, IP network 900, gateway 850 and cellular network 800, or a path that includes access point 210, gateway 350, IP network 900, gateway 850, and cellular network 800.

VII. Building of Extensible Markup Language Configuration Data and Data Packages Including Configuration Data Further aspects of system 1000, and particularly of the manner in which host computer 100 can be used to build extensible markup language configuration data, are described in reference to the XML document shown in Table 1 and the screen shots of FIGS. 7a-7l. In Table I, data of an exemplary XML configuration document file, when opened by a text editor is shown. Table 1 and FIGS. 7a through 7l illustrate a method and apparatus whereby an XML document file with use of host computer 100 can be built. In one method, a configuration file can be built by editing an existing configuration file and them transferring in whole or in part the edited configuration file to data collection terminal 10. An illustrative XML document file (shown in a form when opened by a text editor) for use in configuring devices of data collection terminal 10 is shown in Table 1 herein below:

TABLE 1

```
<?xml version="1.0"?>
<ConfigDoc flags="16" desc="Configuration File for general device settings."
name="DeviceConfig">
    <HHPReserved>
        <Key name="EditorVersion">1.0.0</Key>
        <Key name="RunAppName">\program files\power tools\deviceconFig.exe</Key>
    </HHPReserved>
    <Section flags="16" desc="Connection Settings" name="Connections">
        <Section flags="17" desc="Beam settings" name="Beam">
            <Key flags="17" desc="Enables or disables receipt of incoming infared data. If set to 1,
incoming infared data will be enabled:
0 - Disable
1 - Enable"
name="Enable">1</Key>
        </Section>
        <Section flags="16" desc="Radio Manager settings" name="Radio Manager">
            <Section flags="17" desc="802.11b radio settings" name="802.11b">
                <Key flags="17" min="0" max="1" desc="Turn the radio Off/On. If On, the 802.11b
Radio will be turned off automatically.
0 = Off
1 = On"
name="Enable">0</Key>
                <Key flags="17" desc="Security ID used to connect to network. Set to any = connect to
any network." name="SSID">
                </Key>
                <Key flags="17" min="1" max="3" desc="Specifies the power save mode:
1 =
Disable ( Power save mode is not used)
2 = Always On (Radio is powered
constantly)
3 = AutoEnable. In this mode, EPSParm defines radio vs battery
performance" name="PowerMode">1</Key>
                <Key flags="17" min="1" max="10" desc="When PowerMode is set to 3 (Auto Enable),
this parameter specifies the radio vs. battery performance. Takes a value between 1 and 10,
where:
1=Best Radio Performance
10=Best Battery Life
"
name="EPSParm">1</Key>
                <Key flags="17" min="0" max="2" desc="0 = AdHoc
1 = Infrastructure
2
= Pseudo-Adhoc" name="NetworkType">1</Key>
                <Key flags="17" min="1" max="15" desc="Transmission Rate:
1 = 1
Mb
2 = 2 Mb
3 = Auto 1/2 Mb
4 = 5.5
Mb
8 = 11 Mb
15 = Fully Auto" name="TxRate">15</Key>
                <Key flags="17" min="1" max="11" desc="Channel (1-11) of the RF adapter. Generally
only used with the "ad hoc" Network mode" name="Channel">10</Key>
                <Key flags="17" min="0" max="1" desc="0/1: Enable/Disable DHCP. When enabled,
the IP address for the radio interface will be requested from a DHCP server. When disabled,
the static address provided in IPAddress will be used instead." name="DHCP">1</Key>
                <Key flags="17" desc="Static IP address (a.b.c.d) for the radio interface. Used when
DHCP setting is disabled (set to 0)" name="IpAddress">
                </Key>
                <Key flags="17" desc="SubNet mask (a.b.c.d) used for the static IP address when
DHCP is disabled" name="SubnetMask">
                </Key>
                <Key flags="17" desc="Default Gateway IP (a.b.c.d) address used when DHCP is
disabled" name="DefaultGateway">
                </Key>
                <Key flags="17" desc="DNS (Domain Name Server) IP Address used when DHCP is
disabled" name="DNS">
                </Key>
                <Key flags="17" desc="Domain name (xxx.yyy) for the device, when DHCP is
disabled" name="Domain">
```

TABLE 1-continued

```
                </Key>
                <Key flags="17" desc="WINS (Windows Name Server) IP Address used when DHCP is disabled" name="WINS">
                </Key>
                <Section flags="17" name="WEP">
                    <Key flags="17" desc="Indicates the authentication mode to use:
0 = Open (WEP keys are not used to establish link)
1 = Shared (Uses WEP keys to establish link)
2 = Automatic (autodiscriminates between Open and Shared)" name="Authentication">0</Key>
                    <Key flags="17" desc="Indicates the encryption mode to use::
0 = No Encryption
1 = WEP 64-bit RC4 encryption
2 = WEP 128-bit RC4 encryption" name="Encryption">0</Key>
                    <Key flags="17" min="1" max="4" desc="Indicates which WEP key to use to encrypt transmitted data:
Min = 1
Max = 4
" name="ActiveKey">1</Key>
                    <Key flags="48" desc="Value for the WEP key 1:
If ASCII: Use quotes for the value (i.e: ″hello″). 
If Hex: Type the pair of hex values in a row (i.e: AFB0FF415A)
For 64-bit encryption, length must be 5 characters or 5 hex pairs.
For 128-bit encryption, length must be 13 characters or 13 hex pairs.
" name="Key1">MP8kKUDbgo8=</Key>
                    <Key flags="48" desc="Value for the WEP key 2:
If ASCII: Use quotes for the value (i.e: ″hello″). 
If Hex: Type the pair of hex values in a row (i.e: AFB0FF415A)
For 64-bit encryption, length must be 5 characters or 5 hex pairs.
For 128-bit encryption, length must be 13 characters or 13 hex pairs.
" name="Key2">MP8kKUDbgo8=</Key>
                    <Key flags="48" desc="Value for the WEP key 3:
If ASCII: Use quotes for the value (i.e: ″hello″). 
If Hex: Type the pair of hex values in a row (i.e: AFB0FF415A)
For 64-bit encryption, length must be 5 characters or 5 hex pairs.
For 128-bit encryption, length must be 13 characters or 13 hex pairs.
" name="Key3">MP8kKUDbgo8=</Key>
                    <Key flags="48" desc="Value for the WEP key 4:
If ASCII: Use quotes for the value (i.e: ″hello″). 
If Hex: Type the pair of hex values in a row (i.e: AFB0FF415A)
For 64-bit encryption, length must be 5 characters or 5 hex pairs.
For 128-bit encryption, length must be 13 characters or 13 hex pairs." name="Key4">MP8kKUDbgo8=</Key>
                </Section>
            </Section>
            <Section flags="17" desc="Bluetooth radio settings" name="Bluetooth">
                <Key flags="17" min="0" max="1" desc="Disable/Enable the Bluetooth Radio. If set to 1, the GSM radio will be turned off automatically.
0 = Off
1 = On" name="Enable">0</Key>
                <Section flags="17" desc="Bluetooth Printer to create as default (favorite)" name="Default Printer">
                    <Key flags="17" desc="Bluetooth hex MAC Address of the printer (ie: 00.80.37.1a.25.02)" name="Address">
                    </Key>
                    <Key flags="17" desc="Hex value of the printer serial service to use (i.e: 1101)" name="Service">
                    </Key>
                    <Key flags="17" desc="Device name (ie: MH0355)" name="DeviceName">
                    </Key>
                </Section>
            </Section>
            <Section flags="17" desc="GSM/GPRS radio settings" name="GSM">
                <Key flags="17" min="0" max="1" desc="Turn the radio Off/On. If On, the 802.11b Radio will be turned off automatically.
0 = Off
1 = On" name="Enable">0</Key>
                <Key flags="17" desc="Set the Access Point name. Default=ISP.CINGULAR." name="APN">ISP.CINGULAR</Key>
                <Key flags="17" desc="Set the IP Address. Leave blank fro dynamic IP allocation." name="IpAddress">
                </Key>
                <Key flags="17" desc="Set the protocol. Default=IP
" name="Protocol">IP</Key>
            </Section>
        </Section>
        <Section flags="17" desc="ActiveSync settings" name="ActiveSync">
            <Key flags="17" min="0" max="1" desc="Disable/Enable automatic connection when docked. If set to 1, a connection will automatically be esablished:
0 = Off
1 = On" name="AutoConnect">1</Key>
            <Key flags="17" desc="Specify connection to use when docked:
 USB Connection
 115200 Default
 19200 Default
 38400 Default
 57600 Default" name="Connection"> USB Connection</Key>
        </Section>
    </Section>
    <Section flags="16" desc="System Settings" name="System">
        <Section flags="17" desc="About Settings" name="About">
            <Key flags="17" desc="Specify the device name.
Note: This setting will be over written if SetDeviceInfo is executed after DeviceConFig.

*IMPORTANT NOTICE (RESTRICTIONS)*
1 - The DeviceName must begin with a letter.
2 - The DeviceName cannot exceed 15 characters in length."
```

TABLE 1-continued

```
name="DeviceName">ID[SERIALNUMBER][MODELNUMBER]</Key>
            <Key flags="17" desc="Specify the device description.
Note: This setting will be
over written if SetDeviceInfo is executed after DeviceConFig."
name="DeviceDescription">Dolphin 9500</Key>
        </Section>
        <Section flags="16" desc="Power Management Settings" name="Power Management">
            <Section flags="16" desc="Backlight Settings" name="Backlight">
                <Section flags="17" name="Battery">
                    <Key flags="17" desc="Specifiy the Backlight timeout in seconds. Specify 0 to
disable. This setting is only used when the device is on battery power." name="Timeout
(Off)">60</Key>
                    <Key flags="17" desc="Specifiy the Backlight dim timeout in seconds. Specify 0 to
disable. This setting is only used when the device is on battery power. " name="Timeout
(Dim)">0</Key>
                    <Key flags="17" desc="Specifiy the Backlight intensity. Specify 0 to turn the
backlight off. This setting is only used when the device is on battery power. "
name="Intensity">8</Key>
                    <Key flags="17" min="0" max="1" desc="Enable or disable Auto On: 
0 =
Disable
1 = Enable
 Turns the Backlight on when a key is pressed or the screen
is touched. This setting is only used when the device is on battery power:" name="Auto
On">1</Key>
                </Section>
                <Section flags="17" name="External">
                    <Key flags="17" desc="Specifiy the Backlight timeout in seconds. Specify 0 to
disable. This setting is only used when the device is on external power" name="Timeout
(Off)">0</Key>
                    <Key flags="17" desc="Specifiy the Backlight dim timeout in seconds. Specify 0 to
disable. This setting is only used when the device is on external power. " name="Timeout
(Dim)">0</Key>
                    <Key flags="17" desc="Specifiy the Backlight intensity. Specify 0 to turn the
backlight off. This setting is only used when the device is on external power. "
name="Intensity">8</Key>
                    <Key flags="17" min="0" max="1" desc="Enable or disable Auto On: 
0 =
Disable
1 = Enable
 Turns the Backlight on when a key is pressed or the screen
is touched. This setting is only used when the device is on external power." name="Auto
On">1</Key>
                </Section>
            </Section>
            <Section flags="17" desc="Power Button Settings" name="Power Button">
                <Key flags="17" min="0" max="1" desc="Enables or disables the device power
button:
0 = Disable
1 = Enable" name="Enable">1</Key>
            </Section>
            <Section flags="16" desc="Power Settings" name="Power">
                <Section flags="17" name="Battery">
                    <Key flags="17" desc="Specifiy the device suspend timeout in seconds. Turns device
off it is not used for the specified number of seconds. Specify 0 to disable. This setting is
only used when the device is on battery power." name="Timeout">60</Key>
                    <Key flags="17" name="Timeout (Resume)">0</Key>
                </Section>
                <Section flags="17" name="External">
                    <Key flags="17" desc="Specifiy the device suspend timeout in seconds. Turns device
off it is not used for the specified number of seconds. Specify 0 to disable. This setting is
only used when the device is on external power." name="Timeout">0</Key>
                    <Key flags="17" name="Timeout (Resume)">0</Key>
                </Section>
            </Section>
            <Section flags="17" desc="RS232 5V Power Out Settings" name="RS232 5V Power
Out">
                <Key flags="17" min="0" max="1" desc="Enable and disable 5V power to the RS232
port:
0 = Disable
1 = Enable" name="Enable">0</Key>
            </Section>
        </Section>
        <Section flags="17" desc="Screen Settings" name="Screen">
            <Key flags="17" min="0" max="1" desc="Enables or disables ClearType
support:
0 = Disable
1 = Enable
Note: Requires device to be reset before
setting takes effect." name="ClearType">0</Key>
            <Key flags="17" min="600" max="1100" desc="Adjust the text size to see more content
or increae the readability in some programs.
 Smallest - 600
Largest - 1100"
name="TextSize">1100</Key>
        </Section>
        <Section flags="17" desc="Shell Settings" name="Shell">
            <Key flags="17" min="0" max="6" desc="Enable or disable the Start Menu
application:
0 = Disable
6 = Enable
Note: Requires device to be reset
before setting takes effect." name="StartMenuAnimation">6</Key>
        </Section>
        <Section flags="17" desc="Today Screen Settings" name="Today Screen">
            <Key flags="17" min="0" max="1" desc="Enable or disable Today Screen items:
0
= Disable
1 = Enable
" name="Enable">1</Key>
            <Key flags="17" desc="The number of hours in suspend mode before the device is
forced to the Today Screen when turned on.. Specify 0 to disable."
```

TABLE 1-continued

```
name="Timeout">4</Key>
        </Section>
        <Section flags="17" desc="Volume Settings" name="Volume">
            <Key flags="17" min="0" max="1" desc="Enables or disables keyboard clicks:
0 =
Disable
1 = Enable" name="Keyboard">1</Key>
            <Key flags="17" min="0" max="1" desc="Enables or disables screen clicks:
0 =
Disable
1 = Enable" name="Screen">1</Key>
            <Key flags="17" min="0" max="65535" desc="Sets the volume level. 0 to disable,
65535 for max volume:
Min = 0
Max = 65535" name="Volume">65535</Key>
        </Section>
        <Section flags="17" desc="Welcome Screen Settings" name="Welcome Screen">
            <Key flags="17" min="0" max="1" desc="Enable or disable showing the Welcome
Wizard after a cold boot (includes set time & date, and screen recalibration)
0 =
Disable
1 = Enable" name="NoWelcome">0</Key>
        </Section>
    </Section>
    <Section flags="16" desc="Application Settings" name="Applications">
        <Section flags="17" desc="Mobile System Manager (MSM) client settings"
name="MSM">
            <Key flags="17" desc="Primary address for the MSM server."
name="ServerAddressPrimary">
            </Key>
            <Key flags="17" desc="Secondary address for the MSM server."
name="ServerAddressSecondary">
            </Key>
            <Key flags="17" desc="MSM Server's port number." name="PortNumber">
            </Key>
            <Key flags="17" min="0" max="1" desc="Enable or disable SSL encryption:
0 -
Disable
1 - Enable" name="SSL">
            </Key>
            <Key flags="17" desc="Optional: Full name of the MSM configuration file to modify"
name="ConfigFile">
            </Key>
        </Section>
        <Section flags="17" desc="Internet Explorer Settings" name="Internet Explorer">
            <Key flags="17" desc="Specify the default home page for Pocket Internet Explorer."
name="Home Page">http://www.handheld.com</Key>
            <Key flags="17" min="0" max="1" desc="Enable or disable ClearType text in Internet
Explorer.
0 = Disable
1 = Enable
Note: Requires device to be reset before
setting takes effect." name="ClearTypeText">0</Key>
        </Section>
    </Section>
</ConfigDoc>
```

It is seen that the XML document of Table 1 includes a plurality of nested elements wherein several of the elements have one or more attributes. It is seen the root element has the start tag:

```
<ConfigDoc flags="16" desc="Configuration File for general device
settings."
name="DeviceConfig"> (Note 1.0)
```

Further, child elements include elements having the start tags:

```
<ConfigDoc flags="16" desc="Configuration File for general device
settings."
name="DeviceConfig"> (Note 2.0)
<Section flags="16" desc="System Settings" name="System"> (Note 2.1)
```

Further, grandchild elements including the elements have the start tags:

```
<Section flags="17" desc="Beam settings" name="Beam"> (Note 3.0)
<Section flags="16" desc="Radio Manager settings" name="Radio
Manager"> (Note 3.1)
<Section flags="17" desc="Active Sync settings" name="ActiveSync">
(Note 3.2)
```

Further, great grandchild elements include elements having the start tags:

```
<Section flags="17" desc="802.11b radio settings" name="802.11b">
(Note 4.0)
<Section flags="17" desc="Bluetooth radio settings" name="Bluetooth">
(Note 4.1)
<Section flags="17" desc="GSM/GPRS radio settings" name="GSM">
(Note 4.2)
```

Further, great, great grandchild elements include the elements:

```
<Key flags="17" min="0" max="1" desc="Turn the radio Off/On.
If On, the 802.11b
Radio will be turned off automatically.
0 = Off
1 = On"
name="Enable">0</Key> (Note 5.0)
```

And the elements having the start tags:

```
<Section flags="17" name="WEP"> (Note 5.1)
<Section flags="17" desc="Bluetooth Printer to create as default
(favorite)"
name="Default Printer"> (Note 5.2)
```

One great, great, great grandchild element of the XML file of Table 1 is the element:

```
<Key flags="17" desc="Indicates the authentication mode to
use:
0 = Open
(WEP keys are not used to establish link)
1 = Shared (Uses WEP
keys to establish link)
2 = Automatic (autodiscriminates between
Open and Shared)"
name="Authentication">0</Key> (Note 6.0)
```

In the illustrative XML document file of Table 1, elements are nested in six layers. In the illustrative XML file of Table 1, each element has a plurality of attributes. Specifically, each element is defined to have a description element, "desc," and a name element, "name." Several elements also have range attributes i.e., min=1, max=10 or min=0 and max=1. Several elements also have parameter setting values (parameter settings). Parameter setting values in the XML file of Table 1 are included as simple XML text content before the end tag "</key>" of each key designated XML element.

Certain of the elements have start tags designating the elements as "section" elements and certain of the elements have start tags designating the elements as "key" elements. It will be seen that host computer 100 processes an element designated as a "section" element in a different manner than the elements designated as being "key" elements.

With further reference to the XML document file of Table 1, it is seen that several "section" elements of the XML document file include "name" attributes indicating a specific device of data collection terminal 10. For example, the XML document file of Table 1 includes an 802.11b element which has the "name" attribute "802.11b," a Bluetooth has the "name" attribute "Bluetooth," a GSM element has the "name" attribute "GSM," and a battery element has the "name" attribute "Battery."

For each of the above device specific XML elements, there are included at least one child element (one level down in hierarchy) that is designated as a "key" XML element which includes a parameter setting value that may be changed by a user using host computer 100. In the illustrative embodiment of Table 1, the parameter setting values are included as XML content just before the end tag of each "key" designated XML element. The "802.11b" element in the file of Table 1 includes the key designated child elements "Enable," "SSID," "EPSPARM," "NetworkType," "TxRate," and "Channel" among others (the XML elements are referred to by their "name" attributes). Each key designated child element has a parameter setting value that can be changed. For example, the present parameter setting value of the "Enable" element is "0," the present parameter setting value of the "SSID" element is empty and the present parameter setting value of the "EPSPARM" element is "1." Several of the key designated elements have ranges defined with uses of key element attributes.

Respecting the configuration specific element having the name attribute "Battery" corresponding to battery 96, the battery element of the Table 1 XML file has several key designated child elements, each including a parameter designated with use of simple XML text content. The child elements of the "Battery" element include a timeout parameter element including a parameter for setting a backlight timeout delay, a backlight intensity element including an XML content defined parameter for setting backlight intensity and an auto-on element including an XML content defined parameter setting value determining whether battery 96 will supply power to a backlight of display 32 when touch screen 25 is activated. All of the described parameters control an aspect of the manner in which battery 96 will operate.

Figure 7A:
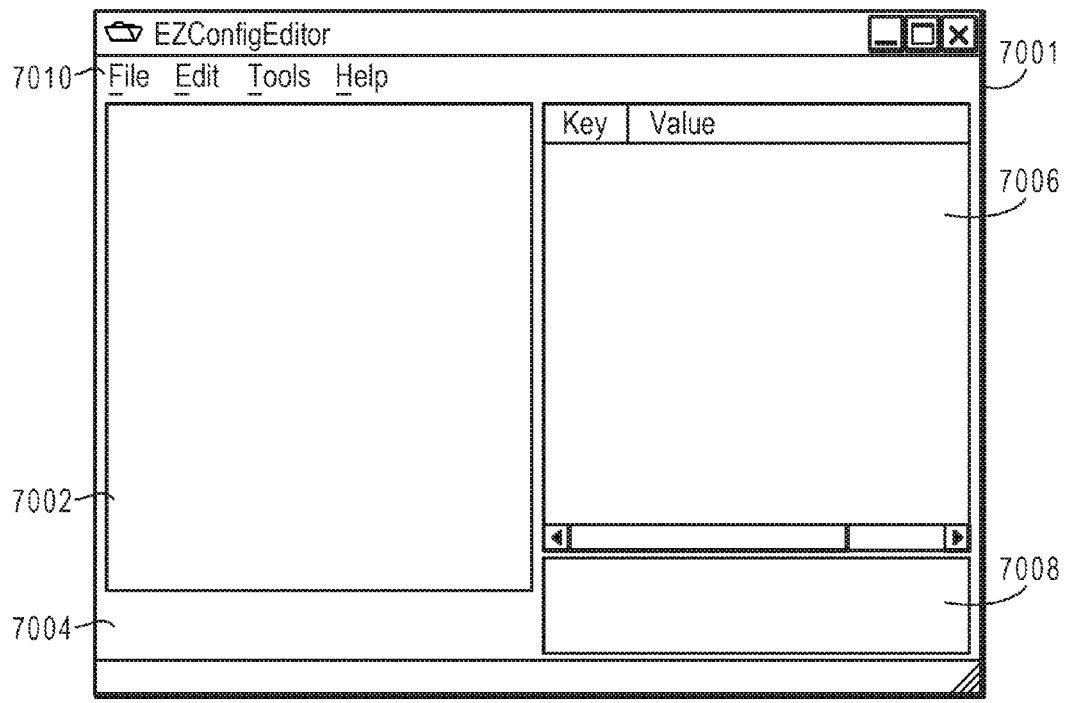

Referring to further aspects of the XML, configuration document file of Table I, the XML configuration document file can include flags designating (i.e., "flags" attributes) elements as being "enabled" or "disabled." These flags can be changed to disable or enable the elements by entering data into graphical user interface display screen window 7001 as described herein. Host computer 100 can be configured so that when a "simplify" XML flag is raised using data entry field 8868 (e.g., FIG. 7g) described herein, disabled elements are deleted from the XML document file. Description text of an XML file can also be deleted when the simplify flag is raised. Referring now to the screen shots of FIGS. 7a through 7k, operation of host computer 100 operating in accordance with XML configurator 1024 which includes an XML parser for parsing XML files such as the XML document file of Table 1 will be described. Referring to FIG. 7a, FIG. 7a shows a graphical user interface window 7001 displayed on display 132 of host computer 100 when an executable file launching XML configurator module 1024 is executed. The graphical user interface screen main window 7001 of FIG. 7a includes four windows; namely, a tree diagram window 7002, a tree comment window 7004, a parameter setting window 7006, and a parameter setting value setting comment window 7008. Parameter setting values (parameter settings) for controlling operation of a device can be set using window 7008.

Figure 7B:
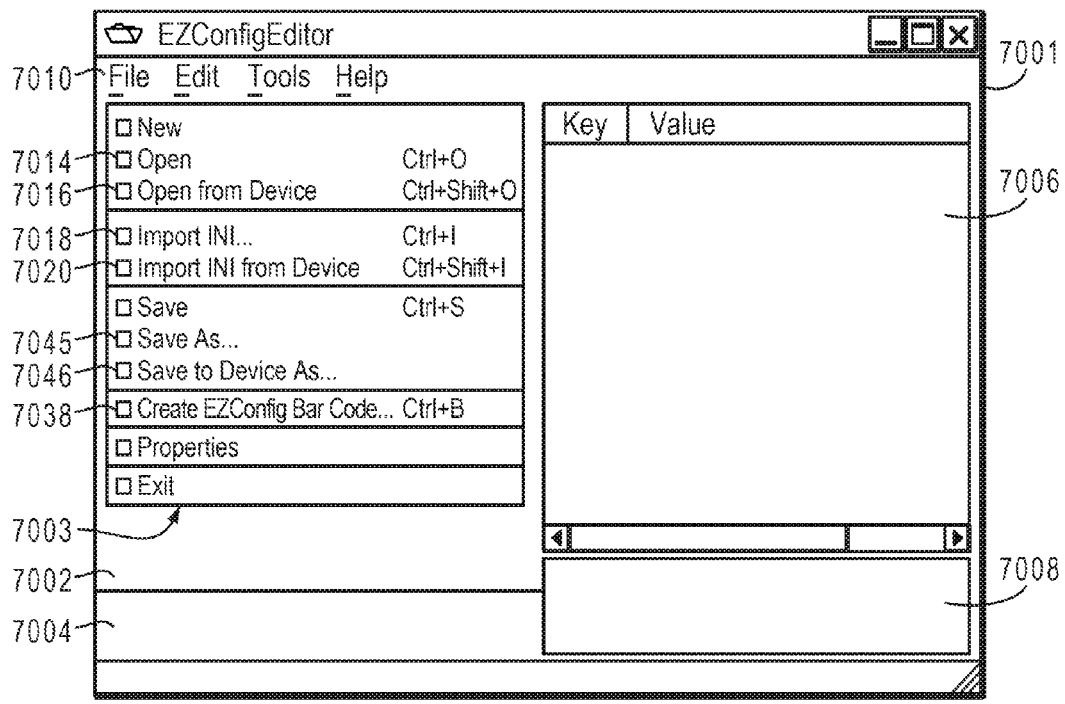

Referring to the view of FIG. 7b, FIG. 7b shows a graphical user interface window 7003 displayed on display 132 when file button 710 is clicked on. Window 7003 enables the user of system 1000 to select a starting XML document to be operated by host computer 100. Clicking on button 7014 enables selection of an XML document file. When open button 7014 is clicked on, a file selector window 7005 (FIG. 7c) is displayed on display 132 so that any file accessible within the network in which host computer 100 is incorporated can be selected. For example, any file on a hard drive 145 of host computer 100 (e.g., the host C: drive) can be selected. Also with the reference to FIG. 2d, if host computer 100 is IP connected to a plurality of remotely located local area networks such as networks 400, 500, and 600, any file stored on a remotely located local area network 400, 500, or 600 or in an external computer of local network 300 can be selected. With integration of certain software such as virtual private network (VPN) software between local network 300 and one of remote networks 400, 500, and 600 remotely located files, e.g., those stored on a computer of remote network can easily be selected with use of a file selector window 7005 as show in FIG. 7c. Referring to FIG. 2d, the XML file that is selected when button 7014 is clicked on can be a file currently stored in e.g., computer 110-1, 100-1, 100-2, 110-2, 100-5, 110-6, 100-7, 100-10, 110-10.

Referring to further aspects of the graphical user interface display screen window 7003 of FIG. 7b, clicking on a button 7016 facilitates the selection of a file currently stored on host computer 100 and data collection terminal 10. If data collection terminal 10 is already IP connected to host computer 100 and system 1000 is configured so that files on terminal 10 appear in file selector window 7005, files stored on data collection terminal 10 can also be selected by clicking on button 7014 as described previously. In a specific embodiment, button 7016 can be used to select files stored in a directory of device 10, when there is an ACTIVESYNC connection between host computer 100 and terminal 10. ACTIVESYNC is proprietary software available from MICROSOFT, INC. which provides synchronization between serially connected devices connected over, e.g., USB, ETHERNET, IR, or another serial connection.

According to system 1000, host computer 100 can also be configured to process INI files into XML format. Clicking on button 7018 imports an INI file and enables the processing of an INI file located anywhere on the network of FIG. 2*d* processed into XML format. Clicking on button 7020 enables the selection of an INI file currently stored on data collection terminal 10 processing into XML format. A program for passing parameter value settings (usually encoded as "values") of an INI file into an XML document file, can be programmed using any suitable programming language, e.g., C, C++, C#.

Figure 7C:
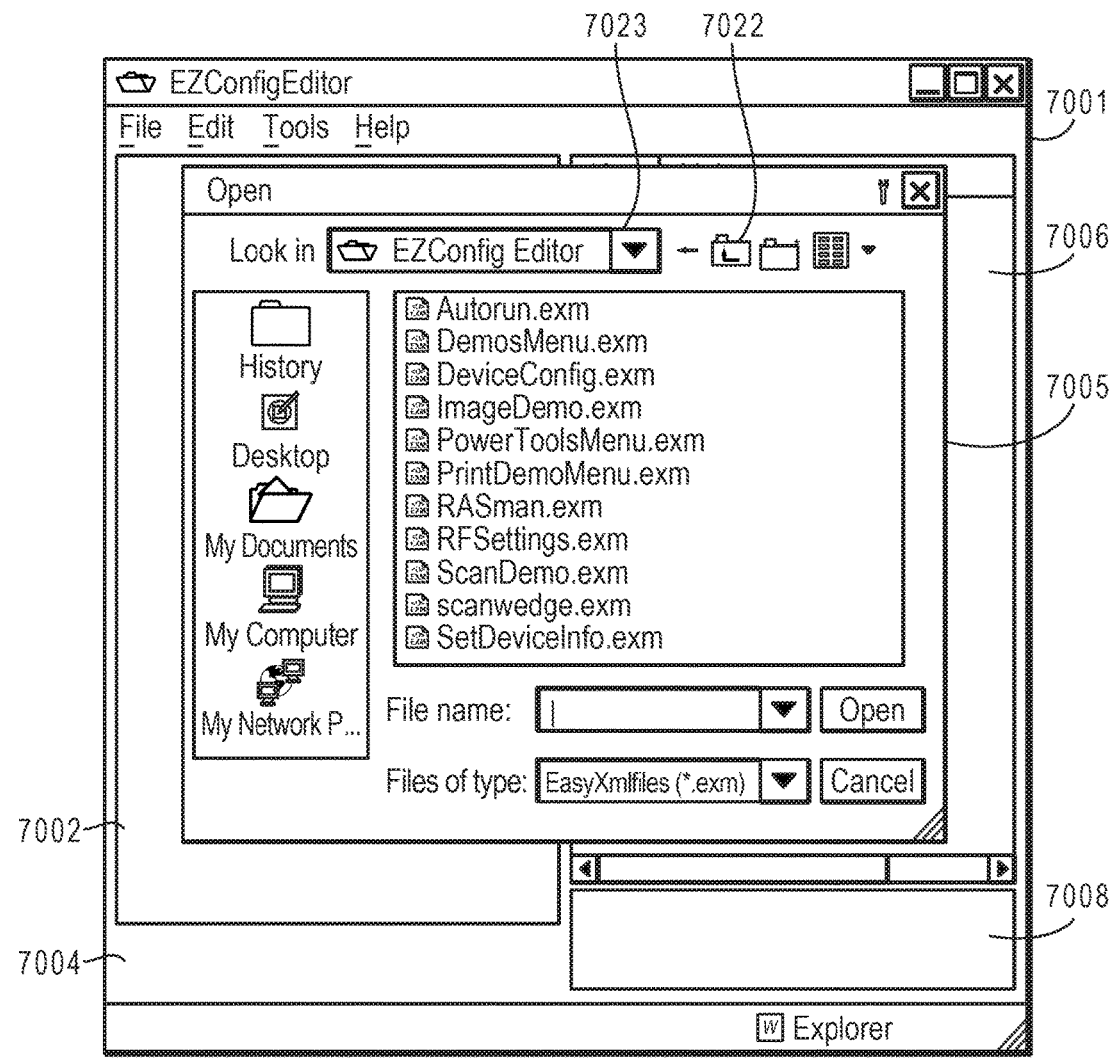

Referring to FIG. 7*c*, a file selector graphical user interface display screen window 7005 is shown in the state after open button 7014 as shown in FIG. 7*b* is clicked on. Referring to FIG. 7*c*, system 1000 can be configured so that when button 7014 is clicked on, XML files stored in a specific directory for holding such files are automatically displayed. It is noted that a set of specially developed XML files, specially developed for use in system 1000 are displayed in the screen display of FIG. 7*c* the XML files displayed all have the extension ".EXM". It is understood that XML files can be given any extension including the extension ".XML" commonly given to XML files. However, giving the XML files extensions other than "XML" specially designated for use with system 1000 is advantageous. Specifically, when de-packaging a data package file as described herein data collection terminal 10 can examine the file extension of the XML in order to process XML files having EXM extensions in manner differently from XML files having XML extensions. For example, data collection terminal 10 can be configured to always attempt to one of store an XML file having and EXM extension into a pre-specified configuration file directory or automatically parse parameters settings of an XML file having an EXM extension on de-packaging. Host computer 100 can also examine the file extension of an XML file when determining a GUI display screen to display on display 132. For example if an EXM file is selected for transfer to terminal 10, a fists type of GUI display screen can be displayed on display 132. If a non-EXM XML file is selected for transfer a second type of GUI display screen can be displayed on display having a different set of action indicator data entry fields.

While in the specific embodiment illustrated with respect to FIG. 7*c*, the contents of the directory "EasyConfigEditor" are displayed in window 7005 on display 132, the contents of an alternative folder could also be displayed, by navigation using folder button 7022 and other navigating buttons provided with a WINDOWS operating system.

Clicking on button 7022 and other navigational buttons that are part of Windows XP file management platform enables the display of alternative directories, including directories stored on a computer external to computer 100, e.g., computer 110-1, computer 100-5, or computer 110-10 (FIG. 2*d*).

Figure 7D:
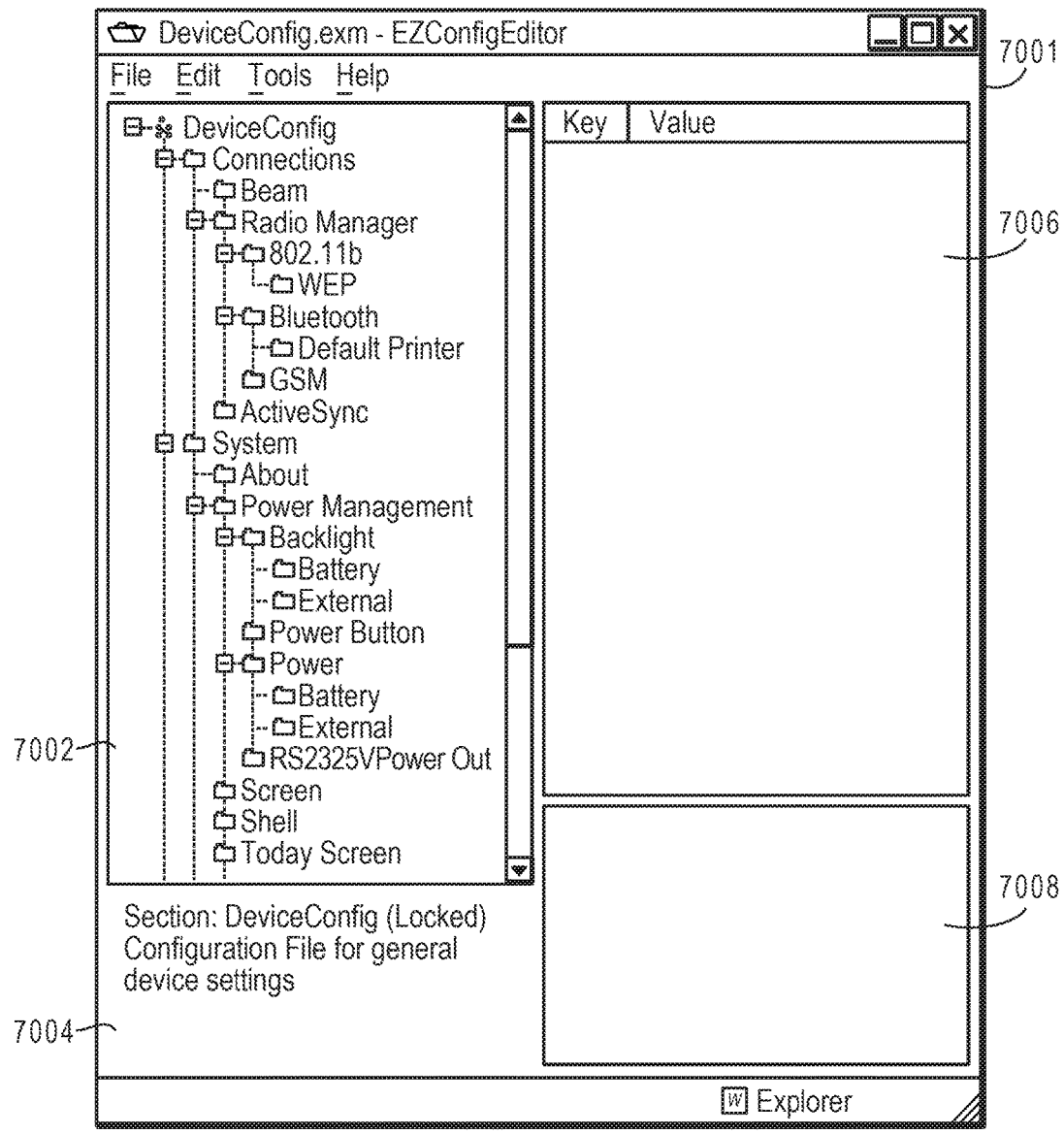

Referring to FIG. 7*d*, FIG. 7*d* shows a graphical interface display screen window displayed on display 132 of host 100 after an XML file is selected. FIG. 7*d* shows the information of window 7001 displayed on display 132 after an XML file is selected using file selector graphical user interface display screen window 7005.

The XML document file "DEVICECONFIG.EXM" is the XML file illustrated in Table 1. When the XML file DEVICECONFIG.EXM is selected, host computer 100 parses data of the XML file then presents data from the XML file in the manner illustrated in FIG. 7*d*. Within tree window 7002 host computer 100 in accordance with XML configurator displays the name "attribute" of each section designated element of the DEVICECONFIG.EXM file. In tree window 7002, each XML element designated as being a section element is represented. Further, each XML element designated as a section element is expressed according to the hierarchy of the XML document file. That is, in accordance with XML configurator 1024, the nesting hierarchy of the XML file document shown in Table 1 is repeated in the display of tree widow 7002. It is seen that new elements for display on display 7002 can be created simply by writing additional XML code in accordance with the desired nesting format.

Referring to window 7004 defined text of a description ("desc") attribute of the root XML element is automatically displayed when the XML file is selected.

Figure 7E:
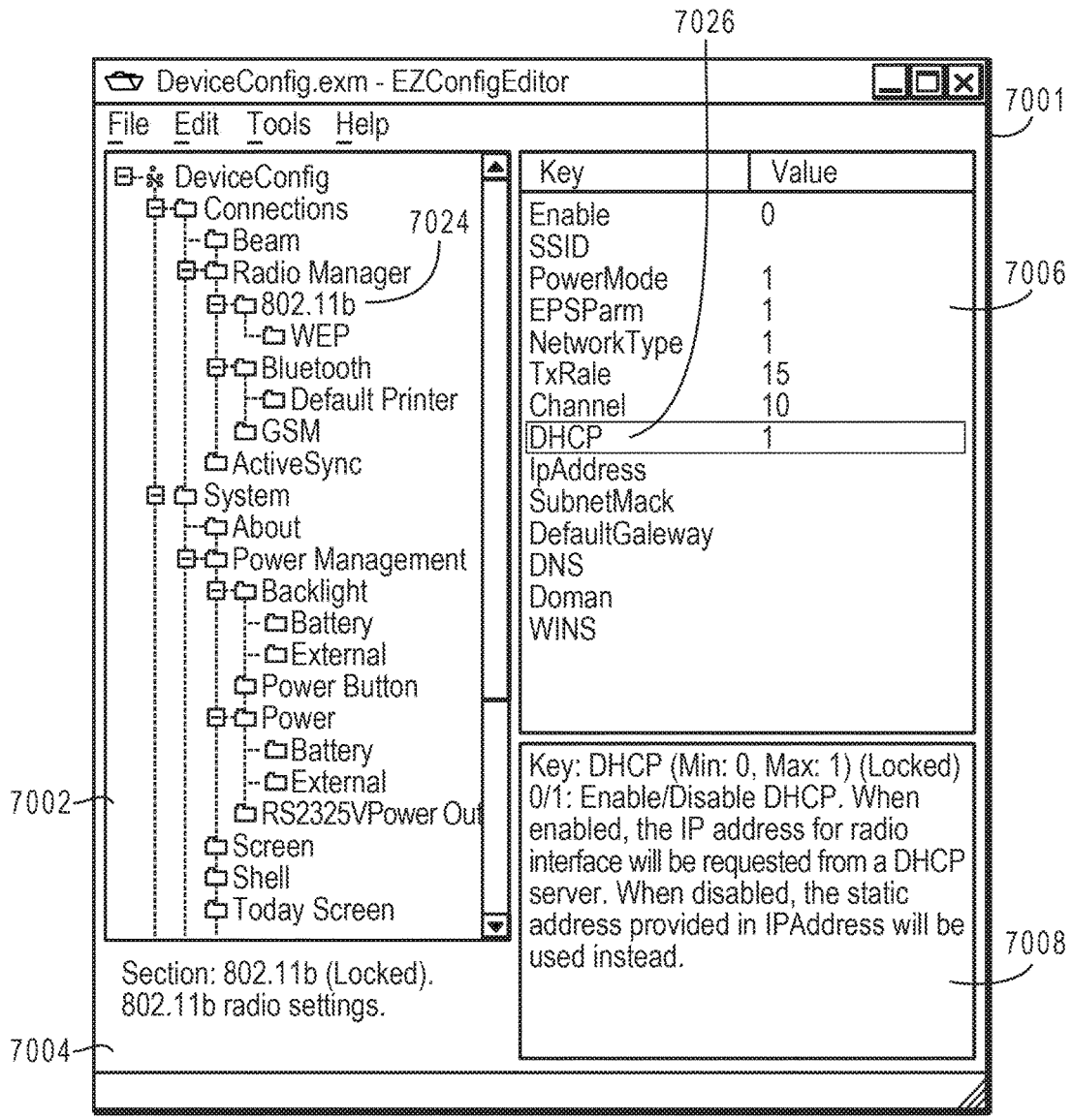

Referring to the XML document file of Table 1, the "desc" attribute associated with the root XML element is the descriptive text "Configuration file for general device settings." Accordingly, as seen in the screen display of FIG. 7*d*, the text "Configuration file for general device settings" is automatically displayed in window 7004 when the XML document file is selected. However, as will be demonstrated further herein, when a name corresponding to a non-root element displayed in tree window 7002 is clicked on, text of a "desc" attribute is in the illustrated embodiment automatically displayed in window 7004 in accordance with the XML element associated with the name that is clicked on. For example, specifically with reference to FIG. 7*e*, FIG. 7*e* shows a graphical user interface display screen displayed display on display 132 of host computer 100 when a particular name (name button) within tree display window 7002 is clicked on. When a name or (name button) displayed in window 7004 is clicked on, host computer 100 displays on display 132 in parameter setting value setting window 7006, the name attribute and present parameter setting values of each key designated child element that is in child relative to the element selected by clicking on of a name in window 7002. Specifically, if a selected name displayed in window tree area 7002 has child elements XML child elements associated with it that are designated as being "key" XML elements, host computer 100 in accordance with XML configurator 1024 displays in area 7006 name attributes and parameter setting values associated with those XML child elements.

Referring to the screen display of FIG. 7*e*, name 7024, is the name taken from an XML "section" designated element having a plurality of key designated sub-elements (child element). Accordingly, when the name (which can be formatted as a button) having the text "802.11b" designated with the reference numeral 7024 is clicked on, names associated with all of key designated sub-elements of the XML element having the name "802.11b" are automatically displayed in window 7006 in association with any parameter of those key designated XML elements. Referring to window 7006 of FIG. 7*e*, host computer 100 is configured so that parameters can be changed by double clicking on a parameter setting value of window 7006 and editing the displayed data using keyboard 122. Host computer 100 displays in comment window 7004 and comment window 7008 text that is parsed from "desc" attributes of certain XML elements of XML, file of Table 1 in accordance with name buttons of window 7002 and/or window 7006 that are clicked on.

Specifically, if the 802.11b name button designated with reference numeral 7024 is clicked on, host computer 100 in accordance with XML configurator 1024 displays in window 7004 the designated "desc" attribute of the XML element having the designated name 802.11b. In the example given, the text displayed in area 7004 is the text "802.11b radio settings." Similarly, host computer 100 in accordance with XML configurator 1024 displays in window 7008 text of the "desc" attribute of the XML element having the name displayed in area 7006 that is clicked on. For example, when the name "DHCP" designated with reference numeral 7026 is clicked on, host computer 100 in accordance with XML configurator 1024 displays in window 7008 text of the "desc" attribute of the XML element having the DHCP name. In the illustrative embodiment described, the text display in window 7008 is the text:

"0/1Enable/Disable DHCP. When enabled, the IP address for the radio interface will be requested from a DHCP server. When disabled, the static address provided in IP Address will be used instead."

The descriptive text that is parsed from the XML document file and which is displayed in window 7004 and 7008 is useful in helping a user of system 1000 understand the affect of the parameter settings being changed with use of system 1000. It will be seen that host computer 100 is configured so that when a different name displayed in tree window 7002 is clicked on, a correspondingly different text associated with the new name clicked on will be displayed in area 7004. Similarly, when a new name displayed in area 7006 is clicked on, host computer 100 will display in window 7008 descriptive text associated with the XML element having the new name that is clicked on. The descriptive and instructional messages which will be displayed in window 7004 and window 7008 are discernible by reading of the XML document file in Table 1. For example, by reading the XML file in Table 1, it is seen that when the name "IP Address" is clicked on in window 7006, the instructive text displayed in window 7008 will be: "Static IP Address (a.b.c.d) for the radio interface used when DHCP setting is disabled (set to zero)." Further, host computer 100 can be configured so that when a new name (a name button) displayed in area 7002 is clicked on, host computer 100 displays in area 7006, name attributes and parameter setting values of any child key designated element of the element having the name that is clicked on. While buttons such as name buttons are described as being actuated by being clicked on, host computer 100 can also be configured so that a button is actuated by a "mouse over." The interactions between the displays of window 7002, 7004, 7006, and 7008 in view of the foregoing description for any possible displayed name of window 7002 or window 7006 can be observed by reading of the XML file at Table 1.

Figure 7F:
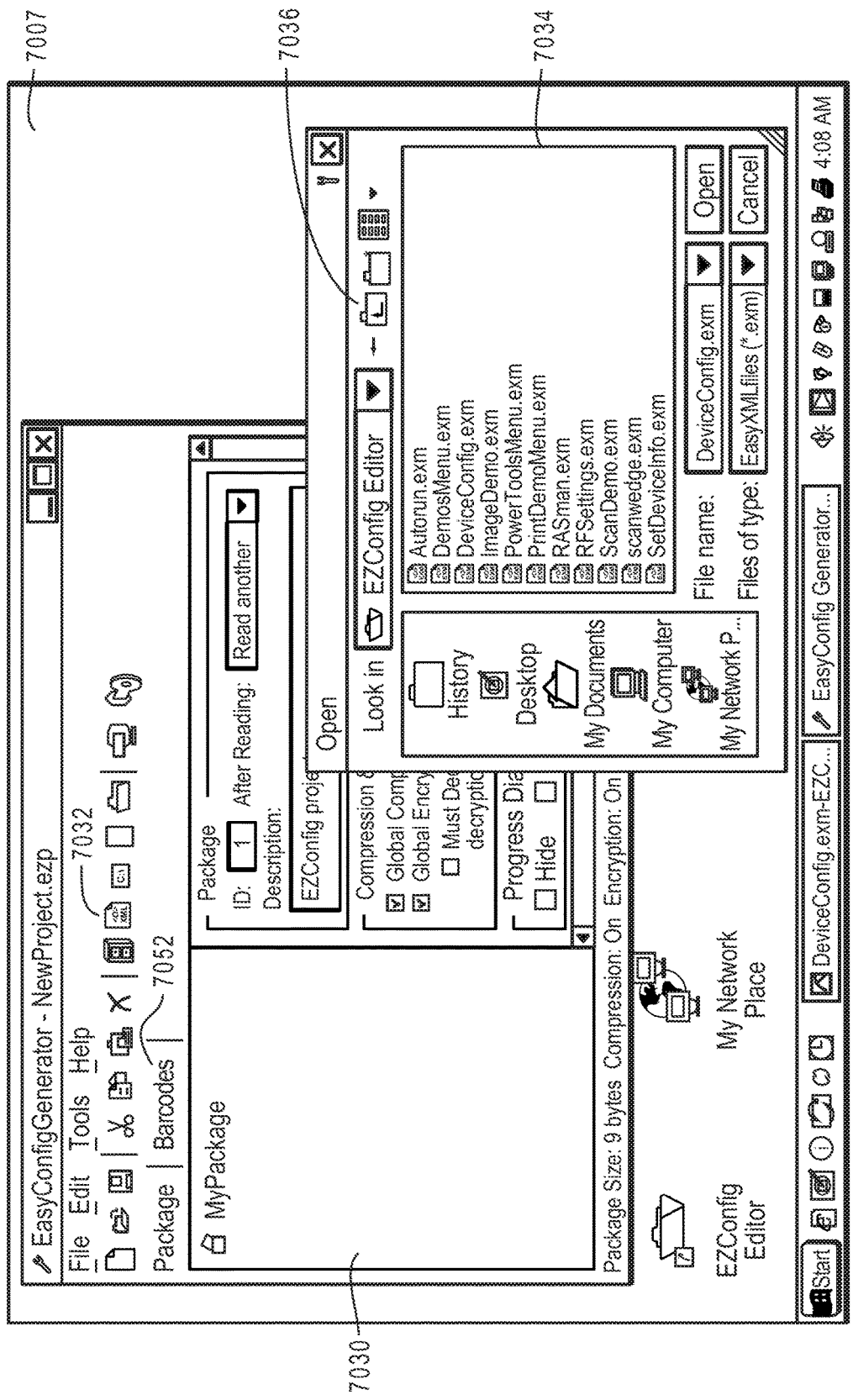

Referring to FIG. 7f, additional aspects of system 1000 are described. Referring to FIG. 7f, a graphical user interface display screen for use in encoding data of the XML file built by entering values into the display screen as shown in FIG. 7e is described. As indicated by the view of FIG. 7f, graphical user interface display screen windows for use in packaging file data of files and other data can be displayed by executing an executable file for running packaging module 1006. Specifically, an executable file enabling host computer 100 to operate in accordance with packaging module 1006 including control interface 1004 can be executed. In window 7030, as shown in FIG. 7f, status of a current data package being built is displayed. By clicking on XML button 7032, window 7034 is automatically opened to display names of files located in a certain default folder. As indicated previously, the contents of different folders can be viewed by clicking on folder icon 7036 and subsequently navigating between directories. As indicated in the view of FIG. 7f, the XML document file "DEVICECONFIG.EXM" can be selected. The XML document file DEVICECONFIG.EXM can be an edited version of an original version as edited by changing parameters within display window 7006 as explained in connection with FIG. 7e. When a certain file from window 7034 is selected, package status area 7030 displays an indicator of the updated status of the data package being defined by a user.

Figure 7G:
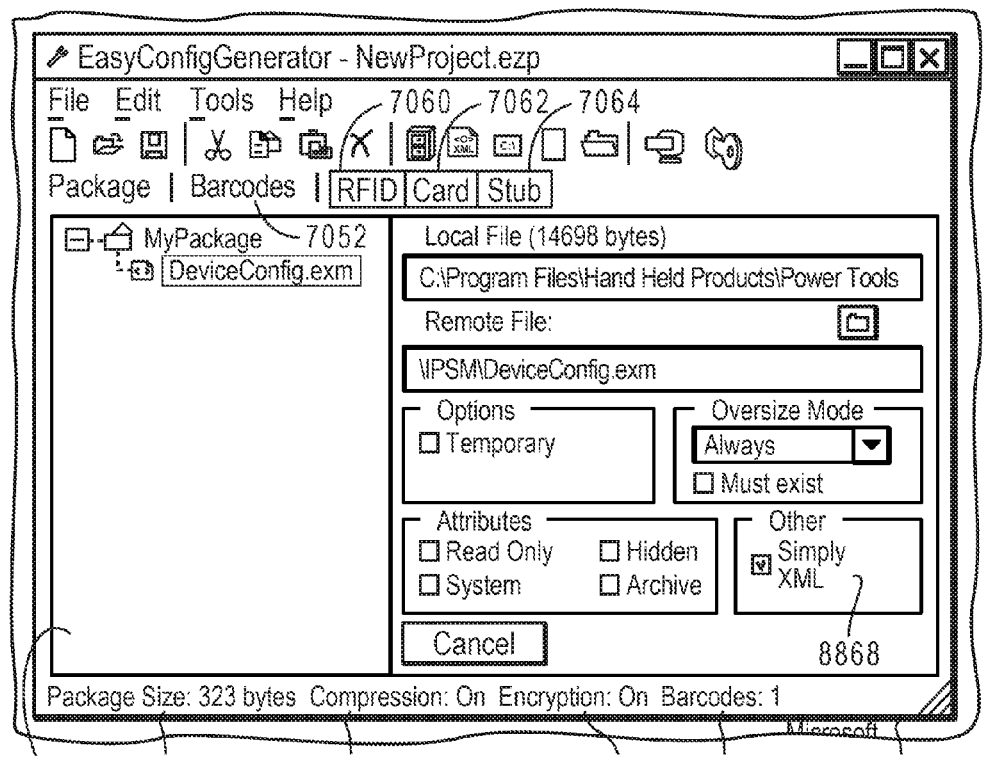
Figure 7H:
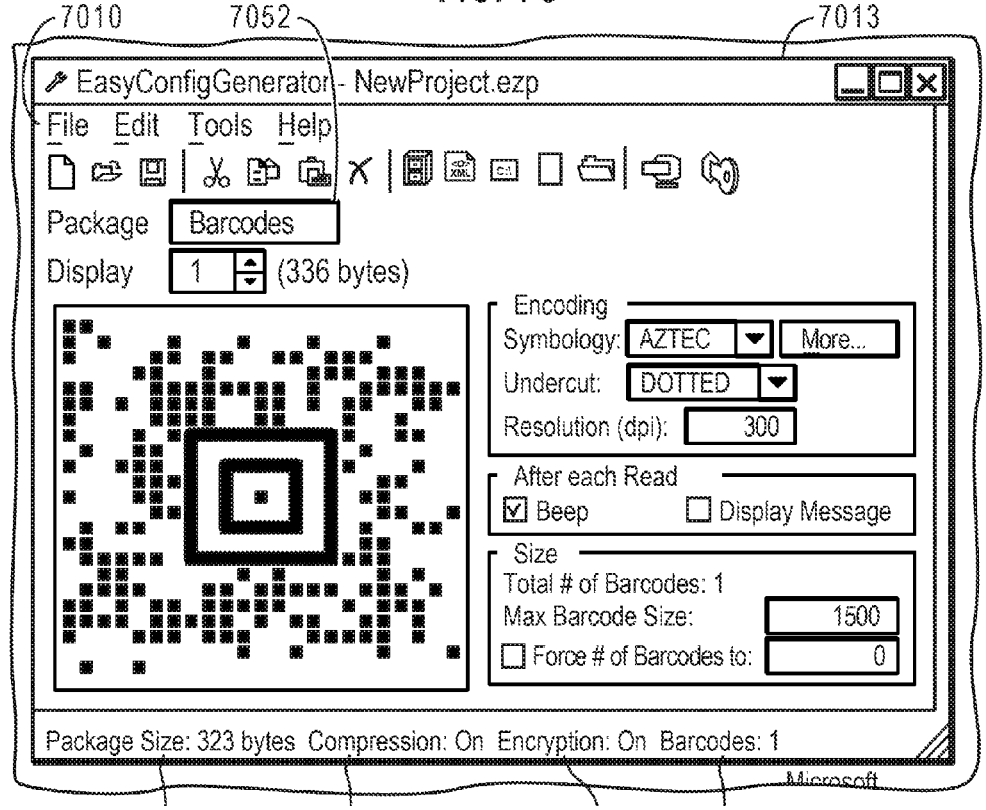
Figure 71:
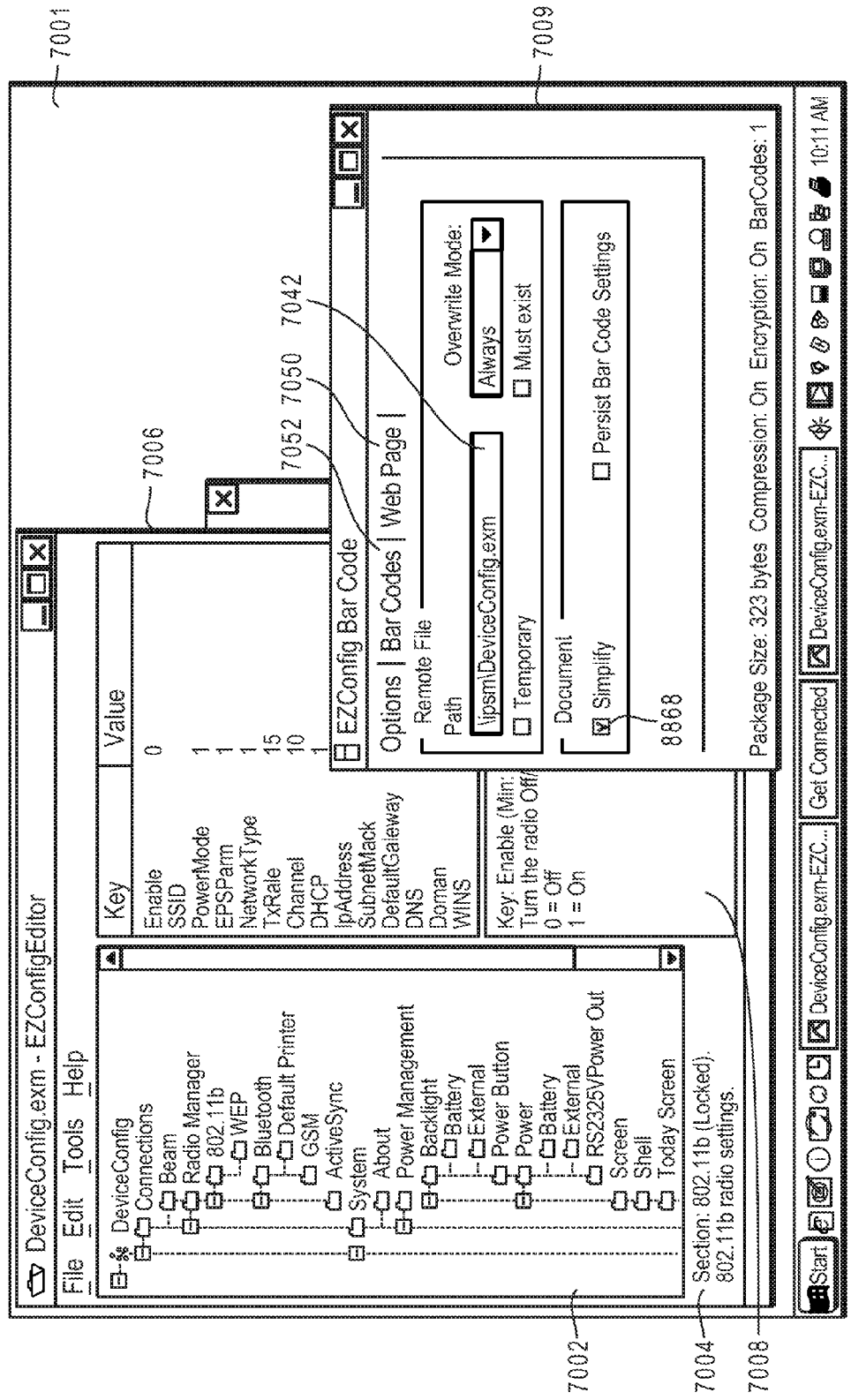

Still referring to the screen display of FIG. 7f, which is shown in full view in FIG. 7g, the bar code button 7052 can be clicked on to automatically generate a bar code or a set of bar codes corresponding to the selected XML document file. Host computer 100 can be configured so that when bar code button 7052 is clicked on, an HTML file with a link to an image file including a representation of a bar code is temporarily saved on host computer 100 and viewed with use of a browser (IEXPLORER.EXE). It has been indicated that window 7007 of FIGS. 7f and 7g can be used to select for transfer to a data collection terminal 10 additional files in addition to the XML file DEVICECONFIG.EXM. For example, executable files, image files, moving video files, audio files and the like can be added. The graphical user interface window 7013 displayed after bar code button 7038 (FIG. 7b) or 7052 is clicked on as is shown in FIG. 7h. In an important aspect graphical user interface display screen window 7013 displays data package status information. In field 8070, host computer 100 displays the byte size of the correct data file package, and at field 8076 displays the current number of bar codes required to encode data of the data package. Further at field 8072, host computer 100 displays whether global compression has been selected and at field 8074 displays whether global encryption has been selected. These fields are automatically updated (a) as files selected for transfer are dropped or added, (b) encryption/compression selections are made (c) as action indicators are added and (d) as other data such as command data is entered. Thus, a user has immediate feedback as to the size of a current data package, and the number of bar codes required for encoding the data package. Host computer 100 can determine a size of a data package being defined, e.g., by examining of the data selected for inclusion in the data package, or header fields associated with such data selected for inclusion to the data package. If fields 8070, 8076 indicate that a current data package is too large for a present application a user can delete selected files using window 7030 or adjust compression/encryption selected data so that the data package is reduced to a size suitable for a present application. As indicated, the user can alter symbology type file. Button 7010 can be clicked on to open up print options and send options and save options for further processing of the created bar code. The encoded bar code encoding the data of the XML, file can be printed with use of printer 17 or saved to a file such as a PDF file, and HTML file, an XML file. Referring again to the screen display of FIG. 7g, an important aspect of system 1000 is described. Specifically, by clicking on or off the "simplify XML button" 8868, a user of system 1000 can designate whether a user wishes an entire XML file to be encoded into a bar code or whether a user wishes only a portion of the data of a created XML file to be encoded into a bar code or into another decodable medium, e.g., an RFID tag, an IC card. When the "simplify XML" data entry field 8868 is checked, certain data is deleted from the XML file built using the screen displays as described in connection with FIGS. 7a-7e. Specifically, when simplify XML data entry field 8868 is checked, host computer 100 automatically strips away (discards) data that is not necessary for reconfiguring a subsystem of data collection terminal 10. While the text instructions of the XML file of Table 1 are defined as XML attributes, it will be understood that text instructions could also be alternative XML data. For example, the descriptive and instructional text portions of the XML file shown in Table 1, defined in the illustrative embodiment with use of XML attributes could be included as "XML text," i.e., text between XML start and end tags. If descriptive XML content is defined with use of text content rather than with use of attributes as shown in Table 1, host computer 100 deletes text content rather than attribute content from a selected XML file when responding to "simplify XML" button 8868 being selected (FIG. 7g).

The screens of FIG. 7g and FIG. 7h illustrate that encoding module 5012 (encoder) of host computer 100 can be activated during the time that host computer 100 displays package builder status window 7007 as shown in FIG. 7g. Host computer 100 can also be configured so that encoding module 5012 (encoder) can be activated to encode a dataform during the time that host computer 100 displays the XML file builder status window 7001 as shown in FIGS. 7a, 7b, 7c, 7e, and 7f. Referring to the screen display view of FIG. 7b, window 7003 includes the text button "Create EZConfig Bar Code" labeled as element 7038 of FIG. 7B. System 1000 is configured so that when the button "Create EZConfig Bar Code" 7038 is clicked on, the encoder control window 7009 as shown in FIG. 7i is displayed on display 132 of host 100.

Encoder control window 7009 is a graphical user interface display screen window including data entry field 7042 allowing a user to define a file directory of terminal 10 onto which file data is to be stored when terminal 10 reads an encoded bar code. Encoder control window 7008 also includes data entry field 8868 which, as described in response to general GUI encoder control window 7007 (FIG. 7g), enables a user to select whether all of the data of an XML configuration file are to be encoded; or alternatively, whether a portion of the data of an XML configuration file are to be encoded. When data entry field 8868 is not checked, (i.e., is blank) host computer 100 encodes entire contents of the XML file being built using XML configurator screen 7001. When data entry field 8868 is checked, (i.e., includes a checkmark) host computer 1000 determines that host computer 100 should reduce XML data from an XML file being built prior to be encoded, such that when bar code button 7038 or 7052 is clicked on only a portion of the data of the XML file being built is encoded into a bar code symbol. The data that is deleted from an XML document file when data entry field 8868 is checked can include (i) all "disabled" elements; (ii) all elements not edited during a previous editing session; and (iii) all text associated with all attributes of the XML document file of Table 1.

Figure 7J:
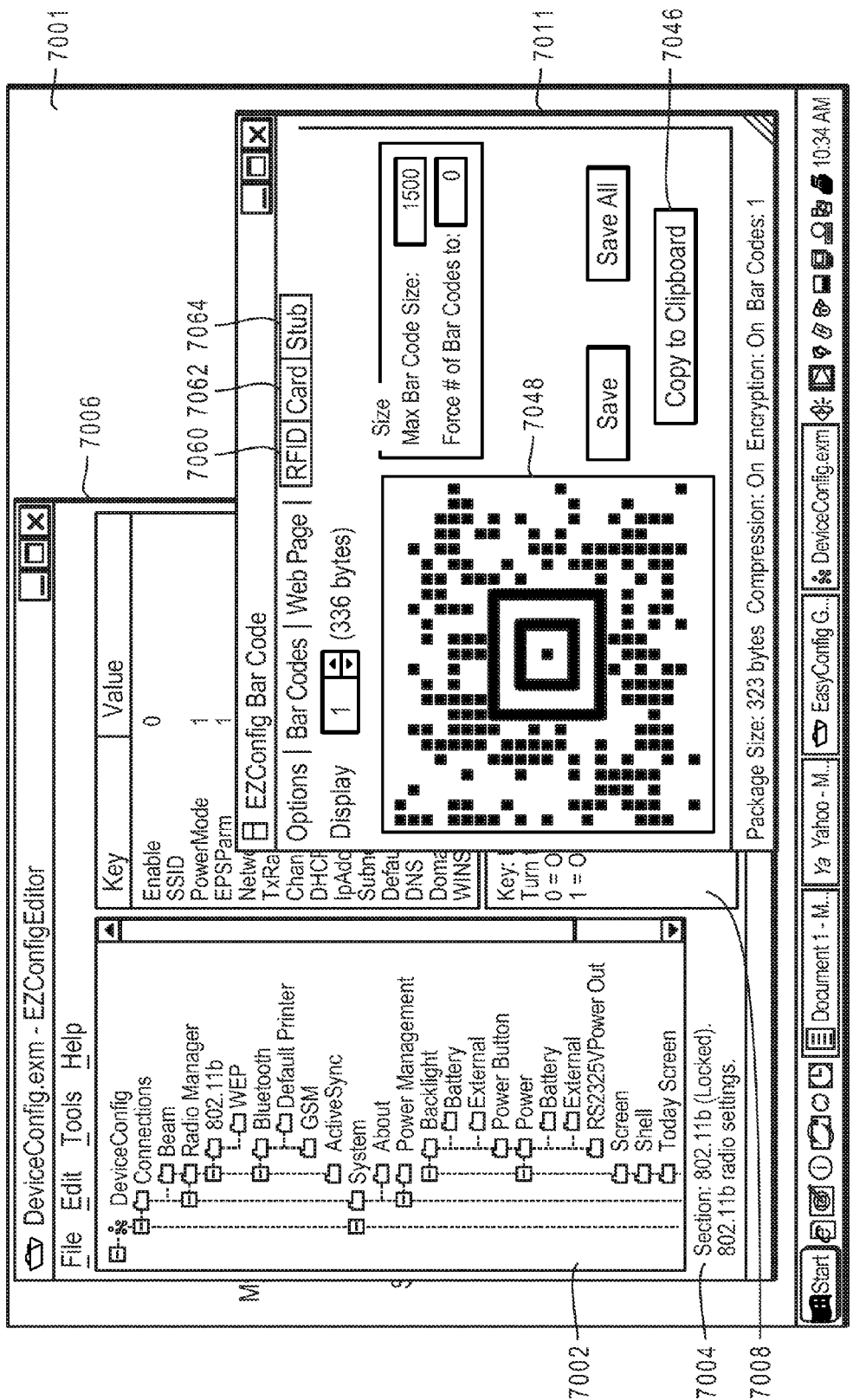

Referring to further aspects of encoder control graphical user interface display screen window 7009, encoder control window 7009 includes bar code button 7044. Host computer 100 can be configured so that when bar code button 7052 is clicked on the data of the XML configuration document file currently being built using window 7001 is encoded into a bar code and bar code window 7011 is displayed as shown in FIG. 7j which includes a view of the newly encoded bar code. Referring to window 7011, window 7011 includes "Copy to Clipboard" button 7046. When "Copy to Clipboard" button 7046 is clicked on, the encoded bar code displayed in area 7048 is copied to a clipboard. Another executable file stored on computer 100 can be opened, i.e., VISIO, MICROSOFT WORD, EXCEL, etc and the contents of the clipboard can be pasted into a new file, e.g., a new VISIO, WORD or EXCEL file. The bar code can then be printed on a physically transportable substrate such as transportable sheet of paper 18 (FIG. 1a).

Figure 7K:
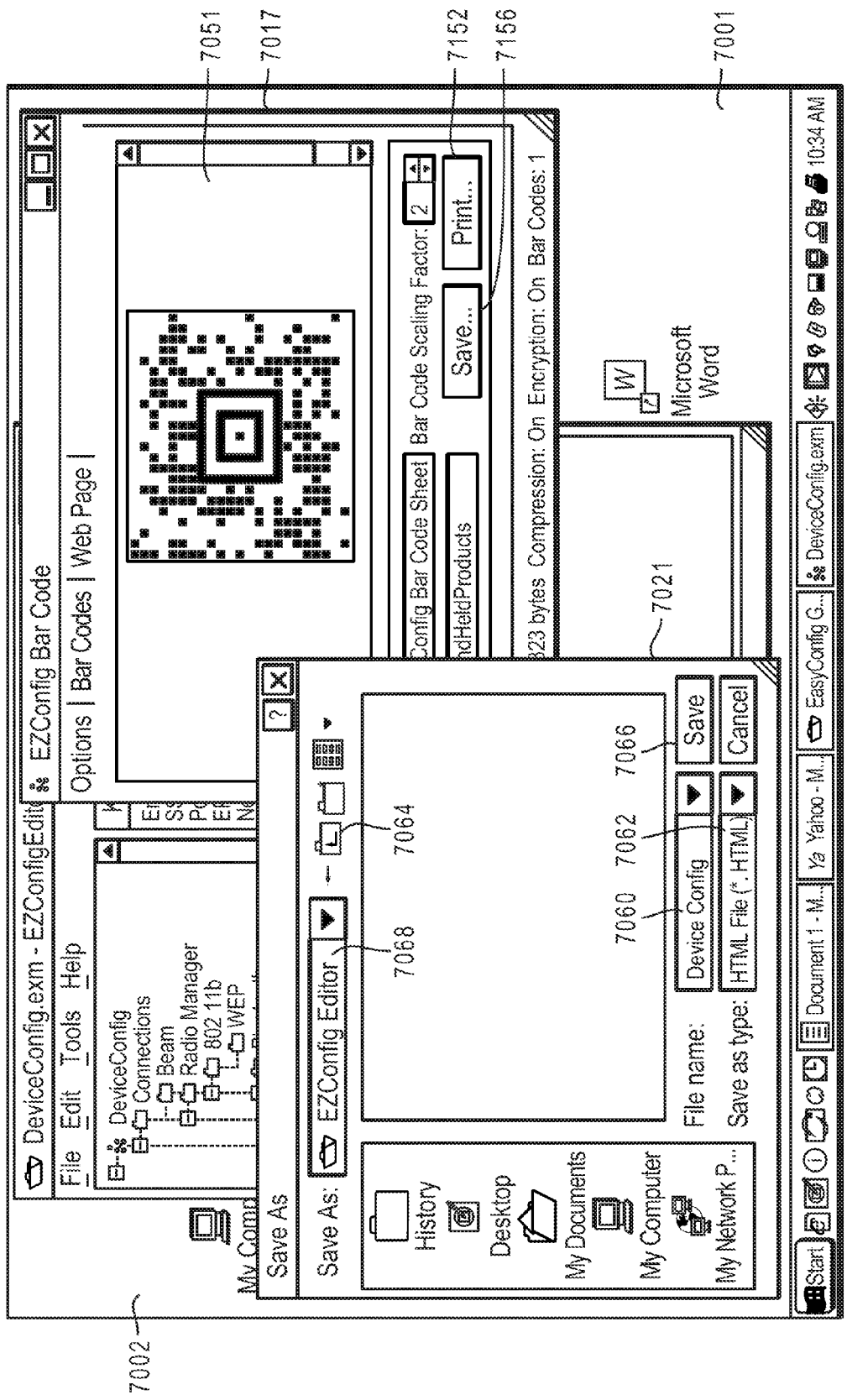

Referring again to encoder control window 7009, encoder control window 7009 also includes web page button 7050. Host computer 100 can be configured so that when web page button 7050 is clicked on, window 7017 is displayed as shown in FIG. 7k together. Referring to window 7017, window 7017 includes a print button 7052. Host computer 100 is configured so that when print button 7152 is clicked on; host computer 100 prints the bar code displayed in area 7051 utilizing printer 17. Referring to further aspects of window 7017, window 7017 includes save button 7156. Host computer 100 can be configured so that when save button 7156 is clicked on, bar code save window 7021 is displayed on display 132. Bar code save window 7021 enables a user to select a file type and a location for a saved bar code. Window 7021 includes file name area 7060, a file type area 7062, and a file directory button 7064. A user of system 1000 can input a desired name for a bar code file in area 7060. A user can designate a file type of a saved bar code in area 7062. Host computer 100 can be configured so that that the default file type is HTML, often used to store web pages of the type viewed by webpage browsers. Using area 7062, a user can designate another file type however, e.g., .TIF, .GIF, .BMP. .PDF, .PNG. Host computer 100 can be configured so that when the default HTML file type is selected, an image file format associated with the HTML file is selected which is linked to the HTML file. For example, host computer 100 can be configured so that when save button 7156 is clicked on to save an HTML file, an HTML file format in the folder designated in area 7068 is saved with a link to an image file also stored in the folder designated in area 7068. The file format of the linked image file may be e.g., the .PNG file format, .GIF, .TIF. JPG. The folder location for storing a file including the encoded bar code can be changed by clicking on path button 7064 and subsequently navigating to designate an alternative file directory. The file directory into which a bar code is stored can be a directory on board host computer 100 (e.g., the C drive, "C:") a computer spaced apart from computer 100 but within a local network computer such as computer 110-1 or computer 10-2 (FIG. 2d), or a folder of a directory within a remote computer such as computer 110-6, 110-10, or computer 100-10.

Referring to Table 2, another illustrative XML configuration file is shown. The configuration file of Table 2 includes elements authored in a systematic manner for use in changing parameters controlling operation of bar code reader device 14 which in the embodiment shown includes imaging module 1452. The XML configuration file after being edited at host computer 100 can be transferred to a terminal 10 and stored in a memory thereof, and the parameter settings of the file can be accessed by a program controlling operation of bar code reader device 14. An XML file for use in setting parameters of bar code reader device is as follows:

Table 2

```xml
<?xml version="1.0"?>
<ConfigDoc flags="16" desc="Configuration file for the ScanDemo" name="ScanDemo">
  <Section flags="16" desc="Settings for the Decoder" name="Decode">
   <Key flags="8" desc="This stores the file version. Do not modify this value!
" name="Version">3</Key>
   <Key flags="16" desc="Controls the debug function of ScanDemo.
0-Disable
1-Enable, a log file is created in the \IPSM folder (or as specified with the LogFilename key) " name="Log">0</Key>
   <Key flags="16" desc="Location and name of the ScanDemo log file." name="LogFilename">/ipsm/scandemo.log</Key>
   <Key flags="16" desc="Enables or Disables the audio notifications for an error or successful decode:
0 = Disable
1 = Enable, Front Speaker
2 = Enable, Back Speaker
3 = Enable, Front & Back Speaker

" name="Sound">1</Key>
   <Key flags="16" desc="Enables and disables LED notification for an error or successful decode/data reception.
0 - Disable
1 - Enable" name="Leds">1</Key>
   <Key flags="16" desc="Enable and disables continuous scan. If enabled, data will be continuously decoded and sent to the application while the trigger key is depressed. If disabled, the trigger key must be released between scans. 
0 - Disable
1 - Enable

" name="ContScan">0</Key>
   <Key flags="16" desc="Enables and disables power saving mode. If enabled, the imager will be automatically initialized and un-initialized as needed. A slight delay will occur when the trigger is activated. If disabled, the imager will be initialized when the utility starts and un-initialized when the utility terminates. Default=1 (enabled).
0 - Disable
1 - Enable" name="PowerSave">0</Key>
   <Key flags="16" desc="Enables and Disables the collection and displaying of decoding statistics" name="Stats">1</Key>
```

```
    <Key flags="16" desc="Indicates the number of milliseconds that the scanner aimer
should be displayed upon the trigger key has been pressed down, before attempting to decode
a barcode. 
If set to 0, the aimer is disabled" name="AimerDuration">0</Key>
    <Key flags="16" desc="Indicates the maximum delay (milliseconds) between two
consecutives trigger key presses to not re-display the aimer and attempt an immediate decode.
Only valid the AimerDelay>0." name="AimerDelay">500</Key>
    <Key flags="16" desc="Similar to AimerDuration, but for ALR mode only"
name="AimerDurationALR">2000</Key>
    <Key flags="16" desc="Similar to AimerDelay, but for ALR mode only"
name="AimerDelayALR">500</Key>
    <Key flags="16" desc="Sets the key used by ScanDemo to initiate a scan/decode. The key
is registered as a system hot key, it cannot be registered as a hot key by any other
applications. Default=42 (On/Scan Key). 
" name="Trigger">42</Key>
    <Key flags="16" desc="Specifies the decode time out in 1/1000th seconds. If a barcode is
not decoded within the specified timeout an audio and visual notification will indicate that an
error occurred. Default=2000 (2 seconds). 
" name="ScanTimeout">9000</Key>
    <Key flags="16" desc="Specifies the behavior of the decoder upon release of the trigger
key:
0 = The decoder will scan as long as specified by the ScanTimeout
parameter
1 = Releasing the trigger key will cause the decoder to stop scanning
"
name="ScanAbort">1</Key>
    <Key flags="16" desc="Time interval between scanning attempts (milliseconds), when in
AutoScan mode" name="ScanInterval">0</Key>
    <Key flags="16" desc="Specifies the decode mode. If 1, the decoder is in normal mode. If
2, the decoder works in ALD (Aggressive Linear Decode) mode.
"
name="ScanMode">1</Key>
    <Key flags="16" desc="Specifies the linear search range to be used while in ALD mode.
The range is 1 to 6. A value of 1 indicates a tight vertical range near the aimer. A value of 6
indicates a vertical range of the entire height of the imager. Default=3. 
"
name="LinearRange">3</Key>
    <Key flags="16" desc="1-7: Sets the decoder's PrintWeight parameter: adjusts the way the
decoder reads Matrix symbols. If the image engine will be seeing consistently heavily printed
Matrix symbols, a print weight of 6 or 7 may improve reading performance"
name="PrintWeight">4</Key>
    <Key flags="16" desc="0/1: If set to 1, replaces the carriage return (13) in the decoded
data with carriage return and line feed (13,10)" name="ReplaceCRwithCRLF">0</Key>
    <Key flags="16" desc="Sound frequency used for play a custom good scan beep,

NOTE: The Window's "Good Decode" sound defined in the control panel
takes precedence over this option, if defined." name="GoodScanFreq">2794</Key>
    <Key flags="16" desc="Number of milliseconds to play the sound as specified in
GoodScanFreq" name="GoodScanLen">50</Key>
    <Key flags="16" desc="Sound frequency used for play a custom bad scan beep,

NOTE: The Window's "Bad Decode" sound defined in the control panel
takes precedence over this option, if defined." name="BadScanFreq">523</Key>
    <Key flags="16" desc="Number of milliseconds to play the sound as specified in
BadScanFreq
" name="BadScanLen">25</Key>
    <Key flags="16" desc="Specifies a wave file to be played on a successful decode/data
reception. The wave file should be an 8 bit, 11KHz, mono, PCM file. If no wave file is
specified, the default beep will be utilized. Use the 'sound' setting to enable and disable
audio notification. Default="". 
NOTE: The Window's "Good Decode"
``` sound defined in the control panel or the GoodScanFreq parameter take precedence over this option, if defined.

" name="GoodScanWav" />
  <Key flags="16" desc="Specify a wave file to be played on an unsuccessful decode. The wave file should be an 8 bit, 11KHz, mono, PCM file. If no wave file is specified, the default beep will be utilized. Use the 'sound' setting to enable and disable audio notification. Default="".
NOTE: The Window's "Bad Decode" sound defined in the control panel or the BadScanFreq parameter take precedence over this option, if defined.
" name="BadScanWav" />
  <Key flags="16" desc="If set to 1, resets the Window's Idle timers before each decode attempt, preventing the DEVICE from entering into suspend mode when in AutoScan mode." name="ResetIdleTimers">0</Key>
 </Section>
 <Section flags="16" desc="The Symbologies settings specify the settings for each of the symbologies supported by the Dolphin's decoder.

The settings are in the form: 
Symbology Name= Enable, Parm1, Parm2, Parm3, Parm4, Parm5, Parm6, Parm7, Parm8

Where:
- Enable (0 or 1): Specifies if the symbology is enabled or disabled. Disable symbologies not used to improve performance.
- Parm1...8: Specify the settings for the symbology, as documented in the HHP Decode API. Unused parameters are ignored.

Example: Code 39 = 1,0,0,0,0,0,2,48,0
1 = Enable Code 39
0 = Don't transmit start and stop characters 
0 = Read codes with or without check character
0 = Do not transmit check character
0 = Full ASCII mode is disabled
0 = Append mode is disabled
2 = Minimum length is 2 characters
48 = Maximum length is 48 characters
0 = Ignored parameter for Code 39
" name="Symbologies">
  <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Aztec or Aztec Mesa Code message the engine should return. Aztec or Aztec Mesa Code messages smaller than this minimum length are not reported by the engine. The minimum allowable value (as well as the default) is 1.

PARM2 (nMaxLength) - The maximum length decoded Aztec or Aztec Mesa Code message the engine should return. Aztec or Aztec Mesa Codes messages larger than this maximum length are reported by the engine. The maximum allowable value (as well as the default) is 3750. 

" name="Aztec Code">1,1,3750,0,0,0,0,0,0</Key>
  <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Aztec or Aztec Mesa Code message the engine should return. Aztec or Aztec Mesa Code messages smaller than this minimum length are not reported by the engine. The minimum allowable value (as well as the default) is 1.

PARM2 (nMaxLength) - The maximum length decoded Aztec or Aztec Mesa Code message the engine should return. Aztec or Aztec Mesa Codes messages larger than this maximum length are reported by the engine. The maximum allowable value (as well as the default) is 3750" name="Aztec Mesas">0,0,0,0,0,0,0,0,0</Key>
  <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bSSXmit) - Points to a BOOL variable that determines if the start and stop characters are returned in the data string after a successful Codabar decode. If bSSXmit is TRUE, the start and stop characters are included. If FALSE, they are not included. The default value is FALSE. 

PARM2 (bCheckCharOn ) - Points to a BOOL variable that determines if the engine will read Codabar barcodes with or without check characters. If TRUE, the engine only decodes Codabarcodes with a check character. If FALSE, the decoder decodes codes with or without a check character. The default value is FALSE.

PARM3 (bXmitCheckChar) - Points to a BOOL variable that determines if the engine will return the check character as part of the data string after a successful decode. If TRUE, the engine returns the check character. If FALSE the check character is not returned. The default value is FALSE. Note: This parameter is only used when bCheckCharOn is set to TRUE. If bCheckCharOn is set to FALSE, this parameter is ignored.

PARM4 (nMinLength) - The minimum length decoded Codabar message the engine should return. Codabar messages smaller than this minimum length are not reported by the engine. The minimum allowable value (as well as the default) is 2.

PARM5 (nMaxLength) - The maximum length decoded Codabar message the engine should return. Codabar messages larger than this maximum length are not reported by the engine. The maximum allowable value (as well as the default) is 60. " name="Codabar">1,0,0,0,4,60,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bTwoCheckDigits) - If TRUE, the engine only decodes Code 11 barcodes printed with two check digits. Otherwise, the engine decodes Code 11 barcodes as if they were printed with only one check digit. The default value is TRUE.

PARM2 (nMinLength) - The minimum length decoded Code 11 message the engine should return. Code 11 messages smaller than this minimum length are not reported by the engine. The default value is 4, and the minimum allowable value is 1.

PARM3 (nMaxLength) - The maximum length decoded Code 11 message the engine should return. Code 11 messages larger than this maximum length are not reported by the engine. The maximum allowable value (as well as the default) is 80. 

" name="Code 11">0,1,4,80,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Code 128 message the engine should return. Code 128 messages smaller than this minimum length are not reported by the engine. The minimum allowable value (as well as the default) is 0.

PARM2 (nMaxLength) - The maximum length decoded Code 128 message the engine should return. Code 128 messages larger than this maximum length are not reported by the engine. The maximum allowable value (as well as the default) is 80. 
" name="Code 128 / EAN 128">1,0,80,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bSSXmit) - Points to a BOOL variable that determines if the start and stop characters are returned in the data string after a successful Code 39 decode. If bSSXmit is TRUE, the start and stop characters are included. If FALSE, they are not included. The default value is FALSE.

PARM2 (bCheckCharOn) - Points to a BOOL variable that determines if the engine will read Code 39 barcodes with or without check characters. If TRUE, the engine only decodes Code 39 codes with a check character. If FALSE, the decoder decodes codes with or without a check character. The default value is FALSE.

PARM3 (bXmitCheckChar) - Points to a BOOL variable that determines if the engine will return the check character as part of the data string after a successful decode. If TRUE, the engine returns the check character. If FALSE, the check character is not returned. The default value is FALSE.

Note: This parameter is only used when bCheckCharOn is set to TRUE. If bCheckCharOn is set to FALSE, this parameter is ignored.

PARM4 (bFullAscii) - Points to a BOOL variable that determines if certain character pairs within the barcode symbol are interpreted and returned as a single character. If bFullAscii is TRUE, interpretation is enabled. If FALSE, no interpretation is attempted. The default value is FALSE. 
Points to a BOOL variable that determines if the engine should append together and buffer up Code 39 symbols that start with a space (excluding the start and stop characters). The engine stores the symbols in the order in which they are read. It returns the data after a Code 39 symbol with no leading space is read. The return data has the leading spaces removed. If TRUE, the append feature is enabled. If FALSE, the append feature is disabled. The default value is FALSE.

PARM5 (bAppend) - This parameter not supported - must be set to FALSE.

PARM6 (nMinLength) - The minimum length decoded Code 39 message the engine should return. Code 39 messages smaller than this minimum length are not reported by the engine. The default value is 2, and the minimum allowable value is 0. nMaxLength The maximum length 
decoded Code 39 message the engine should return. Code 39 messages larger than this maximum length are not reported by the engine. The maximum allowable value (as well as the default) is 48.

PARM7 (nMaxLength) - The maximum length decoded Code 39 message the engine should return. Code 39 messages larger than this maximum length are not reported by the engine. The maximum allowable value (as well as the default) is 48.
" name="Code 39">1,0,0,0,0,0,0,48,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Code 49 message the engine should return. Code 49 messages smaller than this minimum length are not reported by the engine. The minimum allowable value (as well as the default) is 1.

PARM2 (nMaxLength) - The maximum length decoded Code 49 message the engine should return. Code 49 messages larger than this maximum length are not reported by the engine. The maximum allowable value (as well as the default) is 81. 
" name="Code 49">1,1,81,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Code 93 message the engine should return. Code 93 messages smaller than this minimum length are not reported by the engine. The minimum allowable value (as well as the default) is 0.

PARM2 (nMaxLength) - The maximum length decoded Code 93 message the engine should return. Code 93 messages larger than this maximum length are not reported by the engine. The maximum allowable value (as well as the default) is 80. 
" name="Code 93">1,0,80,0,0,0,0,0,0</Key>

<Key flags="16" name="EAN.UCC Composites">0,1,300,0,0,0,0,0,0</Key>
<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Data Matrix message the engine should return. Data Matrix messages smaller than this minimum length are not reported by the engine. The minimum allowable value (as well as the default) is 1.

PARM2 (nMaxLength) - The maximum length decoded Data Matrix message the engine should return. Data Matrix messages larger than this maximum length are not reported by the engine. The maximum allowable value (as well as the default) is 1500. 

" name="Data Matrix">1,1,1500,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bXmitCheckChar) - Points to a BOOL variable that determines if the engine will return the check character as part of the data string after a successful decode. If TRUE, the engine returns the check character. If FALSE, the check character is not returned. The default value is FALSE.

PARM2 (bAddenda2Digit) - Points to a BOOL variable that determines if the engine will look for a 2 digit addenda at the end of the EAN barcode. If TRUE, and an addenda is present, the engine adds the two digit addenda data to the end of the message. If FALSE, the engine ignores addenda data. The default value is FALSE.

PARM3 (bAddenda5Digit) - Points to a BOOL variable that determines if the engine will look for a 5 digit addenda at the end of the EAN barcode. If TRUE, and an addenda is present, the engine adds the five digit addenda data to the end of the message. If FALSE, the engine ignores addenda data. The default value is FALSE.

PARM4 (bAddendaReq) - Points to a BOOL variable that determines if the engine will decode only EAN barcodes that have a 2 or 5 digit addenda. If TRUE, the engine decodes only EAN symbols with an addenda. If FALSE, the engine decodes all enabled EAN symbols. The default value is FALSE.

PARM5 (bAddendaSeparator) - Points to a BOOL variable that determines if there is a space character between the data from the barcode and the data from the addenda. If TRUE, there is a space. If FALSE, there is no space. The default value is FALSE. 
" name="EAN-8">1,1,0,0,0,1,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bXmitCheckChar) - Points to a BOOL variable that determines if the engine will return the check character as part of the data string after a successful decode. If TRUE, the engine returns the check character. If FALSE, the check character is not returned. The default value is FALSE.

PARM2 (bAddenda2Digit) - Points to a BOOL variable that determines if the engine will look for a 2 digit addenda at the end of the EAN barcode. If TRUE, and an addenda is present, the engine adds the two digit addenda data to the end of the message. If FALSE, the engine ignores addenda data. The default value is FALSE.

PARM3 (bAddenda5Digit) - Points to a BOOL variable that determines if the engine will look for a 5 digit addenda at the end of the EAN barcode. If TRUE, and an addenda is present, the engine adds the five digit addenda data to the end of the message. If FALSE, the engine ignores addenda data. The default value is FALSE.

PARM4 (bAddendaReq) - Points to a BOOL variable that determines if the engine will decode only EAN barcodes that have a 2 or 5 digit addenda. If TRUE, the engine decodes only EAN symbols with an addenda. If FALSE, the engine decodes all enabled EAN symbols. The default value is FALSE.

PARM5 (bAddendaSeparator) - Points to a BOOL variable that determines if there is a space character between the data from the barcode and the data from the addenda. If TRUE, there is a space.

If FALSE, there is no space. The default value is TRUE. 
" name="EAN-13">1,1,0,0,0,1,0,0,0</Key>

<Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (bCheckDigitOn) - Points to a BOOL variable that determines if the engine will read Interleaved 2 of 5 barcodes with or without check characters. If TRUE, the engine only decodes Interleaved 2 of 5 codes with a check digit. If FALSE, the decoder decodes codes with or without a check digit. The default value is FALSE.

PARM2 (bXmitCheckDigit) - Points to a BOOL variable that determines if the engine will return the check digit as part of the data string after a successful decode. If TRUE, the engine returns the check digit. If FALSE, the check digit is not returned. The default value is FALSE.
Note: This parameter is only used when bCheckDigitOn is set to TRUE. If bCheckDigitOn is set to FALSE, this parameter is ignored.

PARM3 (nMinLength) - The minimum length decoded Interleaved 2 of 5 message the engine should return. Interleaved 2 of 5 messages smaller than this minimum length are not reported by the engine. The default value is 6, and the minimum allowable value is 4.

PARM4 (nMaxLength) - The maximum length decoded Interleaved 2 of 5 message the engine should return. Interleaved 2 of 5 messages larger than this maximum length are not reported by the engine. The maximum allowable value (as well as the default) is 80. 

" name="Interleaved 2 of 5">1,0,0,4,80,0,0,0,0</Key>

<Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (bCarrierMsgOnly) - This parameter is no longer supported.

PARM2 (nMinLength) - The minimum length decoded MaxiCode message the engine should return. MaxiCode messages smaller than this minimum length are not reported by the engine. The minimum allowable value (as well as the default) is 1.

PARM3 (nMaxLength) - The maximum length decoded MaxiCode message the engine should return. MaxiCode messages larger than this maximum length are not reported by the engine. The maximum allowable value (as well as the default) is 150. 
" name="MaxiCode">1,0,1,150,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (nMinLength) - The minimum length decoded MicroPDF417 message the engine should return. MicroPDF417 messages smaller than this minimum length are not reported by the engine. The minimum allowable value (as well as the default) is 1.

PARM2 (nMaxLength) - The maximum length decoded MicroPDF417 message the engine should return. MicroPDF417 messages larger than this maximum length are not reported by the engine. The maximum allowable value (as well as the default) is 2750. 
" name="MicroPDF417">0,1,366,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (nFont) - This determines which OCR fonts (if any) are selected for decoding. The following values are used:

OCR_DISABLED
   OCR_A
   OCR_B
   OCR_MONEY
OCR_MICR (currently unsupported)

PARM2 (pszTemplate) - A null-terminated string that indicates one or more template patterns for the OCR decode. All characters in the font 1 are matched as is, except for the following:

   a - alphanumeric character
   c - check character
   d -a digitfrom0-9
   e - any character
   g - any character specified in group G
   h - any character specified in group H
   l - alphabetic letter
   r - delimits a row
   t - delimits multiple templates

PARM3 (pszGroupG) - A null-terminated string that defines the set of characters matching group "g" in a template.

PARM4 (pszGroupH) - A null-terminated string that defines the set of characters matching group "h" in a template.

PARM5 (pszCheckChar) - A null-terminated string that defines the legal characters for checksum computation in a decoded message. Use the string constant "0123456789" for modulo 10 checksums, and the string constant "0123456789ABCDEFGHIJKLMNOPQRSTUVWXYZ" for modulo 36 checksums.

PARM6 (nDirection) - Tells the OCR decoder which way the characters are usually oriented with respect to the image. The decoder still decodes any orientation, but use of this parameter can increase decoding speed. It also makes decoding more reliable for numbers that contain only the digits "0, 6, 8," and "9." The constant specifies the direction taken when the user reads the message from start to finish. The following values are used:

   LeftToRight
   TopToBottom
   RightToLeft
   BottomToTop
" name="OCR">0,2,dddddddd,,,,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded PDF417 message the engine should return. PDF417 messages smaller than this minimum length are not reported by the engine. The minimum allowable value (as well as the default) is 1.

PARM2 (nMaxLength) - The maximum length decoded PDF417 message the engine should return. PDF417 messages larger than this maximum length are not reported by the engine. The maximum allowable value (as well as the default) is 2750.

" name="PDF417">1,1,2750,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded QR Code message the engine should return. QR Code messages smaller than this minimum length are not reported by the engine. The minimum allowable value (as well as the default) is 1.

PARM2 (nMaxLength) - The maximum length decoded QR Code message the engine should return. QR Code messages larger than this maximum length are not reported by the engine. The maximum allowable value (as well as the default) is 3500.
" name="QR Code">0,1,3500,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bXmitCheckChar) - points to a BOOL variable that determines if the engine will return the check character as part of the data string after a successful decode. If TRUE, the engine returns the check character. If FALSE, the check character is not returned. The default value is FALSE. 
" name="Postnet">0,0,0,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded RSS message the engine should return. RSS messages smaller than this minimum length are not reported by the engine. The minimum allowable value (as well as the default) is 1.

PARM2 (nMaxLength) - The maximum length decoded RSS message the engine should return. RSS messages larger than this maximum length are not reported by the engine. The maximum allowable value (as well as the default) is 80. 
" name="Reduced Space Symbology (RSS)">1,4,74,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (bXmitCheckDigit) - Points to a BOOL variable that determines if the engine will return the check digit as part of the data string after a successful decode. If TRUE, the engine returns the check digit. If FALSE, the check digit is not returned. The default value is FALSE.

PARM2 (bXmitNumSys) - Points to a BOOL variable that determines if the engine will return the numeric system digit of the UPC label. If TRUE, the engine returns the number system digit. If FALSE, the number system digit is not returned. The default value is TRUE.

PARM3 (bAddenda2Digit) - Points to a BOOL variable that determines if the engine will look for a 2 digit addenda at the end of the UPC barcode. If TRUE, and an addenda is present, the engine adds the two digit addenda data to the end of the message. If FALSE, the engine ignores addenda data. The default value is FALSE.

PARM4 (bAddenda5Digit) - Points to a BOOL variable that determines if the engine will look for a 5 digit addenda at the end of the UPC barcode. If TRUE, and an addenda is present, the engine adds the five digit addenda data to the end of the message. If FALSE, the engine ignores addenda data. The default value is FALSE.

PARM5 (bAddendaReq) - Points to a BOOL variable that determines if the engine will decode only EAN barcodes that have a 2 or 5 digit addenda. If TRUE, the engine decodes only EAN symbols with an addenda. If FALSE, the engine decodes all enabled EAN symbols. The default value is FALSE.

PARM6 (bAddendaSeparator) - Points to a BOOL variable that determines if there is a space character between the data from the barcode and the data from the addenda. If TRUE, there is a space. If FALSE, there is no space. The default value is FALSE. 
" name="UPC-A">1,1,1,0,0,0,1,0,0</Key>

<Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (bXmitCheckDigit) - Points to a BOOL variable that determines if the engine will return the check digit as part of the data string after a successful decode. If TRUE, the engine returns the check digit. If FALSE, the check digit is not returned. The default value is FALSE.
Note: This parameter is not valid for UPC E1.

PARM2 (bXmitNumSys) - Points to a BOOL variable that determines if the engine will return the numeric system digit of the UPC label. If TRUE, the engine returns the number system digit. If FALSE, the number system digit is not returned. The default value is FALSE.

Note: This parameter is not valid for UPC E1.

PARM3 (bExpandVersionE) - Points to a BOOL variable that determines if the engine will expand UPC-E codes to the 12 digit UPC-A format after a successful decode. If TRUE, the engine expands the code. If FALSE, the engine does not expand the UPC-E code. The default value is FALSE.

Note: This parameter is not valid for UPC E1.

PARM4 (bAddenda2Digit) - Points to a BOOL variable that determines if the engine will look for a 2 digit addenda at the end of the UPC barcode. If TRUE, and an addenda is present, the engine adds the two digit addenda data to the end of the message. If FALSE, the engine ignores addenda data. The default value is FALSE.

PARM5 (bAddenda5Digit) - Points to a BOOL variable that determines if the engine will look for a 5 digit addenda at the end of the UPC barcode. If TRUE, and an addenda is present, the engine adds the five digit addenda data to the end of the message. If FALSE, the engine ignores addenda data. The default value is FALSE.

PARM6 (bAddendaReq) - Points to a BOOL variable that determines if the engine will decode only EAN barcodes that have a 2 or 5 digit addenda. If TRUE, the engine decodes only EAN symbols with an addenda. If FALSE, the engine decodes all enabled EAN symbols. The default value is FALSE.

PARM7 (bAddendaSeparator) - Points to a BOOL variable that determines if there is a space character between the data from the barcode and the data from the addenda. If TRUE, there is a space. If FALSE, there is no space. The default value is TRUE. 

" name="UPC-E0">1,1,1,0,0,0,0,1,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bXmitCheckDigit) - Points to a BOOL variable that determines if the engine will return the check digit as part of the data string after a successful decode. If TRUE, the engine returns the check digit. If FALSE, the check digit is not returned. The default value is FALSE.
Note: This parameter is not valid for UPC E1.

PARM2 (bXmitNumSys) - Points to a BOOL variable that determines if the engine will return the numeric system digit of the UPC label. If TRUE, the engine returns the number system digit. If FALSE, the number system digit is not returned. The default value is FALSE.

Note: This parameter is not valid for UPC E1.

PARM3 (bExpandVersionE) - Points to a BOOL variable that determines if the engine will expand UPC-E codes to the 12 digit UPC-A format after a successful decode. If TRUE, the engine expands the code. If FALSE, the engine does not expand the UPC-E code. The default value is FALSE.

Note: This parameter is not valid for UPC E1.

PARM4 (bAddenda2Digit) - Points to a BOOL variable that determines if the engine will look for a 2 digit addenda at the end of the UPC barcode. If TRUE, and an addenda is present, the engine adds the two digit addenda data to the end of the message. If FALSE, the engine ignores addenda data. The default value is FALSE.

PARM5 (bAddenda5Digit) - Points to a BOOL variable that determines if the engine will look for a 5 digit addenda at the end of the UPC barcode. If TRUE, and an addenda is present, the engine adds the five digit addenda data to the end of the message. If FALSE, the engine ignores addenda data. The default value is FALSE.

PARM6 (bAddendaReq) - Points to a BOOL variable that determines if the engine will decode only EAN barcodes that have a 2 or 5 digit addenda. If TRUE, the engine decodes only EAN symbols with an addenda. If FALSE, the engine decodes all enabled EAN symbols. The default value is FALSE.

PARM7 (bAddendaSeparator) - Points to a BOOL variable that determines if there is a space character between the data from the barcode and the data from the addenda. If TRUE, there is a space. If FALSE, there is no space. The default value is TRUE. 
" name="UPC-E1">0,1,1,0,0,0,0,1,0</Key>

<Key flags="16" name="ISBT">0,0,0,0,0,0,0,0,0</Key>
    <Key flags="16" name="British Post">0,0,0,0,0,0,0,0,0</Key>
    <Key flags="16" name="Canadian Post">0,0,0,0,0,0,0,0,0</Key>
    <Key flags="16" name="Australian Post">0,0,0,0,0,0,0,0,0</Key>
    <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded IATA 2 of 5 message the engine should return. IATA 2 of 5 messages smaller than this minimum length are not reported by the engine. The minimum allowable value (as well as the default) is 4.

PARM2 (nMaxLength) - The maximum length decoded IATA 2 of 5 message the engine should return. IATA 2 of 5 messages larger than this maximum length are not reported by the engine. The maximum allowable value (as well as the default) is 80. 
" name="Straight 2 of 5 IATA">0,4,48,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded Codablock message the engine should return. Codablock messages smaller than this minimum length are not reported by the engine. The minimum allowable value (as well as the default) is 0.

PARM2 (nMaxLength) - The maximum length decoded Codablock message the engine should return. Codablock messages larger than this maximum length are not reported by the engine. The maximum allowable value (as well as the default) is 2048. 
" name="Codablock">0,1,2048,0,0,0,0,0,0</Key>

<Key flags="16" name="Japanense Post">0,0,0,0,0,0,0,0,0</Key>
    <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (bXmitCheckDigit) - Points to a BOOL variable that determines if the engine will return the check digit as part of the data string after a successful decode. If TRUE, the engine returns the check digit. If returned. The default value is FALSE.

" name="Planet Code">0,0,0,0,0,0,0,0,0</Key>

<Key flags="16" name="Dutch Post">0,0,0,0,0,0,0,0,0</Key>
    <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded MSI message the engine should return. MSI messages smaller than this minimum length are not reported by the engine. The minimum allowable value (as well as the default) is 4.

PARM2 (nMaxLength) - The maximum length decoded MSI message the engine should return. MSI messages larger than this maximum length are not reported by the engine. The maximum allowable value (as well as the default) is 48.

PARM3 (bXmitCheckChar) - Points to a BOOL variable that determines if the engine will return the check character as part of the data string after a successful decode. If TRUE, the engine returns the check character. If FALSE, the check character is not returned. The default value is FALSE. 
" name="MSI">0,4,48,0,0,0,0,0,0</Key>

<Key flags="16" name="TCIF Linked Code 39 (TLC39)">0,0,0,0,0,0,0,0,0</Key>
    <Key flags="16" name="Trioptic Code">0,0,0,0,0,0,0,0,0</Key>
    <Key flags="16" desc="" name="Code 32">0,0,0,0,0,0,0,0,0</Key>
    <Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 4.

PARM2 (nMaxLength) - The maximum length decoded message the engine should return. Messages larger than this maximum length are not reported by the engine. The maximum allowable value (as well as the default) is 48.

" name="Straight 2 of 5

Industrial">0,4,48,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 4.

PARM2 (nMaxLength) - The maximum length decoded message the engine should return. Messages larger than this maximum length are not reported by the engine. The maximum allowable value (as well as the default) is 80.
" name="Matrix 2 of 5">0,4,80,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 4.

PARM2 (nMaxLength) - The maximum length decoded message the engine should return. Messages larger than this maximum length are not reported by the engine. The maximum allowable value (as well as the default) is 48.
" name="Plessey">0,4,48,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 4.

PARM2 (nMaxLength) - The maximum length decoded message the engine should return. Messages larger than this maximum length are not reported by the engine. The maximum allowable value (as well as the default) is 80.
" name="China Post">0,4,80,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 4.

PARM2 (nMaxLength) - The maximum length decoded message the engine should return. Messages larger than this maximum length are not reported by the engine. The maximum allowable value (as well as the default) is 48.

" name="Korea Post">0,4,48,0,0,0,0,0,0</Key>

<Key flags="16" desc="
The settings are in the form: Symbology Name= Enable, Parm1, Parm2, Parm3, Parm4, Parm5, Parm6, Parm7, Parm8

Parameters
-----------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 1.

PARM2 (nMaxLength) - The maximum length decoded message the engine should return. Messages larger than this maximum length are not reported by the engine. The maximum allowable value (as well as the default) is 60.

PARM3 (bOriginal) - A BOOL variable that configures the engine to read Telepen labels that were encoded with either the original or the AIM specification. The default is FALSE.

" name="Telepen">0,1,60,0,0,0,0,0,0</Key>
  <Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 1.

PARM2 (nMaxLength) - The maximum length decoded message the engine should return. Messages larger than this maximum length are not reported by the engine. The maximum allowable value (as well as the default) is 160.

" name="Code 16K">0,1,160,0,0,0,0,0,0</Key>
  <Key flags="16" desc="
The settings are in the form: Symbology Name= Enable, Parm1, Parm2, Parm3, Parm4, Parm5, Parm6, Parm7, Parm8

Parameters
------------------

ENABLE - Specifies if the symbology is enabled or disabled

PARM1 (nMinLength) - The minimum length decoded message the engine should return. Messages smaller than this minimum length are not reported by the engine. The minimum allowable value (as well as the default) is 4.

PARM2 (nMaxLength) - The maximum length decoded message the engine should return. Messages larger than this maximum length are not reported by the engine. The maximum allowable value (as well as the default) is 48.

PARM3 (nLimited) - A WORD variable used to enable the decoding of either Posicode Limited A or Posicode Limited B labels. A value of 1 enables Posicode Limited A, and a value of 2 enables Posicode Limited B. A value of 0 disables decoding of both Limited A and Limited B. The default value is 0.

" name="PosiCode">0,4,48,2,0,0,0,0,0</Key>
  <Key flags="16" desc="" name="Coupon Code">0,0,0,0,0,0,0,0,0</Key>
 </Section>
 <Section flags="16" desc="Settings for the Centering window used by the scanner to decode a barcode." name="Centering">
  <Key flags="16" desc="Enable and disables decode centering feature for the decoder. If CenteringEnable is 1, barcodes will only be decoded if they are within the centering window specified by CenteringTop, CenteringBottom, CenteringLeft and CenteringRight. Default=0.
" name="CenteringEnable">0</Key>
  <Key flags="16" desc="Specifies the top coordinate of the centering window. Default =230.
" name="CenteringTop">215</Key>
  <Key flags="16" desc="Specifies the bottom coordinate of the centering window. Default = 250.
" name="CenteringBottom">265</Key>
  <Key flags="16" desc="Specifies the left coordinate of the centering window. Default =310.
" name="CenteringLeft">295</Key>
  <Key flags="16" desc="Specifies the right coordinate of the centering window. Default = 330.
" name="CenteringRight">345</Key>
 </Section>
</ConfigDoc>

Figure 7L:
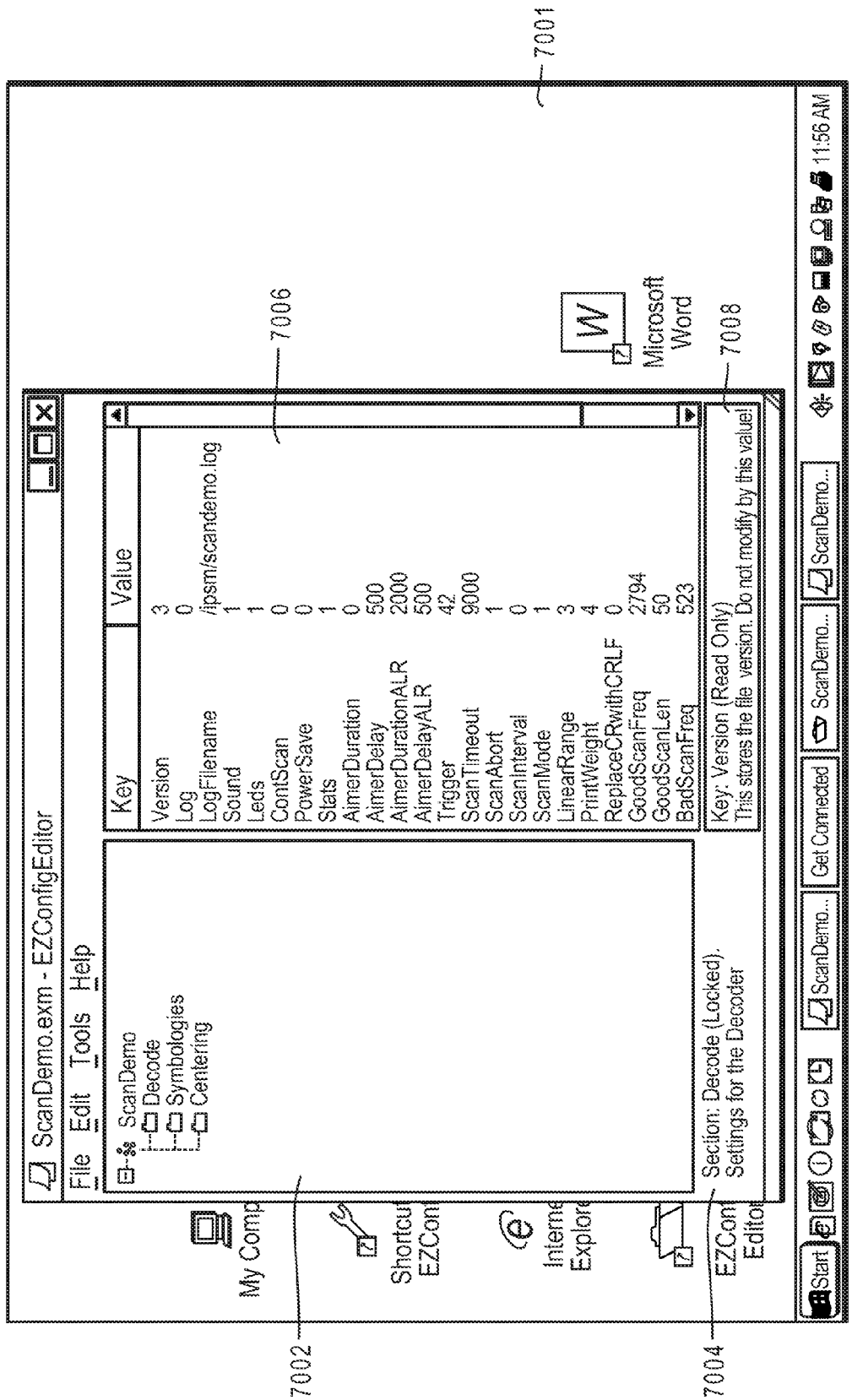

FIG. 7*l* shows a screen shot view of XML configuration graphical user interface window 7001 displaying parsed data from the XML file of Table 2. Like the XML file of Table 1, the XML file of Table 2 includes section elements and key elements wherein key elements are child elements of a section element and wherein key elements include parameter settings defined with use of simple XML text content (text between a start tag and an end tag). It is seen that host computer 100 parses data from the XML file to display name attributed of section elements in window 7002, "desc" attributes of section elements in window 7004, name attributes and parameter setting values of key elements in window 7006, and "desc" attributes of key elements in window 7008. Like the XML configuration file of Table 1, the XML configuration file of Table 2 has a device specific XML element (a device element) corresponding to a device of terminal 10 and several subsidiary elements of lower hierarchy than the device element. The lower hierarchy elements include parameter settings that can be changed with use of host computer 100. Specifically, the XML file of Table 2 has a device element; namely, the root element having the name attribute "ScanDemo" corresponding to bar code reader device 14, and several subsidiary elements that are subsidiary to the bar code reader device element. It will be seen that the bar code reader device element could be given an alternative name attribute such as "bar code reader." Elements that are subsidiary to the bar code reader device element include parameter settings for controlling the operation of bar code reader 14. As is indicated in Table 2 and in the view of FIG. 7*l*, the XML file of Table 2 includes several parameter settings defining key elements for controlling operation of bar code reader device such as the elements have the name attributes "AimerDuration," "AimerDelay," "AimerDurationALR," and "AimerDelayALR." Changing the parameter settings of the above key designated elements adjusts the times during a decode attempt at which aiming LEDs 6318 (FIG. 1*e*) will be energized. Other key designated elements of the XML file of Table 1 include parameter setting values for use in adjusting other aspects of the operation of bar code reader device 14. For example, parameters of the key designated elements having the name attributes "CenteringTop," and "CenteringBottom" changes a region of interest of a captured image captured by activation of image sensor 1406. Also, parameter settings of key designated elements having the name attributes "AztecCode," "AztecMases," and "CodeaBar" can be changed to designate whether a symbology decoding algorithm of bar code reader 14 is to be enabled and to establish characteristics of the decoding algorithm such as minimum and maximum message length. The key elements of the XML configuration file of Table 2 are subsidiary to a device element (i.e., the element with the name attribute "ScanDemo") but are not direct child elements of the device element. Rather, additional section elements (the elements having the name attributes "Decode," "Symbologies," and "Centering") are included in the XML configuration file of Table 2 in order to divide the types of key designated defining elements into different parameter categories.

VIII. Building Data Packages

Figure 8A:
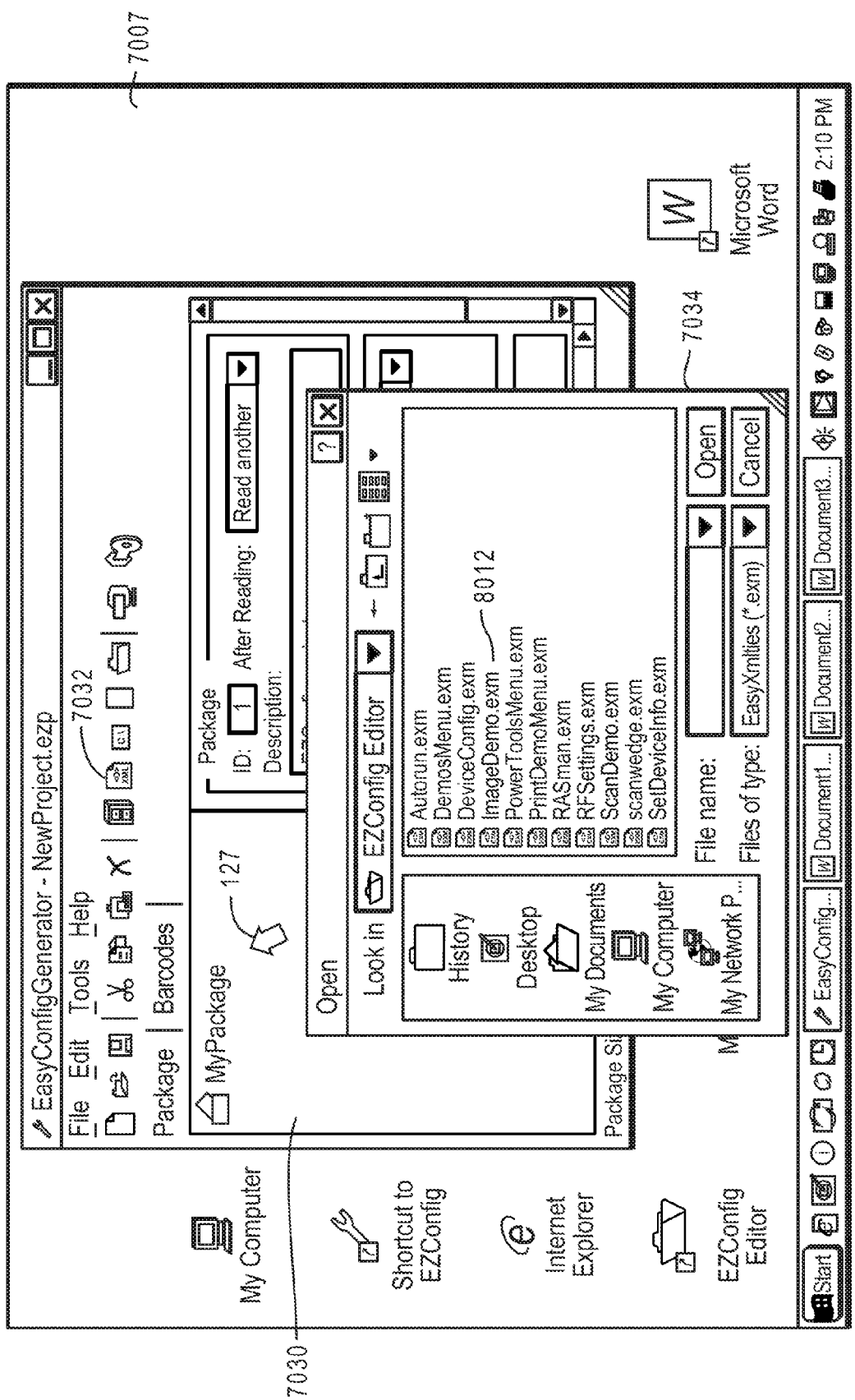

FIGS. 8*a*-8*o* are a series of screen shots illustrating GUI interface display screens that can be displayed by a host computer 100 in accordance with a packaging module thereof for purposes of building a data package comprising file data corresponding to a plurality of files and wherein compression selection data and encryption selection data for the various files can be selected on a file by file basis. With reference to the screen shots of FIGS. 8*a*-8*o* showing graphical user interface display screens of host computer 100, a system is described wherein a data package can be built having a file data of a plurality of files such that only a subset of the file data is encrypted and/or only a subset of the file data is compressed.

With reference now to the screen shots of FIGS. 8*a*-8*o*, a system is described for building a multiple file data package wherein compression settings and encryption settings for the data package can be established on a file by file basis.

Referring to FIG. 8*a*, FIG. 8*a* shows GUI display screen window 7007 which host computer 100 displays on display screen 132 in accordance with packaging module 5008. As discussed previously in connection with FIG. 7*g*, window 7007 includes area 7030 displaying the status of the data package currently being defined by host computer 100. In window 7030 there can be displayed a tree diagram as shown in FIGS. 8*a*-8*g* comprising designators for data that is included in a present data package. Host computer 100 can be configured to have "drag and drop" functionality so that designation of window 7030 can be moved from location to location in window 7030 by dragging and dropping using pointer controller 123 to control pointer 127. The designators of window 7030 can correspond to files or commands selected for transfer to data collection terminal 10 or to encryption selection data or compression selected data. Host computer 100 can be programmed to display a GUI with drag and drop functionality using an appropriate software development tool, e.g., VISUAL STUDIO.NET 2003. In the screen shot of FIG. 8*a*, window 7030 indicates that the status of the current data package is empty, i.e., no file data, command data, compression select data or encryption select data have yet been designated for inclusion in the current data package. With reference further to the graphical user interface display screen of FIG. 8*a*, host computer 100 is configured so that when XML button 7032 is clicked on; host computer 100 displays GUI display screen window 7034 displaying file names of files of a default directory including XML configuration files. GUI display screen window 7034 can be regarded as a file selector graphical user interface display screen window 7034. XML files designated in window 7034 are XML files designated with the extension .EXM for use in configuring various devices of terminal 10 such as radio transceiver devices and encoded information reader devices, e.g., a bar code reader device 14.

Figure 8B:
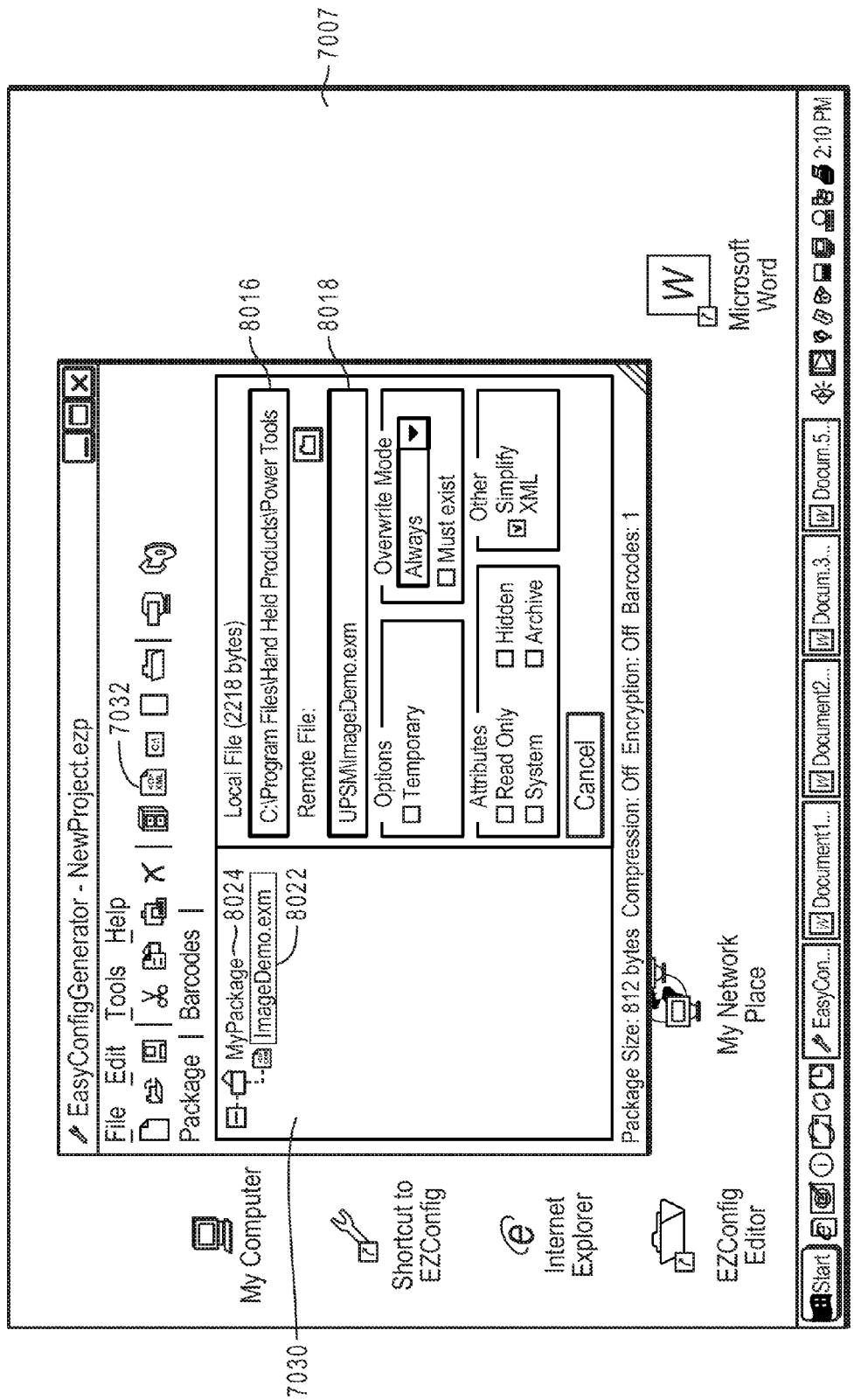

Referring to FIG. 8*b*, FIG. 8*b* shows a graphical user interface display screen displayed by host computer 100 when the file "IMAGEDEMO.EXM" designated with reference numeral 8012 is selected from file selector window 7034 shown in the screen shot of FIG. 8*a*. When the file designated by reference numeral 8012 is selected for transfer to data collection terminal 10, package status window 7030 displays designator 8022 to indicate that file data of the file IMAGEDEMO.EXM is included in the designated current data package. Field 8016 of window 7007 designates the path of the selected file. In the case shown in FIG. 8*b*, a selected file is stored locally on host computer 100 as indicated by the C: file directory path. However, it will be understood that the directory can be selected to select a directory of any computer within the network view of FIG. 2*d*. In area 8018, a user can designate the directory for storing the selected file into a memory of terminal 10 when the selected file is transferred to terminal 10 either by reading decoded data encoded in a decodable dataform or by file transfer without encoding.

Figure 8C:
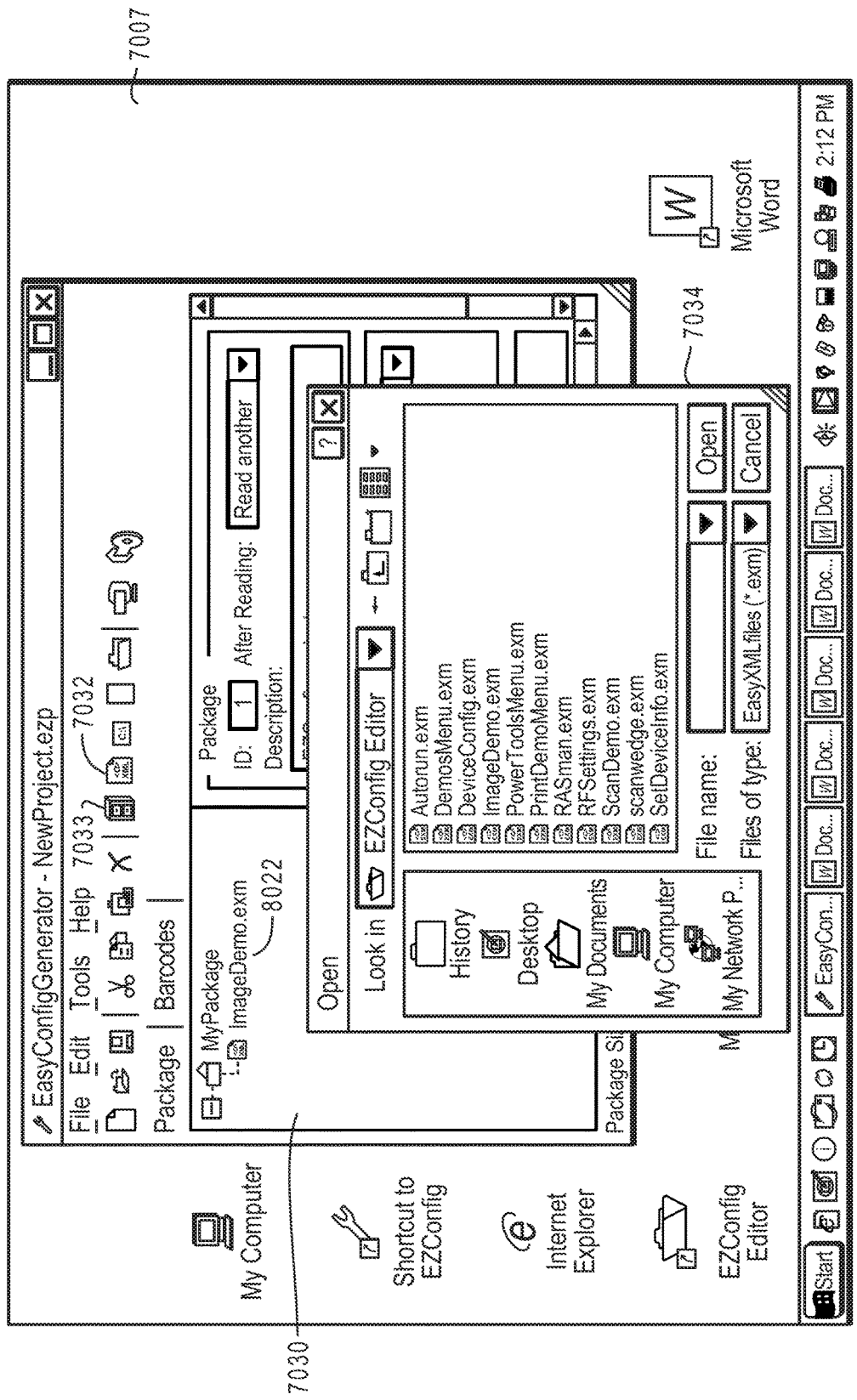

Referring to FIG. 8*c*, the screen shot of FIG. 8*c* illustrates the manner in which window 7007 can be utilized to add file data corresponding to additional files to the current package.

Figure 8D:
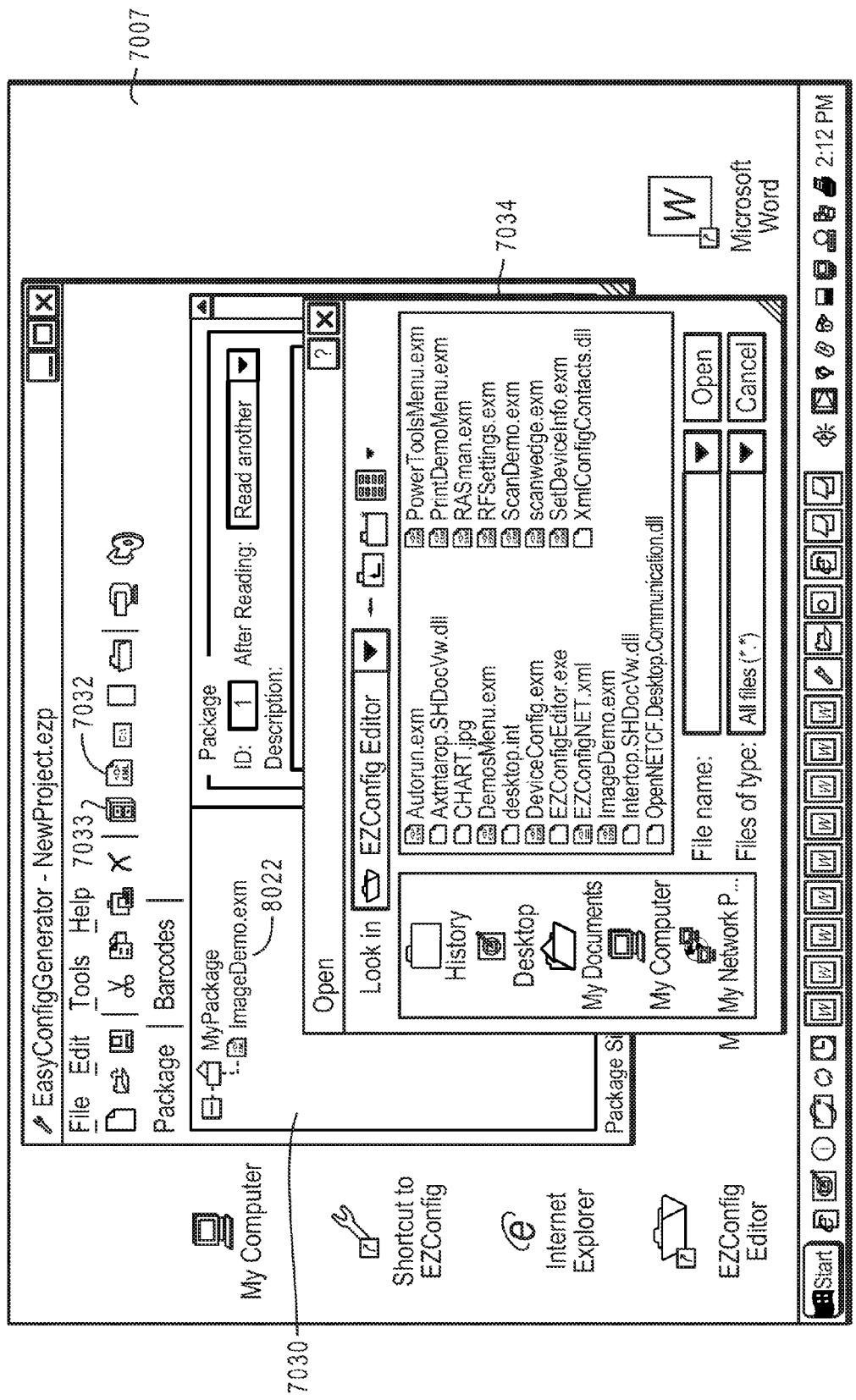

Referring again to FIG. 8b, it is seen that a designator corresponding to a selected file such as designator 8022 is highlighted just after it is selected. It will be seen herein that the highlighting of a child designator 8022 as opposed to a root designator 8024 has significance. Specifically, if a compression setting or an encryption setting is selected with a child designator 8022 highlighted, the compression or encryption setting will be applied only to the file data associated with that highlighted child designator and not to other file data of the current package. Referring to the screen shot of FIG. 8c, when XML button 7032 is selected, file display window 7034 is displayed by host computer 100 to enable selection of an XML file. Referring to the screen shot of FIG. 8d, host computer 100 is configured so that file data corresponding files can be added to a data package either by clicking on a button 7032 or button 7033. Button 7032 is an XML file button and results in a file selector window 7034 being displayed that displays XML files that can be added to the current package. Button 7033 is a general file selector button. When general file selector button 7033 is selected, host computer 100 displays file selector window 7034 as shown in FIG. 8d. When general file selector button 7032 is clicked on rather than XML file selector button 7032, file types in addition to XML files types are displayed in window 7034. For example, in file selector window 7034 of the screen shot of FIG. 8d numerous file types are available for selection including EXM files (.EXM) which are XML files specially made for use in system 1000, XML files, JPG files (JPG) and INI files (INI).

Figure 8E:
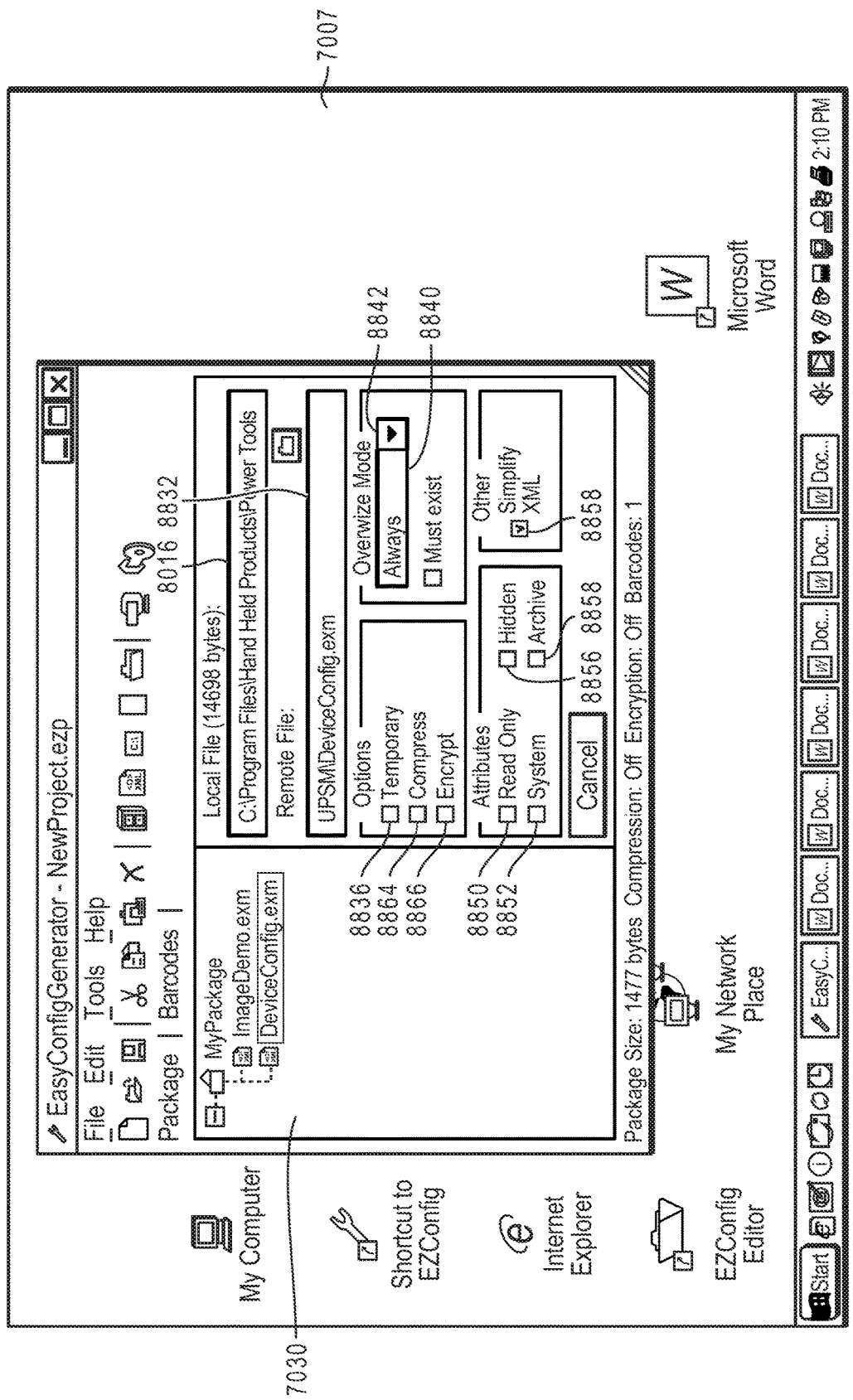
Figure 8F:
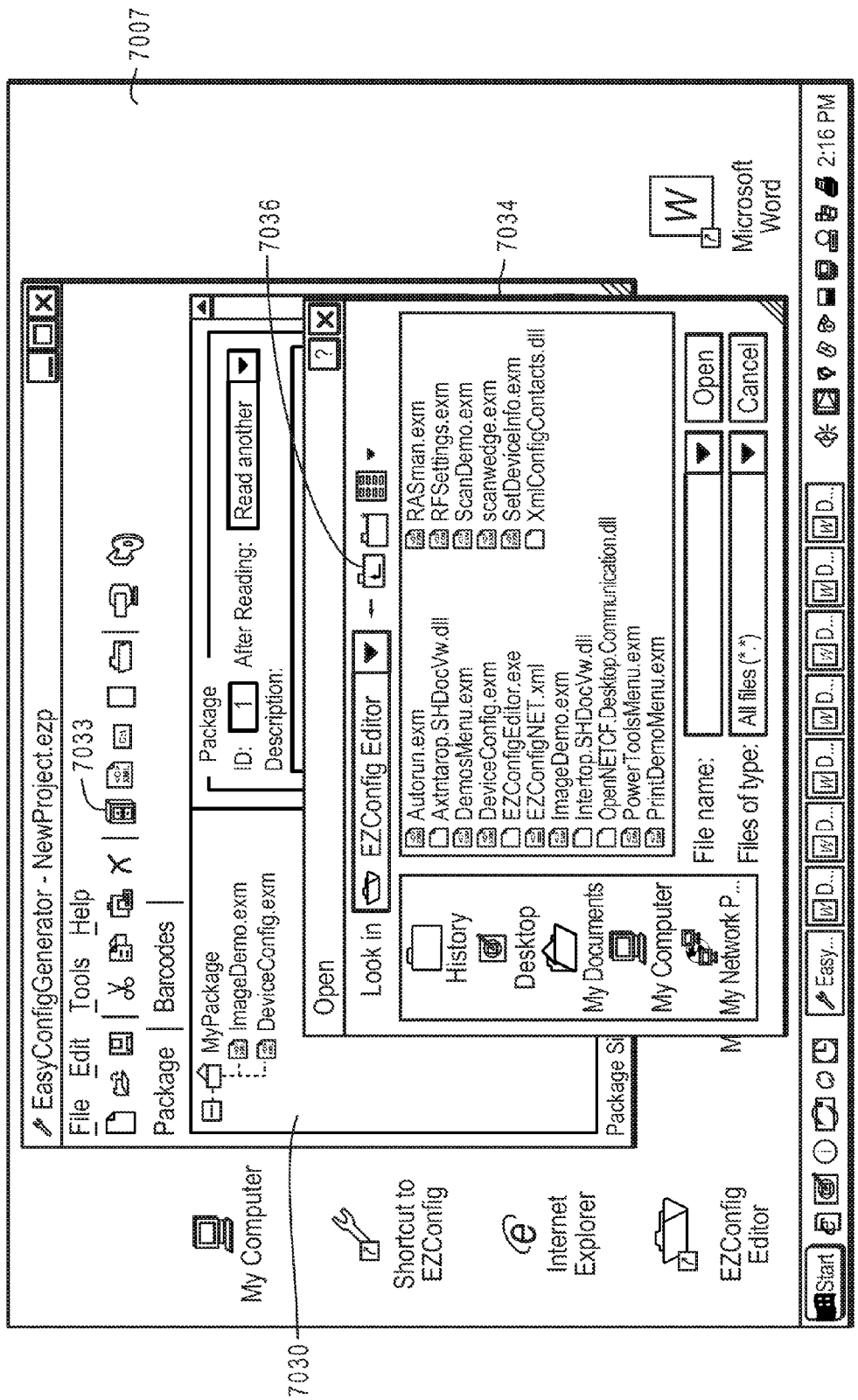
Figure 8G:
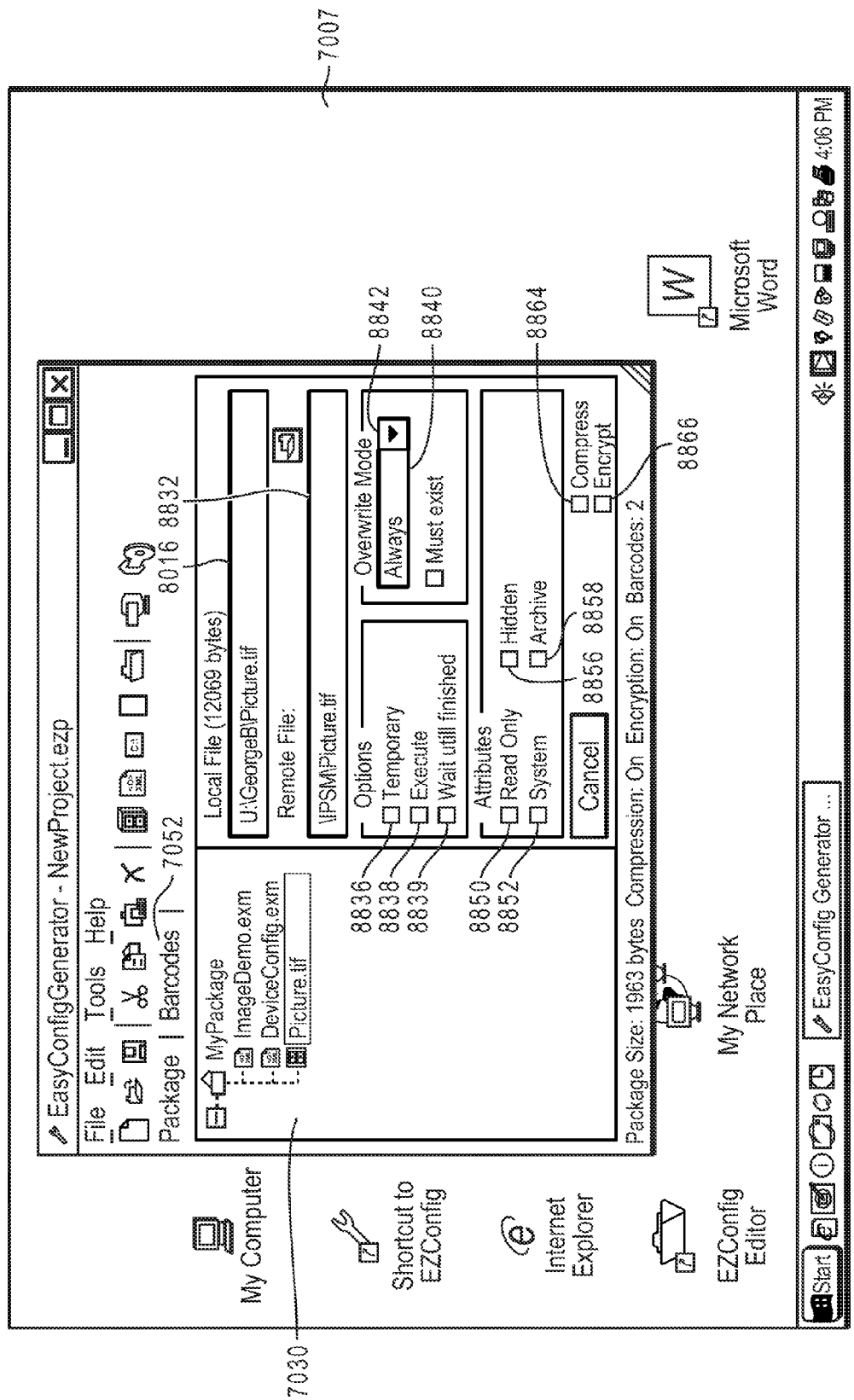

Referring to FIG. 8e, FIG. 8e is a screen shot showing a graphical user interface display screen on display 132 after the file DEVICECONFIG.EXM is selected using file selector window 7034 as shown in FIG. 8c and FIG. 8d. When file DEVICECONFIG.EXM is selected, package status window 7030 indicates that file DEVICECONFIG.EXM is part of the package. Referring to the graphical user interface display screen of FIG. 8f, FIG. 8f illustrates the selection of a file for inclusion in the current data package that is not an XML file. When it is desired to add a file for transferring to data collection terminal 10 that is not an XML file for use in configuring a device of terminal 10 or for any other purpose, generic file selector button 7033 is clicked on. Host computer 100 is configured so that when button 7033 is clicked on; file selector window 7034 is displayed displaying the names corresponding to XML file and non-XML files in a default directory. Host computer 100 is configured so that with window 7034 displayed, folder icon 7036 can be clicked on so that contents other than the default folder are displayed. With further navigation contents of any folder of any computer within the network of FIG. 2d can be displayed on display 132.

FIG. 8g shows a screen shot illustrating the display of a graphical user interface display screen on display 132 after a file stored on a computer other than computer 100 is selected for transfer to data collection terminal 10. Data entry field 8016 of the screen shot of FIG. 8g indicates that a selected TIF file is located on a computer spaced apart from host computer 100. Specifically, the U: path indicated in area 16 indicates that the selected TIF originally resided in server 110, 110-1 as indicated in FIG. 2d. After the file PICTURE.TIF is selected for inclusion in the current data package, the package status area 7030 indicates the selected file PICTURE.TIF is included in the designated current package. The generic file GUI display screen of FIG. 8g which is displayed when a non-XML file is selected for transfer is similar to the XML file GUI display screen of FIG. 8e which is displayed when an XML configuration file is selected for transfer, except that fields for selecting flags and other action indicators are varied. Note that the GUI display screen of FIG. 8e has a simplify XML field 8850 and does not have an execute field 8838, since system 1000 in an illustrative embodiment always attempts to process XML configuration document files having EXM extensions.

System 1000 can be configured so that data collection terminal 10 when receiving a data package from host 100, either by decoding an encoded dataform, i.e., one or more bar codes or by direct data package transferring over a communication path to data collection terminal 10, data collection terminal 10 automatically attempts to execute the received file by associating an executable file with the received file in an attempt to open or run the received file.

Figure 8H:
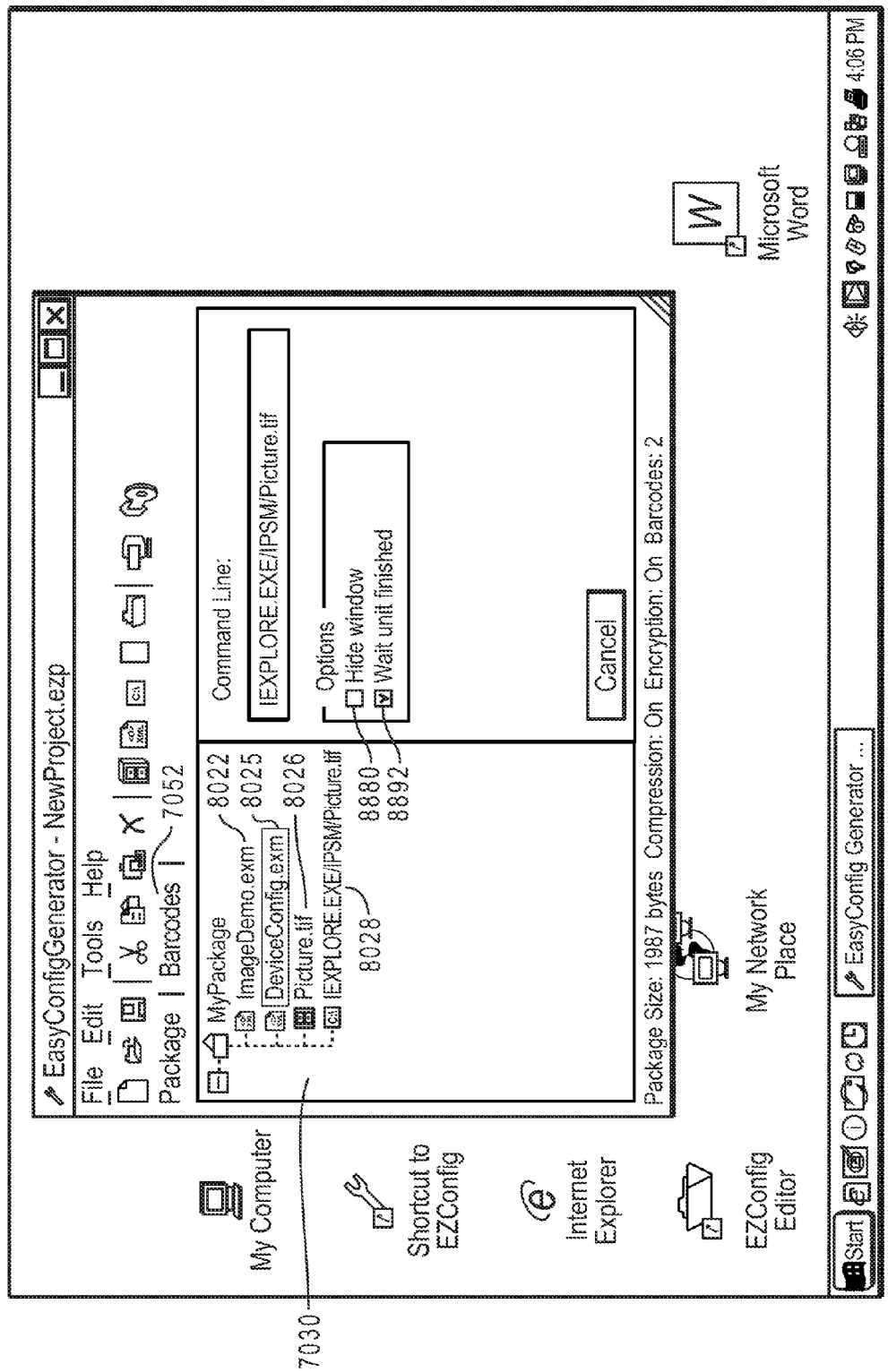
Figure 81:
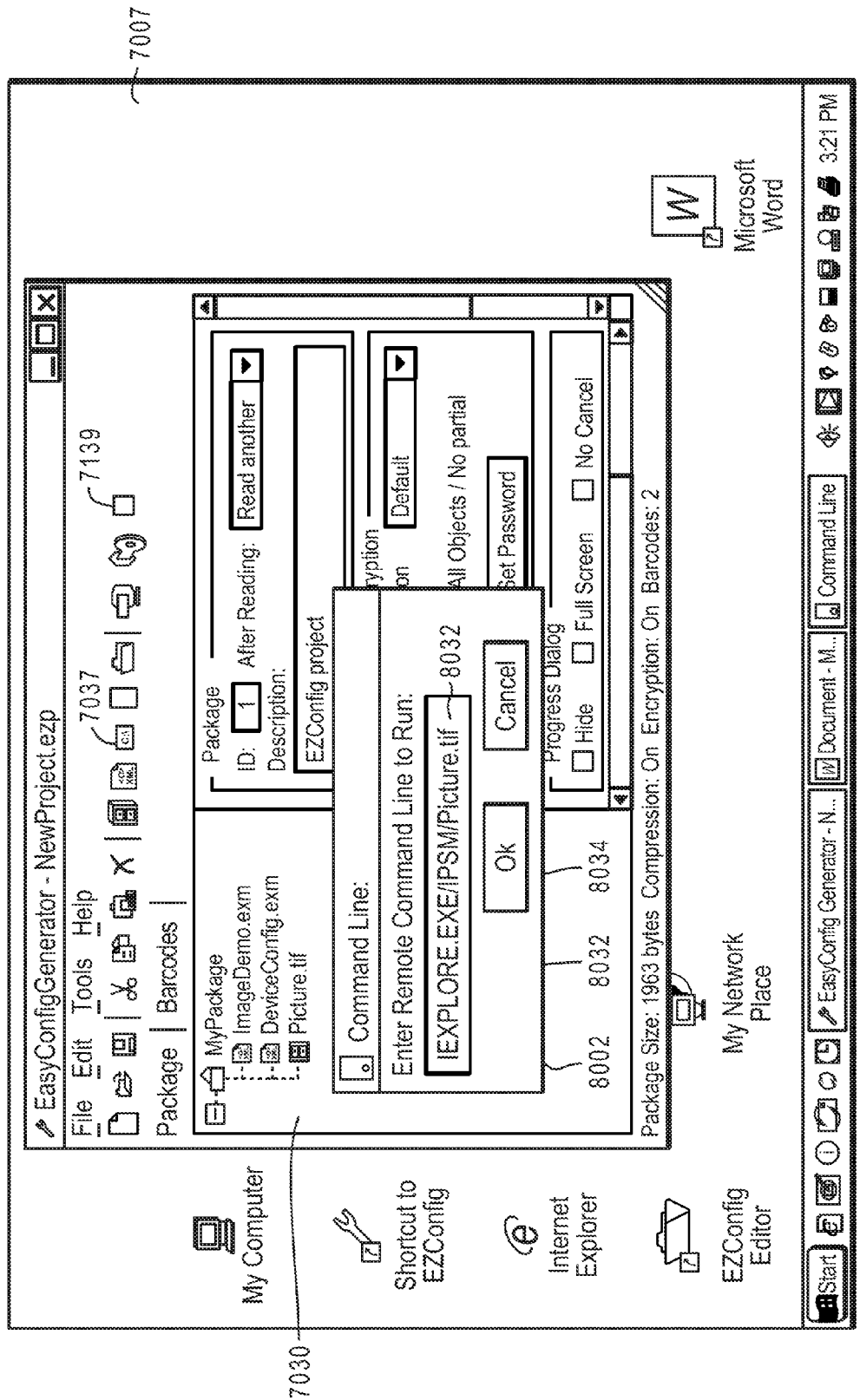

As indicated by FIG. 8i, system 1000 is configured to enable a user to incorporate one or more command lines into a multiple file data package built by host computer 100. FIG. 8i is a screen shot illustrating use of a command line feature to designate a particular program for opening an image file; namely, the file PICTURE.TIF included in a current data package. Host computer 100 is configured so that when command line icon 7037 is clicked on, host computer 100 displays command line window 8002 as indicated in FIG. 8i. If command line window 8002 is displayed, a user can enter any desired command line into area 8032. In the screen shot of FIG. 8i the command line IEXPLORE.EXE/IPSM/PICTURE.TIF is entered into data entry 8032. When OK button 8034 is clicked on, command data corresponding to the command line becomes part of the current data package as is indicated by the screen shot of FIG. 8j. Host computer 100 can be configured so that whenever a file or command is selected for transfer to data collection terminal (e.g., by adding a designator to window 7030 or by highlighting a designator) a user is presented with a GUI display screen allowing a user to select one or more action indicators such as flags for each file or command selected. When an XML configuration document file designated with EXM extension is selected for transfer, the GUI display screen of FIG. 8e can be displayed. When a non-EXM file is selected for transfer, the GUI display screen of FIG. 8g may be displayed. When a command is selected for transfer, the GUI display screen of FIG. 8h may be displayed. It will be seen that additional GUI display screens may be displayed when compression selection data and encryption selection data is added to a data package. Accordingly, it is seen that host computer 100 can be configured to prompt a user, by presenting data entry fields, to set separate action indicators for each file and for each command that is selected for transfer for a data package that can contain file data of more than one file and command data of more than one command. A file or command can be regarded as being selected for transfer when a designator for the file or command is caused to appear in window 7030. If button 7139 is clicked on, a user may be prompted to enter user defined data into a data entry field of host computer 100. User defined data, as has been described is data that does not correspond to a file or a command.

Figure 8J:
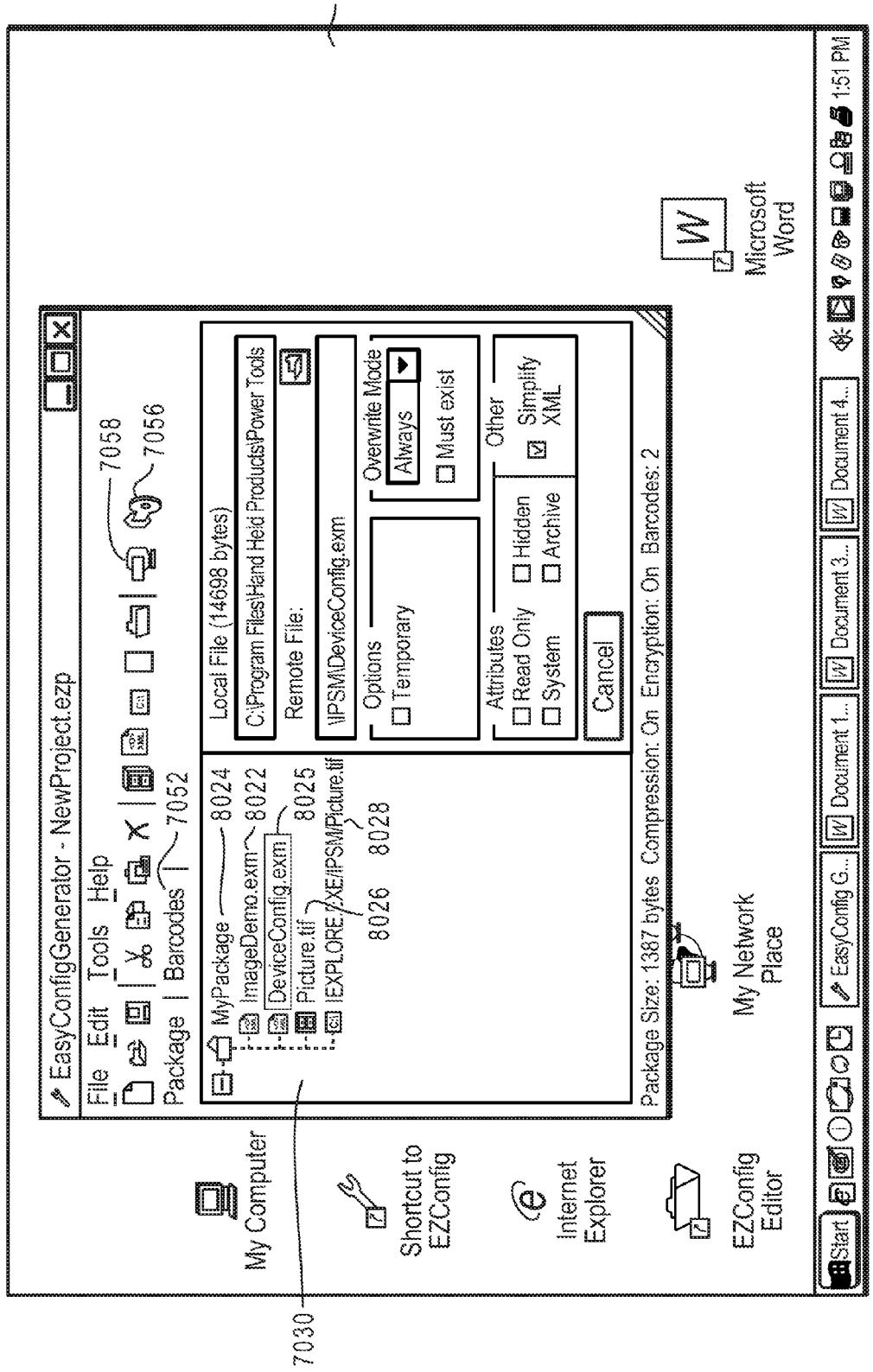

Referring to the screen shot of FIG. 8j, package status area 7030 indicates that the command line entered into window 8002 has been associated as part of the current data package being defined. Referring to the screen shot of FIG. 8j, package status window 7030 indicates that two XML files, a picture file (PICTURE.TIF) and a command line to open the image file have been designated for inclusion in the current data package. The current data package, the status of which is indicated in window 7032, can be encoded into a dataform at any time by clicking on bar codes icon (button) 7052. The created encoded dataform can be subsequently decoded by data collection terminal 10. Files rebuilt at data collection terminal 10 by processing of a received data package will be processed in the order indicated in package status window 7030. In an important aspect, host computer 100 is configured so that the ordering of files and commands of a current data package can be altered or changed simply by dragging and dropping designators 8022, 8025, 8026, 8028 for the data package data displayed in area 7030 into a desired ordering. For example, pointer controller 123 can be used to move pointer 127 (FIG. 1*a*) to click on a designator within area 7030 to change the ordering of the data package data. For example, host computer 100 can be configured so that the ordering of the data package data designated by designator 8025 and the designator 8022 can be switched by clicking on the designator 8025 dragging it upwards (i.e., "dragging and dropping") into the location of 8022 so that the ordering of designators 8025 and 8022 is reversed. The ordering of any of the designators designated within package status window 7030 can be changed by the same drag and drop method. In certain instances, the ordering of the data of a defined data package is of significance. For example, in the screen shot of FIG. 8*j*, the ordering of the command line designator 8028 after the image file designator 8026 is intentional. With the command line corresponding to designator 8028 being executed after the image file is buffered and/or stored on data collection terminal 10, there will be assurance that the image file resides on data collection terminal at the time the command to open the image file is made. Referring to the screen shot of FIG. 8*j*, host computer 100 can be configured so that package building window 7007 includes compression button 7058 for selecting compression of file data and command data and an encryption button 7056 for selecting encryption of file data and command data. In the screen shot of FIG. 8*j*, XML file designator 8025 corresponds to an XML configuration file selected for transfer is highlighted. Host computer 100 is configured so that when compression button 7058 is selected with designator 8025 highlighted the highlighted file and only the highlighted file is designated for compression. Similarly, host computer 100 is configured so when encryption button 7056 is selected with designator 8025 highlighted as shown in FIG. 8*j*, the file corresponding to the highlighted designator and only the file data corresponding to the highlighted designator is designated for encryption.

Figure 8K:
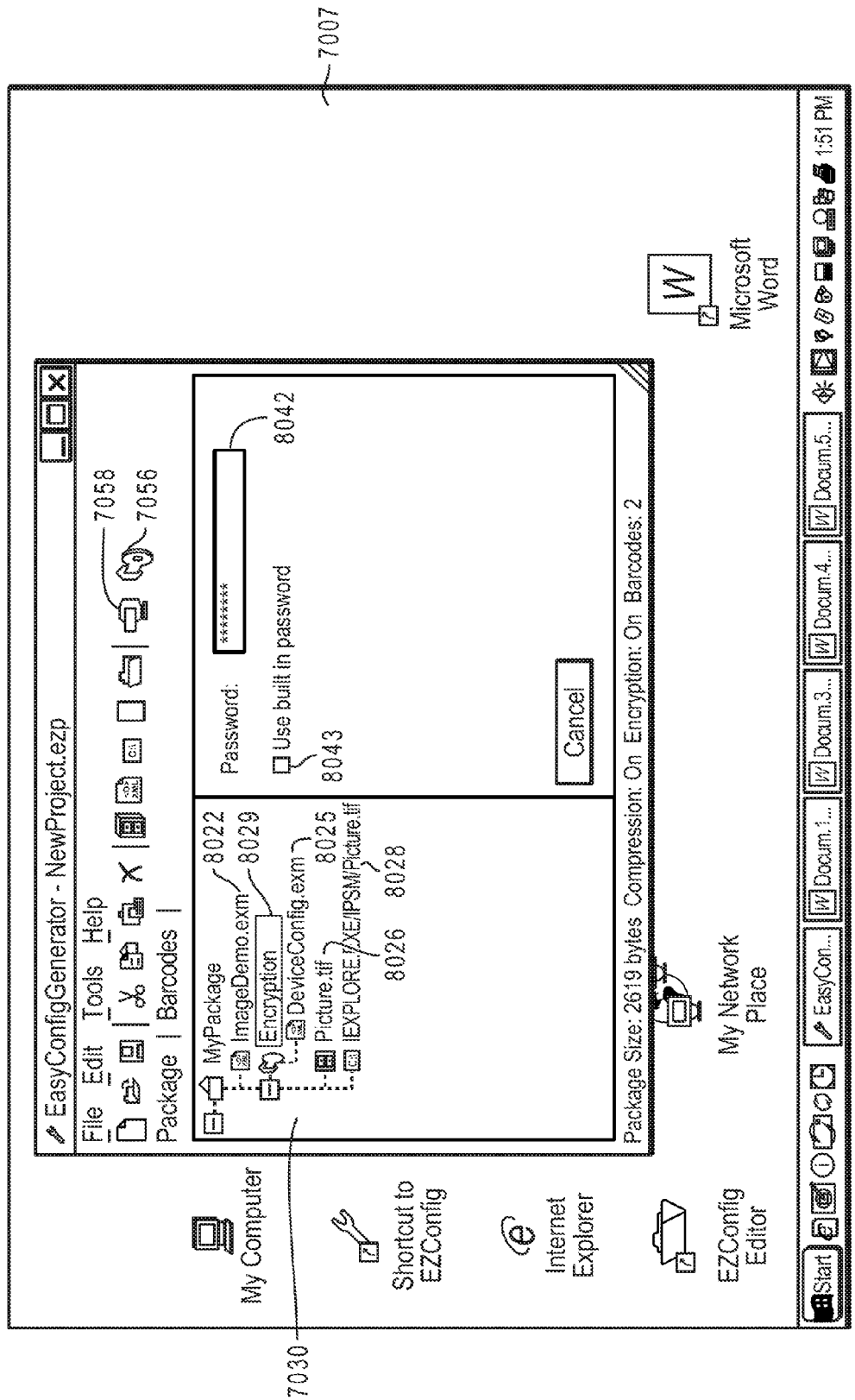

Referring now to screen shot FIG. 8*k*, FIG. 8*k* shows a GUI display screen display displayed by display 132 when encryption icon (button) 7056 is selected with the designator 8025 highlighted. The hierarchy of the tree diagram of package status window 7030 indicates that when encryption button 7056 is selected with designator 8025 highlighted the current package will be established so that only the file DEVICECONFIG.EXM will be designated for encryption independent of a global encryption option which will be described later herein. With further reference to the GUI screen display of FIG. 8*k*, screen display window 7007 of the screen display of FIG. 8*k* includes data entry field 8042 allowing a user to enter a password. Using data entry field 8043 a user can also designate that a built-in password will be used. A password entered into field 8042 can be used as an encryption key for encrypting data. If the data package designated by package status window 7030 of FIG. 8*k* is encoded into a decodable dataform and later decoded by data collection terminal 10 with a global encryption option selected, data collection terminal 10 when encoding the dataform, i.e., a bar code symbol or set of bar code symbols will prompt on display screen 32 of data collection terminal 10 a user of system 1002 enter into data collection terminal 10 a password corresponding to the selection of the global encryptions selection. Further, when processing encryption selection data included in a data package in response to designator 8029 being selected FIG. 8*k*, data collection terminal 10 will display on display 32 of data collection terminal 10 a prompt prompting user of data collection terminal 10 to enter the password entered in information area 8042 of the GUI display screen of FIG. 8*k*. Because in the data package illustrated in package status window 7030 of the screen shot of FIG. 8*k* an encryption designator is not selected for any of designators 8022, 8026 or 8028, data collection terminal 10 will not prompt a user to enter a separate password when processing rebuilt files rebuilt by processing of a received data package other than the file corresponding to designator 8025 for which encryption is selected.

Figure 8L:
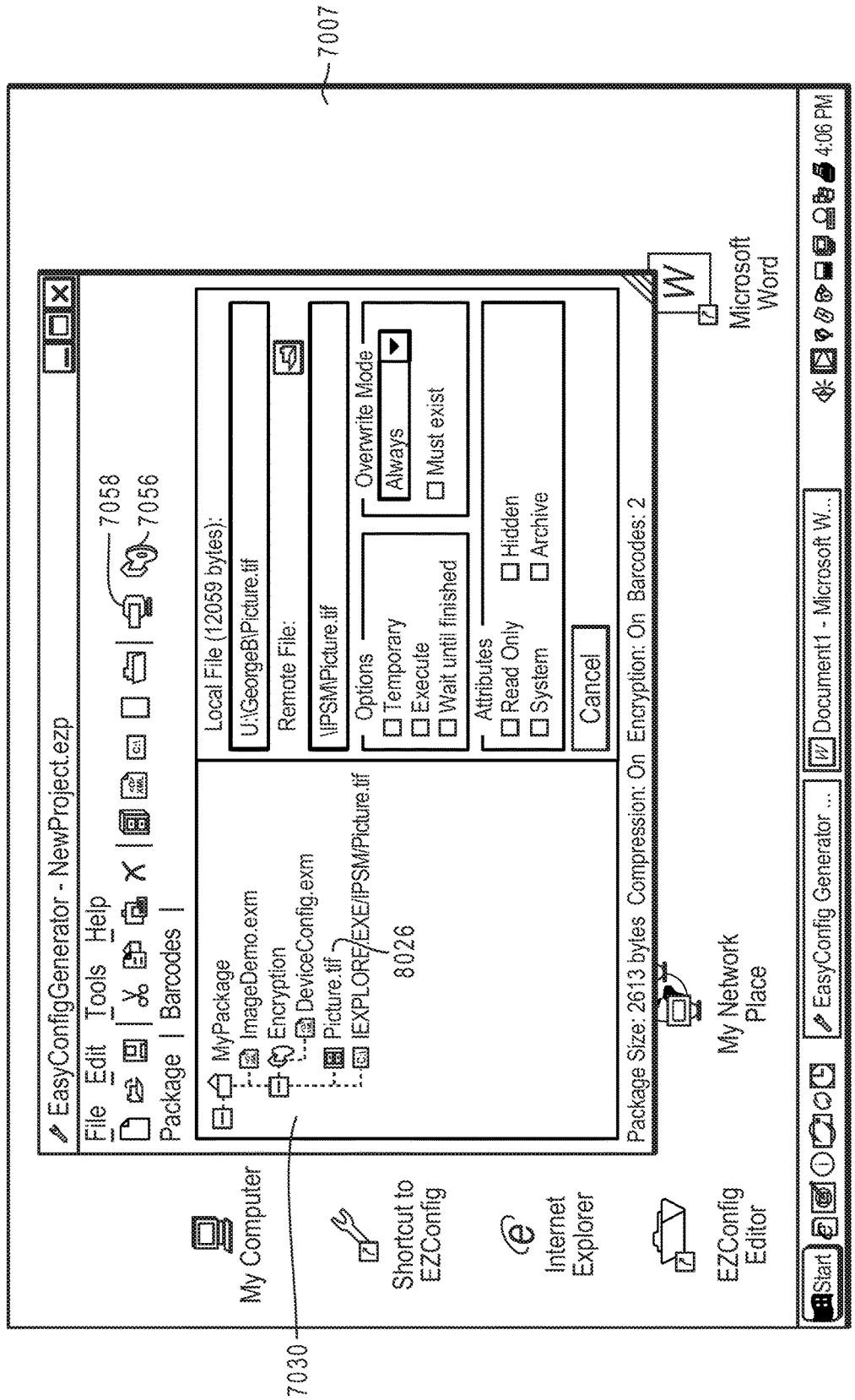
Figure 8M:
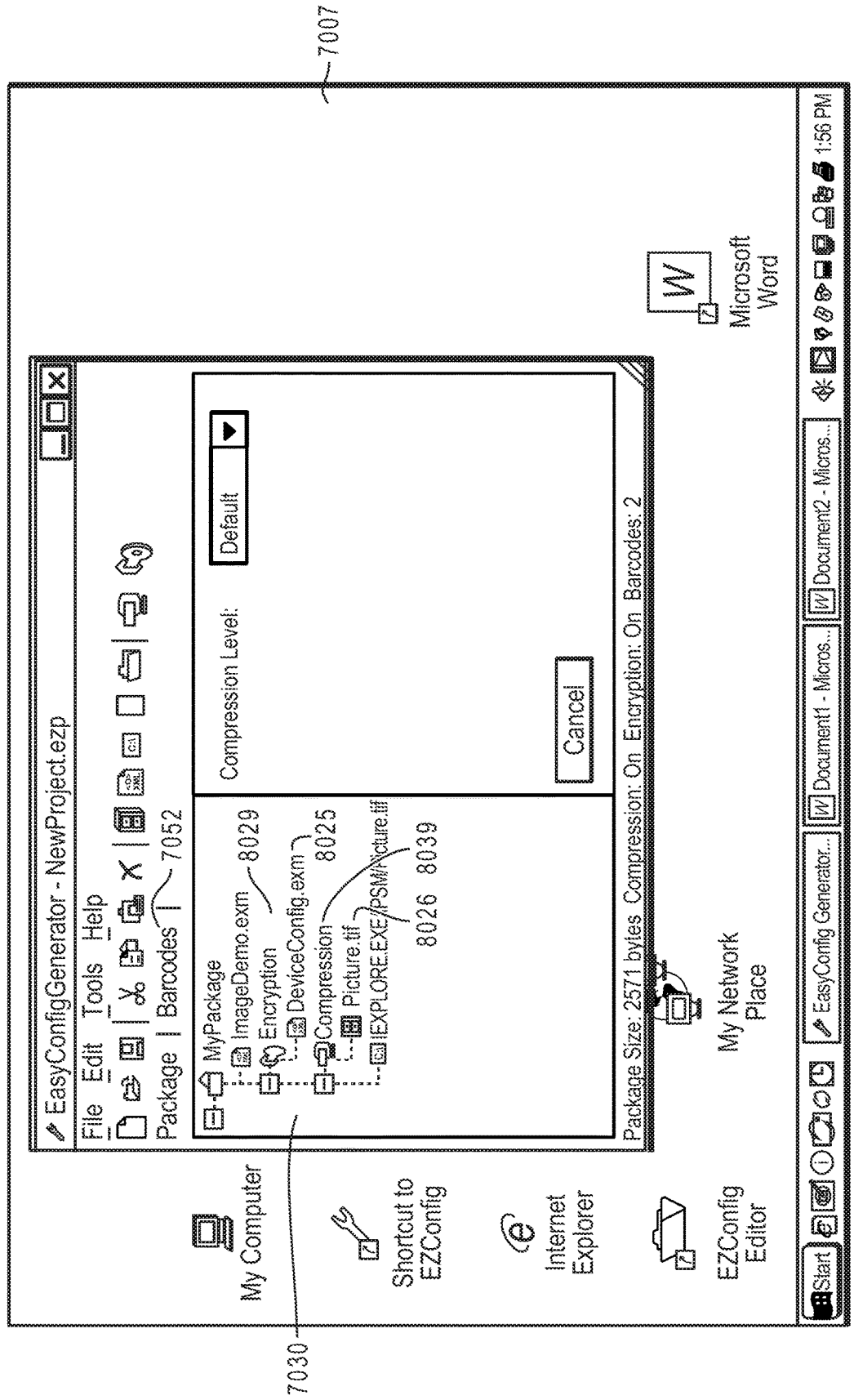

In the screen display of FIG. 8*l*, the package indicated has the same status as the package indicated in package status area 7030 of FIG. 8*k* except that in the screen shot of FIG. 8*l* a designator 8026 corresponding to an image file is highlighted. When compression button 7058 is selected, with the designator 8026 highlighted, file data corresponding to designator 8026 and only file data corresponding to designator 8026 is designated for compressing. After the compression button 7058 is clicked on, the screen display displayed on display 132 by host computer 100 has the form shown in FIG. 8*m*. Package status window 7030 of the screen shot of FIG. 8*m* indicates that file data corresponding to file image file designator 8026 and only that file data is designated for compression independent of a global compression selection.

It is seen that host computer 100 is configured so that when encryption button 7056 is clicked on, an encryption designator 8029 is inserted into the tree diagram of window 7030 illustrating characteristics of the present data package 3000. Likewise, with reference to the screen shot of FIG. 8*m*, host computer 100 can be configured so that when compression button 7058 is clicked on, a compression designator 8039 is automatically inserted into the tree diagram of window 7030. The locations of encryption designators 8029 and compression designators 8039 within the hierarchical tree diagram indicate which data of a data package is to be encrypted and which data is to be compressed. Host computer 100 can be configured so that all data corresponding to designators displayed as children of an encryption designator are encrypted and all data corresponding to designators displayed as children of compression indicators are to be compressed. Accordingly, in the example of the data package represented by the tree diagram of FIG. 8*m*, the file data set corresponding to file designator 8025 is encrypted and the file data set corresponding to designator 8025 is compressed. In the example of the data package represented by the tree diagram of FIG. 8*p*, the file data set corresponding to file designators 8031 and 8032 are encrypted (there being two child file designators under the encryption designator 8029), and the file data set corresponding to designator 8024 is compressed. Host computer 100 can be configured so that like the file and command designators, the encryption designator 8029 and the encryption designator 8029 can be maneuvered about within a displayed hierarchical tree diagram by dragging and dropping of the designators 8029 and 8039. Thus, a set of sibling file designators can be designated for compression simply by dragging and dropping a compression designator 8039 into a location in the tree diagram so that it is a parent designator of the setting sibling designators. The set of sibling file designators can alternatively be designated for encryption by dragging and dropping an encryption designator as a parent of the designators for the files. A data package having any desired layering of encryption or compression for the data of the data page file can be easily defined by dragging and dropping encryption designators and compression designators into appropriate positions in the hierarchical tree diagram of window 7030. Host computer 100 can further be configured to encrypt and compress data off a data package in a manner corresponding to the selections that are designated in the tree diagram displayed in window 7030. Host computer 100 can further be configured to include encryption selection data and compression selection data in a data package in such manner that the data collection terminal can examine the encryption selection data and accordingly apply decryption and decompression schemes in a manner consistent with the applied encryption and compression schemes to rebuild files and commands originally selected for transfer. It will be understood that as encryption selection data and compression selection data of a data package is being defined commands are also being developed to encrypt and compress data of a data package in a manner that is in accordance with the encryption selection data and compression selection data, such that original files and commands can be rebuilt at terminal 10 on de-packaging.

Figure 8N:
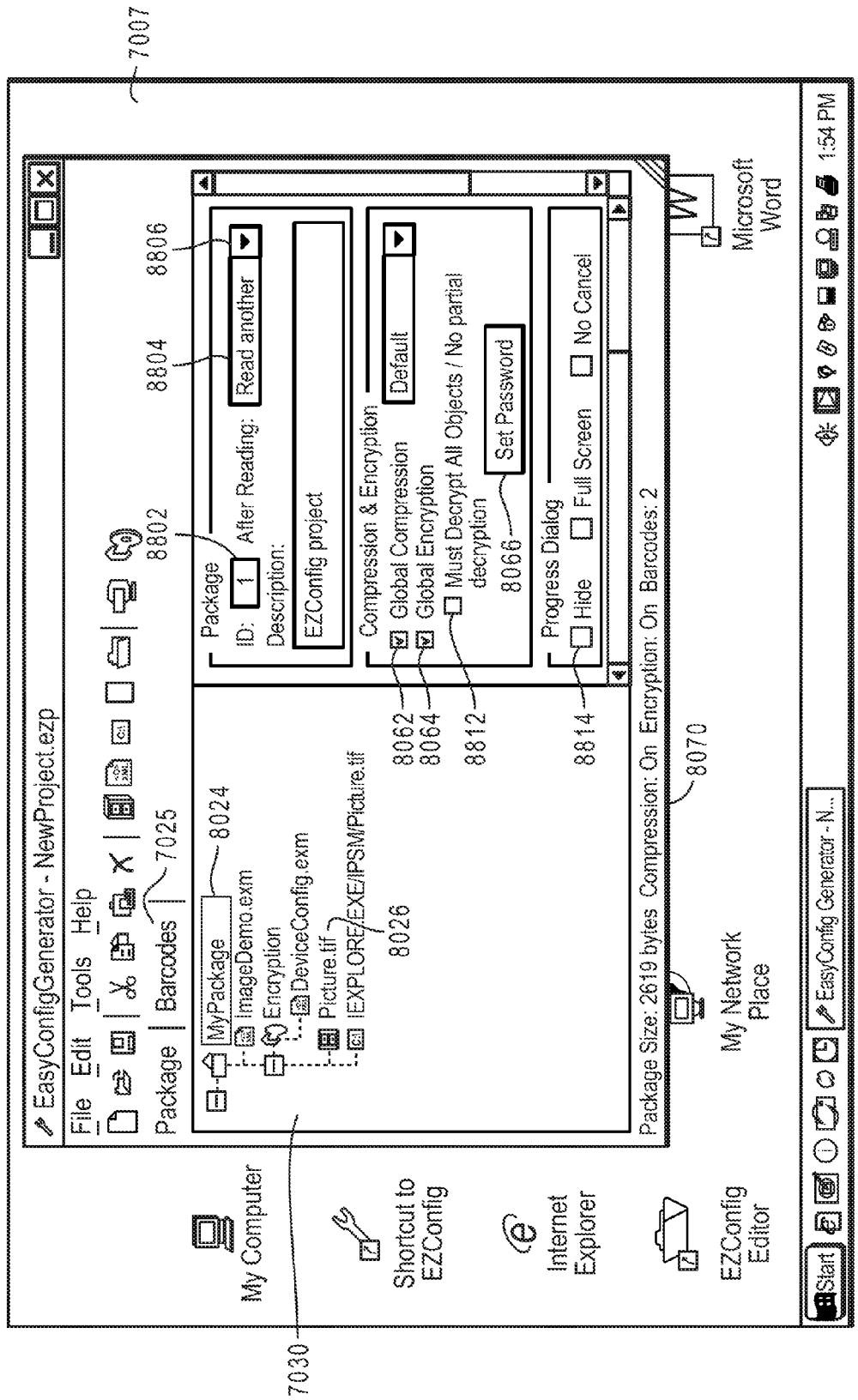
Figure 80:
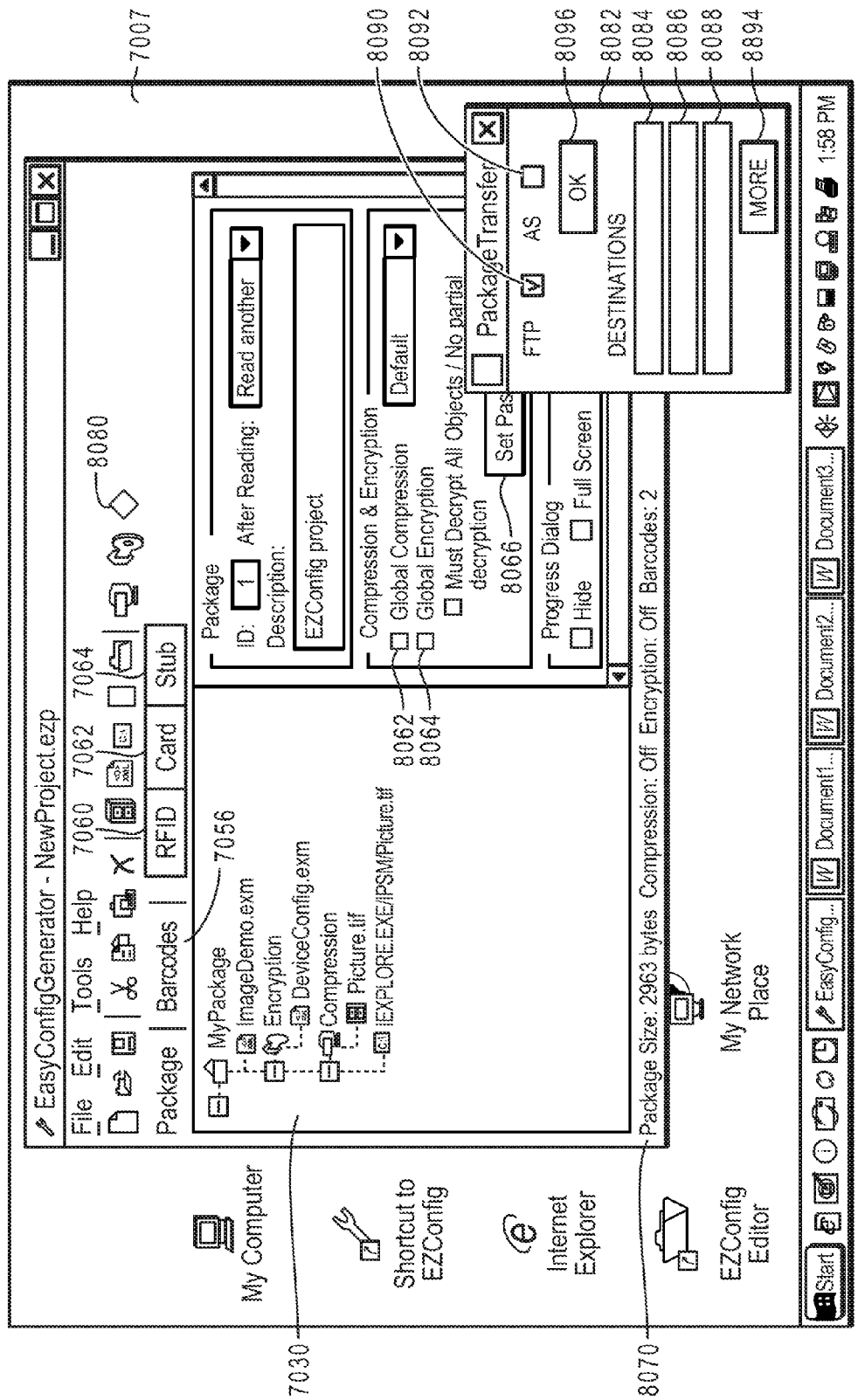

The screen shots of FIGS. 8n and 8o illustrate that a global compression and a global encryption selection for an entire data package can be made independent of encryption and/or compression selections for file data corresponding to individual files of a data package being built. When root designator 8024 is highlighted by clicking on of the "My Package" text in designator area 7030, window 7007 displays a graphical user interface enabling a user to designate either or both of global compression or global encryption of an entire data package. In the screen shot of FIG. 8n global compression is set on using data entry field 8062 and global encryption is set on using data entry field 8064. When global encryption is set on, a user is prompted to set a password for an entire data package by the presentation of button 8086. When button 8086 is clicked on, a user can enter a password in a password entry data entry field (not shown). If the data package is subsequently encoded into an encoded dataform, e.g., by clicking on button 7056 and the decodable dataform is subsequently decoded by data collection terminal 10, terminal 10 prompts on display 32 a user of data collection terminal 10 to enter into data collection terminal 10 the global password for processing of the entire data package. With reference to FIG. 8o, a screen shot is displayed showing the GUI display screen displayed on display 132 of host computer 100 after global compression and global encryption are set to off using area 8062 and area 8066. When global compression and global encryption are set to off the global password button 8066 is disabled. Also, with global compression off and encryption off the size of the current data package increases as seen by comparison of the package size designation indicator 8070 (between the GUIs and FIGS. 8n and 8o), which can be incorporated as part of window 7007.

It will be seen that a data package defined in area 7030 as shown in the screen shot of FIG. 8n with global compression and encryption ON can take the form of data package 3000-6 shown in FIG. 3f. In data package 3000-6, one file data set has one layer of encryption and one layer of compression, one file data set has two layers of encryption and one layer of compression, one file data set has one layer of encryption and two layers of compression, and the command line data set has one layer of encryption and one layer of compression. With global encryption and compression turned OFF, the data of a data package built by host computer 100 can be in the form of data package 3000-7 as shown in FIG. 3g. In data package 3000-7 of FIG. 3g, one file data set has no layers of encryption and no layers of compression, one file data set has an encryption layer but no compression layer, one file data set has a compression layer but no encryption layer and the command line data set has no encryption layer or compression layer.

With precise control over the data of a data package being made available, a variety of useful data packages can be defined. For example, it may be desirable to transfer to data collection terminal 10 a set of files, wherein all of the files except one of the files are low security files which can be accessed by any person, and wherein one of the files is a high security file which can be accessed only by an administrator. The present system can be used to make a data package, with minimal effort, which includes file data corresponding to several low security files, and file data corresponding to the one high security file. In building such a data package, a user would move encrypt designator 8029 in such position as to designate encryption for the one high security file and would set a password access action indicator so that terminal 10 requests a password for only the one security file on de-packaging.

Package headers built by host computer 100 provide instructions as to the manner in which data collection terminal 10 is to process the data package. When processing a data package, the data collection terminal 10 examines flags and other action indicators that have been selected for inclusion in the data package by using host computer 100. For example, a package header data flag of a data package built by host computer 100 may indicate that data collection terminal 10 should be rebooted when processing of the data package. A flag of a package header built by host computer 100 may also indicate that data collection terminal 100 is to provide an output interface indicating the process of the processing of the data package. A summary of exemplary flags and other action indicators (e.g., password selection flags, IDs, etc,) that can be applied to data packages is provided in Table I with further description of the operation of the flags and indicators provided in the ensuing description. In the "function" column of Table I reference is made to FIG. 8n, showing an exemplary GUI display screen which can be used to set flags and other action indicators for a data package.

TABLE I

| Data package Flags and Indicators | | |
|---|---|---|
| Flag/Indicator | Function | Data Entry Field (FIG. 8n) |
| ID | Allows a user to set an ID for the data package. A user can type in e.g., function of the data package and the information will be saved on the data collection terminal. | 8802 |

TABLE I-continued

Data package Flags and Indicators

| Flag/Indicator | Function | Data Entry Field (FIG. 8n) |
|---|---|---|
| After Reading - Reboot | Allows a user to select whether the data collection terminal is to be rebooted. When the reboot flag is raised, the data collection terminal will automatically reboot after processing a data package. Certain files, after being transferred may require rebooting after being saved to the data collection terminal. Therefore, the "After Reading" reboot flag can be raised if transferring a file requiring terminal rebooting. | 8804 (drop down menu accessed by clicking on 8806) |
| After Reading - Exit | A data collection terminal can be configured such that a decode mode can be selected by clicking on icon 2502 or display 32 (FIG. 1h). When a decode mode is selected the terminal 10 is configured so that a next time trigger 24 is activated terminal 10 activates encoded information reading device 12 to attempt to decode a decodable dataform (e.g., bar code, RFID tag, IC card). When the After Reading-Exit flag is raised the terminal exits the decode mode after processing a data package that has been rebuilt at the terminal 10 by decoding a decodable dataform. | 8804 (drop down menu accessed by clicking on 8806) |
| After Reading - Read Another | When this flag is raised, a data collection terminal having a selectable decode mode (FIG. 1h) will remain in a decode mode after processing of a first data package rebuilt at the terminal by decoding a decodable dataform. | 8804 (drop down menu accessed by clicking on 8806) |
| Description | Allows a user to encode in the data package a descriptor for the data package such as the purpose of making the data package. | 8810 |
| Global Compression | Allows a user to select whether global compression is to be applied to the data package. | 8062 |
| Global Encryption | Allows a user to select whether global encryption is to be applied to the data package. | 8064 |
| Must Decrypt All | Allows a user to designate whether all files must be decrypted. If data entry field 8812 is left open to designate that flag is not raised, decryption of some but not all files rebuilt by data collection terminal 10 is allowed (applies when different passwords have been entered for encryption of file data corresponding to individual files selected for transfer). In other words, de-packaging of a data package is allowed to continue even where decryption of encrypted data correspond to a certain file fails. | 8812 |
| Set Password | Allows a user to designate a password for the data package. When the data package is received by a data collection terminal with the "set password" flag raised, the terminal will prompt a user to enter a password before completing processing of the data package (e.g., before initiating encryption) if user has clicked on the set password button and has entered a password for the data package. If a password is entered into the host computer the host computer may use the entered password as an encryption key for encrypting data required to be encrypted. If the set password flag is not parsed, data collection terminal 10 on depackaging can de crypt a data package without prompting for entry of a password. | 8066 |

TABLE I-continued

Data package Flags and Indicators

| Flag/Indicator | Function | Data Entry Field (FIG. 8n) |
| --- | --- | --- |
| Hide | If this flag is raised, the terminal will not display on display 32 any information regarding processing of the data package when receiving data of the data package. | 8814 |

Flags of headers that are built by host computer 100 in accordance with file data/command header builder 110 of packaging module 5008 are examined by data collection terminal 10 and indicate processing steps that are executed by data collection terminal 10 when processing of a data package. For example, if a data package includes file data corresponding to an executable file a flag of a file data header built by host computer 100 in accordance with header can indicate whether the executable file is to be executed when it has been received on data collection terminal 10. A flag built by host computer 100 may also indicate that a file is to be rejected by data collection terminal 10 if there is no pre existing corresponding file already residing in data collection terminal 10. A summary of flags and other action indicators that can be applied to data package in association with file data of a data package is provided in Table II with further description of the operation of the flags and indicators provided in the ensuing description. In Table II, reference is made to the GUI display screen of FIGS. 8e and 8g. Host computer 100 can be configured so that a GUI display screen, such as the GUI display screen of FIGS. 8e and 8g, is displayed on display 132 every time that a new file is selected for transfer to data collection terminal 10 as a data package is being defined. The presentation of the GUI display screen of FIG. 8g allows the inclusion of file specific flags and indicators into a data package. The data collection terminal directory that can be designated in data entry field 8832 of the GUI display screen of FIG. 8g can be regarded as an action indicator to store a selected file in the designated directory when it is rebuilt.

TABLE II

File Specific Flags and Indicators
(In an illustrative embodiment, these flags and indicators can be set on a file specific basis within a data package, i.e., these flags can be set for one file selected for inclusion in data package but not for another file corresponding to file data within a package).

| Flag/Indicator | Function | Data Entry Field FIGS. 8e, 8g |
| --- | --- | --- |
| Remote File | Data entry field allows a user to designate the terminal file directory for the selected file. | 8832 |
| Temporary | When this flag is raised the file selected for transfer and rebuilt at the terminal will be deleted from a buffer memory location after it is buffered during de-packaging of a data package. | 8836 |
| Overwrite Mode - Always | When this flag is raised the data collection terminal always overwrites an existing file of the data collection terminal having the same name and directory as the file selected for transfer. | 8840 (drop down menu accessed by clicking on 8042) |
| Overwrite Mode - Never | When this flag is raised the data collection terminal never overwrites an existing file of the data collection terminal having the same name as the designated directory. | 8840 (drop down menu accessed by clicking on 8042) |
| Overwrite Mode - Newer | When this flag is raised the data collection terminal overwrites an existing file having the same name and designated directory as the file designated for transfer if the file designated for transfer is newer than the existing file of the data collection terminal. For such a determination data collection terminal 10 can examine "modified time and date" fields, such as field 3053 (FIG. 3b) of the transferred file and the files presently stored at terminal 10. | 8840 (drop down menu accessed by clicking on 8042) |

TABLE II-continued

File Specific Flags and Indicators
(In an illustrative embodiment, these flags and indicators can be set on a file specific basis within a data package, i.e., these flags can be set for one file selected for inclusion in data package but not for another file corresponding to file data within a package).

| Flag/Indicator | Function | Data Entry Field FIGS. 8e, 8g |
|---|---|---|
| Overwrite Mode - Prompt | When this flag is raised the data collection terminal displays on display 32 a prompt on reading the flag prompting a user to enter an action indicator into data collection terminal indicating whether the file being rebuilt at the data collection terminal is overwriting a file of the data collection terminal. | 8840 (drop down menu accessed by clicking on 8042) |
| Read Only | When this flag is raised, the file selected for transfer is designated or read only when built at the data collection terminal. | 8850 |
| Execute | When this flag is raised, data collection terminal 10 automatically attempts to execute the file selected for transfer when processing a data package. For example, if the selected file is an executable file, data collection terminal 10 executes the file when rebuilt at the data collection terminal 10. If the selected file is an image file, data collection terminal 10 automatically opens a suitable viewer and attempts to open the file. If this flag is not raised, data collection terminal 10 makes no attempt to execute the file when it is rebuilt on data collection terminal 10. | 8838 |
| System | When this flag is raised the file selected for transfer is designated as a system file when rebuilt at the data collection terminal and saved into the directory designated in data entry field 8832. | 8852 |
| Hidden | When this flag is raised the file selected for transfer is designated as a hidden file when rebuilt at the data collection terminal and saved into the directory designated in field 8832. | 8856 |
| Archive | When this flag is raised the file selected for transfer is designated as an archived file when rebuilt at the data collection terminal and saved into the directory designated field 8832. | 8858 |
| Simplify XML | When this flag is raised the file selected for transfer is a XML configuration file, unnecessary data of an XML document file is removed from the file before being included into the data package. Description text (defined with use of "desc=" attributes in the examples) can be removed along with disabled elements. The GUI display screen of FIG. 7e can be configured to allow a user to "disable" elements of an EXM XML file being edited by allowing a user to change flag | 8868 |

TABLE II-continued

File Specific Flags and Indicators
(In an illustrative embodiment, these flags and indicators can be set on a file
specific basis within a data package, i.e., these flags can be set for one
file selected for inclusion in data package but not for another file
corresponding to file data within a package).

| Flag/Indicator | Function | Data Entry Field FIGS. 8e, 8g |
|---|---|---|
| | status of "flags=" attributes of the XML file. Using the GUI of FIG. 7e a user can right click over a name or parameter setting displayed to change the "flags" status of the element associated with the displayed name or value. After an element has been disabled, a parameter setting of the element cannot be modified unless the element is again enabled. | |
| Compress | When this flag is raised, compression is applied to file data for the specific file selected for transfer, but not to other file data of the data package unless compression is also selected for the other file. When processing the data package, the data collection terminal examines compression selection data and decompresses all compressed files. Compression and encryption selection data can also be designated using a tree diagram with drag and drop functionality. | 8864 |
| Encryption | When this flag is raised, encryption is applied to file data of the file selected for transfer but not to other file data unless specifically selected. The data collection terminal examines encryption selected data of data package and decrypts all file data selected for encryption. Encryption selected data can also be designated using a tree diagram with drag and drop functionality. If data entry field 8866 is checked host computer 100 may prompt a user to enter a password into a data entry field of display 132. | 8866 |
| Encryption Password | When a file specific password is entered, the data collection terminal will prompt a user to enter the file specific password prior to de-encrypting (decrypting) the file on the terminal. When password is entered into host computer 100, host computer 100 may use the password as a key for encrypting the data required to be encrypted. In processing a data package, a terminal may prompt a user to enter a plurality of different passwords (e.g., package password and several file specific passwords). | An encryption password data entry field may take the form of field 8042 (FIG. 8K). |

A summary of flags and other action indicators that can be applied to data package in association with command data of a data package is provided in Table III with further description of the operation of the flags and indicators provided in the ensuing description.

TABLE III

Flags and Indicators For Commands
(e.g., Command Lines and Script)

| Flag/Indicator | Function | Data entry Field (FIG. 8h) |
|---|---|---|
| Wait | When this flag is raised, the data collection terminal when processing the data package suspends processing of the remainder of the data of the data package until the command (e.g., command line or script) has been executed. | 8880 |
| Hide | When this flag is raised, the terminal does not display on its display 132 information indicating that it is executing the encoded command. | 8882 |

As is indicated by the screen shot views of FIG. 7g (in window 7007), FIG. 7j (in widow 7011), and FIG. 8o (in lindow 7007), host computer 100 can be configured to display GUI encoding control buttons in addition to bar codes button 7052. As is indicated by the referenced views, host computer 100 can be configured to display an RFID encoding control button 7060, a card encoding control button 7062, and a USB stub encoding control button 7064. Host computer 100 can be configured so that when RFID encoding control button 7060 is clicked on, host computer 100 generates a command to encode data of a data package into an RFID tag. Host computer 100 can further be configured so that when card encoding control button 7060 is clicked on, host computer 100 generates a command to encode data of a data package into an IC card (Smart Card). Host computer 100 can further be configured so that when USB stub encoding control button 7060 is clicked on, host computer 100 generates a command to encode data of a data package into a USB stub (not shown) which may be docked to host computer 100 at a physical port of I/O interface 180. For encoding of an RFID tag 1620, tag 1620 can be brought into close proximity with RFID reader unit 16 of data collection terminal 100. Host computer 100 with RFID tag 1620 situated in close proximity with data collection terminal 100 can send the generated RFID encoding command to data collection terminal 10 over one of the network connections described in connection with FIGS. 2a-2d. Alternatively, host computer 100 can have a dedicated RFID tag encoder (not shown) which is adapted for electrical contact connection with RFID tag 1620. For encoding of RFID tag 1620, host computer 100 can send the generated RFID tag encoding command to the dedicated RFID encoder. The dedicated RFID encoder can be disposed in an interior of host computer housing 101, or externally of housing 101. For encoding of IC card 1820, IC card 182 can be physically inserted into card reader 1810 of data collection terminal 100 so that IC card 1820 is in electrical contact with contacts 1802 of card reader device 18. With IC card 1820 inserted into card reader 1810, host computer host computer 100 can send the generated IC card encoding command to data collection terminal 10 over one of the network connections described in connection with FIGS. 2a-2d. Alternatively, host computer 100 can have a dedicated card reader device (not shown) and can send a generated card encoding command to the dedicated card reader. The dedicated card reader device can be disposed externally or internally relative to housing 101 of host computer 100. For encoding of a USB stub (not shown), host computer 100 can write a data package to a USB stub docked to host computer 100 when host computer generates a command to encode a USB stub in response to USB stub encoding control button 7064 being actuated.

Figure 8P:
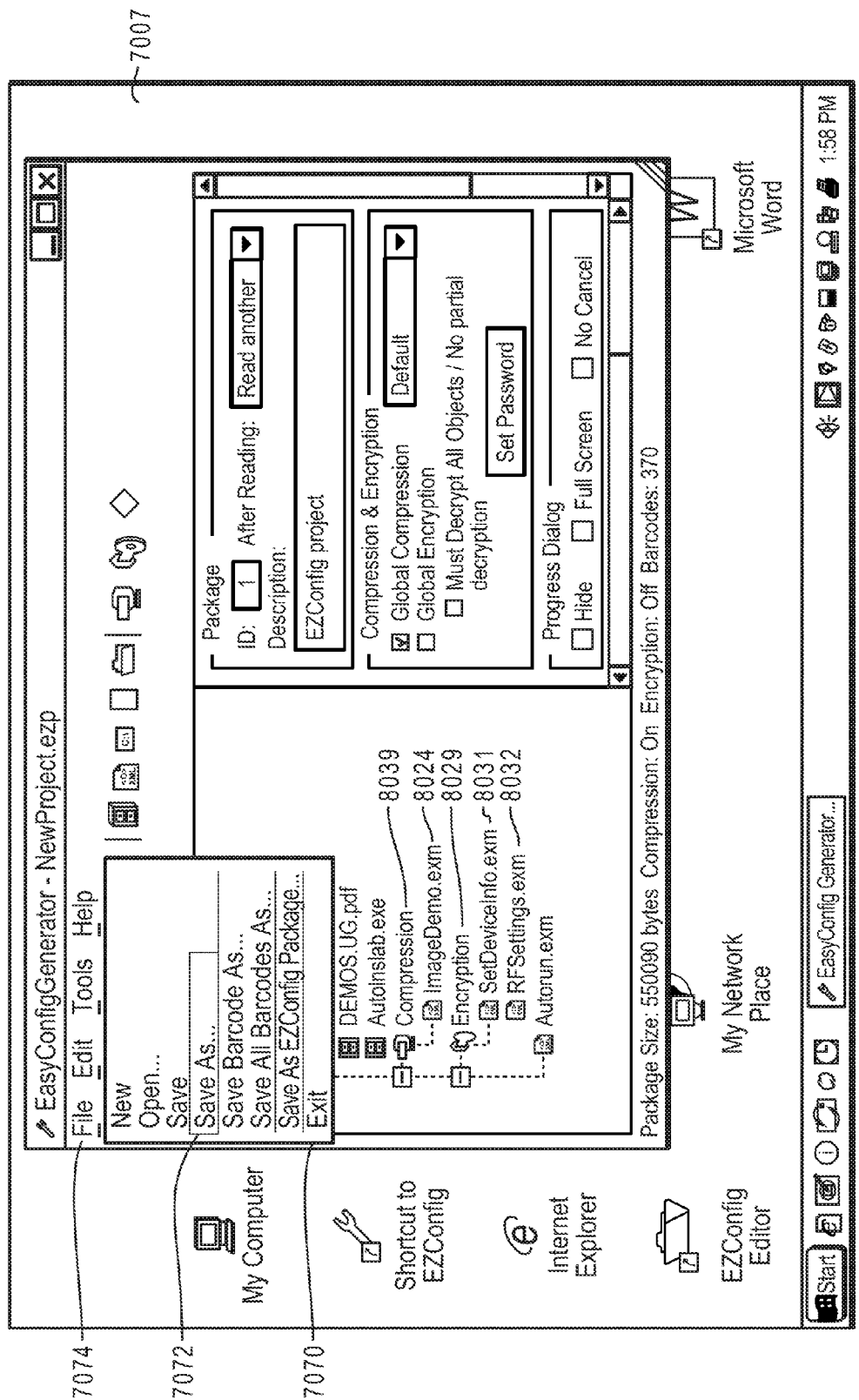
Figure 8Q:
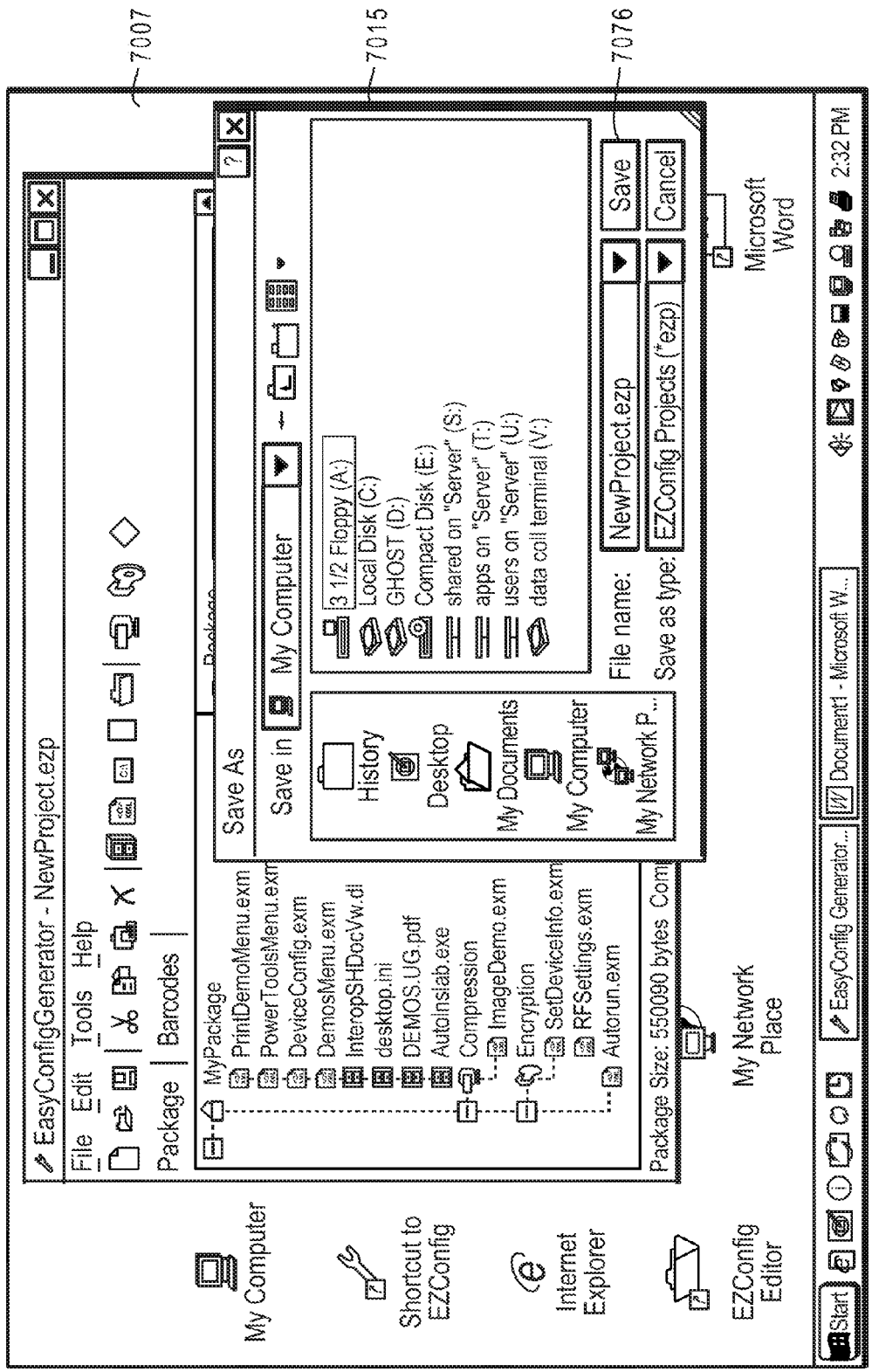

With reference to the screen shots of FIGS. 8p and 8q additional methods by which a data package built by host computer 100 can be sent to an external computer, including data collection terminal 10 are described. Host computer 100 can be configured so that when a data package is built, clicking on file button 7074 causes window 7070 to be displayed as shown in FIG. 8b. The "Save As" button 7072 can then be clicked on to cause display of "Save As" window 7015 as shown in FIG. 8q. With "Save As" window 7015 displayed as shown in FIG. 8q, a user can click on button 7022 numerous times until a menu of available drives is shown as is indicated in the screen shot view of FIG. 8q. In the screen shot view of FIG. 8q where host computer 100 building a data package is computer 100-1 of FIG. 2d, T drive ("T:") can indicate remotely located server 110-2 and U: drive ("U:") can indicate local spaced apart external server 110-1 and V drive ("V:") can indicate data collection terminal 10, 10-1. When one of the drives is selected by clicking on, available directories in the drive are displayed by window 7015, and a selection of an appropriate directory can be made. Pressing save button 7076 saves the built data package to the designated folder in the designated computer. When save button 7076 is clicked on, host computer 100 may initiate a File Transfer Protocol ("FTP") session or another type of communication session such as a non-IP based communication protocol session to transfer the built data package to the designated computer or terminal in a designated file directory.

Referring again to the screen shot display of FIG. 8o, host computer 100 can be configured so that host computer 100 includes data package transfer button 8080. Host computer 100 can be configured so that when button 8080 is clicked on, package transfer graphical user interface window 8094 is displayed on display 132. In data entry field 8090 a user can designate whether a built data package is to be transferred using the File Transfer Protocol ("FTP"). In data entry field 8092 a user can designate whether a built data package is to be transferred using ACTIVESYNC, a software module from MICROSOFT, Inc. installable between two point-to-point connected computers for achieving synchronization between the computers. In areas 8084, 8086, and 8088 a user can designate computers and directories into which to store the built data package. For example, a user can designate T:\packages\NewProject.ezp in area 8084 for storing the data package into remotely located computer 110-2. A user can designate U:\packages\NewProject.ezp in area 8086 for storing the data package into an external locally located computer 110-1 and can designate V:\packages\NewProject.ezp in area 8088 for storing the data package into data collection terminal 10, 10-1 and w:\packages\Newproject.ezp into another field that is like fields 8084, 8086, 8088, accessed by pressing "More" button 8894 to designate another data collection terminal 10, 10-2. Destination indicating information other than directory information can be entered into areas 8084, 8086, 8088. For example, IP addresses can be entered into areas 8084, 8086, 8088 to designate different computers. Telephone numbers that are mapped to IP addresses can also be entered into areas 8084, 8086, 8088 as well as website addresses that are mapped to IP addresses. When OK button 8096 is clicked on, host computer 100 sends the built data package to all of the designated computers including all selected data collection terminals 10 designated in areas 8084, 8086, 8088. Host computer 100 can send the data package to all of the designated receiving computers simultaneously or sequentially one after the other. Host computer 100 can be configured so that when more button 8094 is clicked on, additional data entry field identical to areas 8084, 8086, 8088 are displayed on display 132 enabling a user to designate additional computers for receipt of the built data package.

Referring again to the screen shot display of FIG. 7b, host computer 100 can be configured so that built XML configuration files can be sent to a designated computer such as computer 110-2, computer 110-1, and computer 10-1 (FIG. 2d) by opening window 7003 and clicking on either "Save As" 7045 button or "Save to computer As" 7046. When "Save As" button 7045 is clicked on, computers for receiving the built XML data package can be designated in the manner described in connection with FIGS. 8p and 8q. Host computer 100 can be configured so that if "Save to Computer As" button 7046 is clicked on; host computer 100 saves the built XML file to data collection terminal 10 using ACTIVESYNC communication.

Further aspects of system 1000 are described with reference to Appendices A, B, and C herein. In the appendices A, B, and C, file data sets and command data sets as described herein are referred to generically as "objects". Also referred as "objects" in the appendices is (i) the combination of a set of fields making up an incidence of encryption selection data, and associated encrypted data and (ii) the combination of a set of fields making up an incidence compression selection data, and associated compressed data.

There is provided in one embodiment a data collection system including a data collection terminal having an encoded information reader device and a computer spaced apart from the data collection terminal. The data collection terminal in one embodiment can be configured to be responsive to configuration data expressed in an extensible markup language. The computer in one embodiment can use an existing extensible markup language document to create a data entry screen to received desired parameter settings for the data collection terminal within data entry fields of the data entry screen. The computer can further combine the extensible markup language document with the desired parameter settings to create configuration data and can initiate a transfer of the configuration data to the data collection terminal. The computer in one embodiment can be used to create for transfer to the data collection terminal a data package including file data corresponding to one or more selected files, together with additional data. The system provided can be used to transfer data, including but not limited to configuration data, between computers that are not data collection terminals and which are devoid of encoded information reader devices.

A small sample of methods and apparatuses that have been described herein above are as follows:

(A1) A data collection system comprising: a hand held portable data collection terminal having a bar code reader device for decoding bar code symbols, a manual trigger for actuation of bar code decoding, and a radio transceiver; and a computer spaced apart from said hand held portable data collection terminal, said computer having a display, said hand held portable data collection terminal and said computer being configured as part of an IP network including both of said hand held portable data collection terminal and said computer; said computer being configured to display a graphical user interface prompting an operator of said data collection system to enter configuration data for reconfiguring said radio transceiver, said computer further being configured to process configuration data entered by said operator at said computer to build an extensible markup language document including said entered data; wherein said data collection system is configured so that said extensible markup language document can be transferred from said computer to said hand held portable data collection terminal either by way of (i) encoding data of said extensible markup language and then decoding said encoded data utilizing said bar code reader device of said portable data collection device or (ii) transmitting data of said extensible markup language document from said computer to said portable data collection terminal utilizing a data communication protocol supported by said IP network. There is also described (A2) The data collection system of claim A1, wherein said computer is further configured to build a data package including said extensible markup language document and file data corresponding to a file other than extensible markup language document. There is also described (A3) the data collection system of claim A1, wherein said computer and said portable data collection terminal are included in a common local area network.

There is also described (B1) A data collection system comprising: a hand held portable data collection terminal having a bar code reader device for decoding bar code symbols, a manual trigger for actuation of bar code decoding, and a radio transceiver; a computer spaced apart from said hand held portable data collection terminal, said computer having a display, said hand held portable data collection terminal and said computer being configured as part of an IP network including both of said hand held portable data collection terminal and said computer; said computer being configured to display a graphical user interface prompting an operator of said data collection system to select data for inclusion in a data package, said computer building a data package in accordance with at least one selection of said operator; wherein said data collection system is configured so that said data package built by said computer can be transferred from said computer to said hand held portable data collection terminal by either of (i) encoding data of said data package and then decoding said encoded data utilizing said bar code reader device of said portable data collection terminal or (ii) transmitting said data package from said computer to said portable data collection terminal utilizing a data communication protocol supported by said IP network. There is also described (B2) the data collection system of claim B1, wherein said data communication protocol is the File Transfer Protocol (FTP). There is also described (B3) The data collection system of claim B1, wherein said first file is an executable file and said second file is an .XML file.

There is also described (C1) A data collection system comprising: a data collection terminal having an encoded information reader device, the data collection terminal responsive to configuration data expressed in an extensible markup language for configuring operation of the data collection terminal; and a computer spaced apart from the data collection terminal that uses an existing extensible markup language document to create a data entry screen to receive desired parameter settings for the data collection terminal within data entry fields, combines the extensible markup language document with the desired parameter settings to create configuration data expressed in an extensible markup language, and initiates a transfer of the configuration data to said data collection terminal. There is also described (C2) the data collection system of claim C1, wherein the transfer is initiated by encoding the configuration data within a printed symbology readable by the data collection terminal. There is also described (C3) The data collection system of claim C1, wherein the transfer is initiated by transmitting the configuration data to said data collection terminal using one of TCP/IP, USB, or IRDA. There is also described (C4) The data collection system of claim C1, wherein the transfer is initiated by generating a data package including said configuration data and file data corresponding to a file other than a configuration file. There is also described (C5) the data collection system of claim C1, wherein the existing extensible markup language document file is retrieved by the computer from the data collection terminal. There is also described (C6) the data collection system of claim C1, wherein the data collection terminal configures the encoded information reader device based on the configuration data. There is also described (C7) The data collection system of claim C1, wherein the data collection terminal further comprises a wireless communication link and wherein the wireless communication link is configured based on the configuration data. There is also described (C8) the data collection system of claim C1, wherein the extensible markup language document comprises parameter settings and descriptions of the parameter settings. There is also described (C9) the data collection system of claim C8, wherein the description of the parameter settings include validation rules. There is also described (C10) the data collection system of claim C1, wherein the extensible markup language document comprises parameter settings and attributes of the parameter settings, wherein the attributes indicate an ability of a user to modify a parameter setting. There is also described (C11) the data collection system of claim C1, wherein the computer initiates the transfer of the configuration data by removing extraneous data from the extensible markup language document. There is also described (C12) the data collection system of claim C11, wherein the extraneous data comprises data which is not required by the data collection terminal to implement parameter settings contained in the configuration data. There is also described (C13) The data collection system of claim C12, wherein the extraneous data comprises data regarding parameter settings contained in the configuration data that will not change existing parameter settings on the data collection terminal. There is also described (C14) The data collection system of claim C1, wherein the computer initiates the transfer of the configuration data structure by embedding the configuration data into a data package including file data corresponding to a plurality of different file types. There is also described (C 15) the data collection system of claim C1, wherein the desired parameter settings include parameter settings for configuring an application on the data collection terminal. There is also described (C16) the data collection system of claim C1, wherein the desired parameter settings include parameter settings for configuring a user interface on the data collection terminal. There is also described (C17) the data collection system of claim C1, wherein the desired parameter settings include settings for configuring a power usage profile on the data collection terminal. There is also described (C18) the data collection system of claim C1, wherein the desired parameter settings include parameter settings for configuring a communication device on the data collection terminal. There is also described (C19) The data collection system of claim C18, wherein the communication device is one or more of a wireless networking device, an 802.11 device, a USB interface, a BLUETOOTH interface, and a cellular communication interface. There is also described (C20) the data collection system of claim C1, wherein the desired parameter settings include parameter settings for configuring a peripheral detachably attached to the data collection terminal. There is also described (C21) The data collection system of claim C1, wherein the computer initiates the transfer of the configuration data by outputting one or more bar codes representative of the configuration data. There is also described (C22) the data collection system of claim C21, wherein the computer outputs the one or more barcodes onto a display associated with the computer. There is also described (C23) the data collection system of claim C21, wherein the computer outputs the one or more barcodes onto a printer associated with the computer. There is also described (C24) The data collection system of claim C1, wherein the computer in combining the extensible markup language document with the desired parameter settings integrates the extensible markup language document with any desired parameter settings by updating items within the extensible markup language document based on user input received via the data entry screen and removing items for which no desired parameter settings are received or for which no change is indicated. There is also described (C25) The data collection system of claim C24, wherein the data collection terminal comprises an application that receives the configuration data and facilitates modifying the behavior of the data collection terminal based on the parameter settings contained in the configuration data. There is also described (C26) the data collection system of claim C25, wherein the application overrides existing parameter settings not included in the configuration data. There is also described (C27) the data collection system of claim C25, wherein the application only updates parameter settings included in the configuration data. There is also described (C28) The data collection system of claim C1, wherein the data collection terminal comprises an application that receives the configuration data and facilitates modifying the behavior of the data collection terminal based on the parameter settings contained in the configuration data. There is also described (C29) the data collection system of claim C28, wherein the application replaces a pre-existing configuration data structure on the data collection terminal with a received data structure including the configuration data. There is also described (C30) The data collection system of claim C28, wherein the application updates parameter settings in a pre-existing configuration file on the data collection terminal based on the received configuration data. There is also described (C31) The data collection system of claim C28, wherein the application uses the configuration data to either replace or update a pre-existing configuration file on the data collection terminal based on a flag in a data structure including the configuration data. There is also described (C32) The data collection system of claim C1, wherein said computer in combining said extensible markup language document with said desired parameter settings replaces existing parameter settings of said extensible markup language document with new parameter settings input by a user of said system. There is also described (C33) The data collecting system of claim C1, wherein said encoded information reader device is selected from the group consisting of a bar code reader device, an RFID reader device, and a card reader device.

There is also described (D1) A data collection system comprising: a data collection terminal having an encoded information reader device, the data collection terminal having an extensible markup language document from which the data collection terminal is configured; a computer that uses a copy of the extensible markup language document to create a data entry screen to receive desired settings in data entry fields for configuring the data collection terminal, combines the extensible markup language document with the desired settings to create configuration data, and initiates a transfer of the configuration data to a data collection terminal spaced apart from said computer; and a configuration application on the data collection terminal that receives the configuration data and updates or replaces the extensible markup language document with data contained in the configuration data structure.

There is also described (E1) A data collection system comprising: a data collection terminal having a encoded information reader device; and a computer spaced apart from said data collection terminal that receives from a user identification of first and second files for transfer to said data collection terminal, prompts a user to enter at least one action indicator for each file identified by a user, creates a single data package incorporating file data corresponding to the identified first and second files and at least one action indicator, and enables a transfer of the single data package to said data collection terminal. There is also described (E2) the data collection system of claim E1, wherein at least one identified file is an executable file. There is also described (E3) The data collection system of claim E1, wherein at least one file is a configuration file containing data used to configure the data collection terminal. There is also described (E4) the data collection system of claim E1, wherein the transfer is enabled by encoding the single data package in a symbology readable by the data collection terminal. There is also described (E5) the data collection system of claim E4, wherein the printed symbology comprises a plurality of bar codes. There is also described (E6) The data collection system of claim E1, wherein the transfer is enabled by transmitting the single data structure to said data collection terminal using a communication path operating in accordance with one of TCP/IP, USB, or IrDA. There is also described (E7) The data collection system of claim E1, wherein the single data package for transfer to said data collection terminal includes file data corresponding to said first and second files, and at least one of command data, compression selection data, and encryption selection data. There is also described (E8) The data collection system of claim E1, wherein the data package comprises at least two of command data, file data corresponding to a configuration file, encryption selection data and compression selection data. There is also described (E9) The data collection system of claim E1, wherein the indication of an action associated with at least one of the files is added as header data of a file data set corresponding to the file. There is also described (E10) The data collection system of claim E1, wherein said data collection terminal is configured to automatically process received file data of said single data package in a manner dependent on a file type corresponding to said file data. There is also described (E11) the data collection system of claim E1, wherein said at least one action indicator of said single data package comprises a wait and a hide action. There is also described (E12) the data collection system of claim E1, wherein said at least one action indicator of said single data package comprises at least one of indications of execute, wait, temporary, must exist, overwrite mode, and attributes. There is also described (E13) the data collection system of claim E1, wherein said at least one action indicator of said single data package comprises at least two action indicators. There is also described (E14) the data collection system of claim E1, wherein the at least one action indicator includes an indication that the data collection terminal should be rebooted. There is also described (E15) the data collection system of claim E1, wherein the at least one action indicator includes an indication that the data collection terminal should be await a further transfer of data structures. There is also described (E16) the data collection system of claim E1, wherein the at least one action indicator includes an indication that the data collection terminal should only process the single data structure if certain data of said single data package is successfully decrypted. There is also described (E17) the data collection system of claim E1, wherein the at least one action indicator includes an indication that the data collection terminal should display a progress dialog window indicating progress of processing the single data package. There is also described (E18) The data collection system of claim E1, wherein computer is configured to display a tree diagram displaying indicators of said first and second files, and wherein said computer is further configured to display at least one of a compression selection designator and encryption selection designator in said tree diagram, and wherein said computer is configured to compress and/or encrypt file data of said single data package in accordance with the position of said compression and/or encryption selection data indicated represented in said tree diagram. There is also described (E19) The data collection system of claim E18, wherein said computer has drag and drop functionality enabling a user to select whether file data of said indicated files are to be compressed by maneuvering said compression designator within said tree diagram. There is also described (E20) The data collection system of claim E18, wherein said computer has drag and drop functionality enabling a user to select whether file data of said indicated files are to be encrypted by maneuvering said encryption designator within said tree diagram. There is also described (E21) The data collection system of claim E1, wherein file data corresponding to said first file is compressed and file data corresponding to said second file is not compressed. There is also described (E22) The data collection system of claim E1, wherein file data corresponding to said first file is encrypted and file data corresponding to said second file is not encrypted. There is also described (E23) The data collection system of claim E18, wherein the single data package is further provided with an indication that the data collection terminal should only process the single data package if certain data of said single data package is successfully decrypted. There is also described (E24) The data collection system of claim E18, wherein the computer further adds a user defined data set to said data package.

There is also described (F1) A system comprising: (a) a data collection terminal having an encoded information reader device, a control circuit, a radio transceiver, and a memory, the memory storing an Extensible Markup Language configuration file, the configuration file having a hierarchical tree structure, the configuration file having a device element including name content designating a device of said data collection terminal and a plurality of parameter elements of lower hierarchy than said device element, each of said parameter elements including parameter value content designating a parameter value controlling operation of said device; and (b) a host computer spaced apart from said data collection terminal, wherein said host computer is operable in a mode in which said host computer reads said configuration file from said data collection terminal, parses said configuration file and displays said name content designating a device of said terminal in a graphical user interface window, the host computer enabling a user to change parameter values of said configuration file, the host computer building an edited configuration file including parameter values changed by a user, the host computer being configured so that said host computer can display parameter values associated with said device that can be changed by a user. There is also described (F2) the system of claim F1, wherein said device is selected from the group consisting of a radio transceiver and an encoded information reader device. There is also described (F3) The system of claim F1, wherein said host computer is configured to be commanded to encode on a physically transportable medium a decodable dataform, the decodable dataform encoding said edited configuration file and being readable by said encoded information reader device. There is also described (F4) The system of claim F1, wherein said host computer is configured to be commanded to encode on a physically transportable substrate a decodable bar code symbol, the decodable dataform encoding said edited configuration file. There is also described (F5) The system of claim F1, wherein said host computer is configured to be commanded to encode on a physically transportable medium a decodable dataform, the decodable dataform encoding said edited configuration file, the host computer having an information entry area enabling a user to designate whether content should be removed from said edited configuration file prior to being encoded.

There is also described (G1) A system for reconfiguring a data collection terminal having an encoded information reader device and a radio transceiver, said system comprising: (a) a host computer having a display and a pointer controller for controlling movement of a graphical user interface pointer on said display; (b) an extensible markup language configuration file accessible by said host computer for reconfiguring said radio transceiver, said configuration file having a radio transceiver element including name content designating said radio transceiver and a plurality of parameter elements of lower hierarchy than said radio transceiver element, each said parameter elements including parameter value content designating parameter values controlling operation of said radio transceiver, said configuration file further containing descriptive content for each of several of said parameter elements, the descriptive content including text describing the affect of changing a parameter; (c) wherein said host computer is configured to parse said configuration file and to display on said display said parameter values and said descriptive content, the host computer being configured to enable a user of said system to change a displayed parameter value displayed on said first graphical user interface window and to build an edited configuration file including a parameter value that has been changed by a user. There is also described (G2) The system of claim G1, wherein said host computer is configured to be commanded to encode in a transportable medium a decodable dataform that encodes said edited configuration file. There is also described (G3) The system of claim G1, wherein said host computer is configured to display on said display said parameter values on a first graphical user interface window separate from a second graphical user interface window display. There is also described (G4) the system of claim G3, wherein said first and second graphical user interface windows are sub-windows of a larger window.

There is also described (H1) A system comprising: (a) a data collection terminal having an encoded information reader device, a control circuit, a radio transceiver, and a memory, the memory storing an extensible markup language configuration file, the configuration file having a hierarchical tree structure, the configuration file having a radio transceiver element including name content designating said radio transceiver and a plurality of parameter elements of lower hierarchy than said radio transceiver element, each said parameter elements including parameter value content designating parameter values of said radio transceiver; and (b) a host computer spaced apart from said data collection terminal, wherein said host computer is operable in a mode in which said host computer reads said configuration file from said data collection terminal, parses said configuration file and displays said name content designating said radio transceiver and said parameter values, the host computer enabling a user to change parameter values of said configuration file, the host computer building an edited configuration file including parameter values changed by a user. There is also described (H2) The system of claim H1, wherein said host computer is configured to be commanded to encode on a physically transportable medium a decodable dataform, the decodable dataform encoding said edited configuration file and being readable by said encoded information reader device. There is also described (H3) The system of claim H1, wherein said host computer is configured to be commanded to encode on a physically transportable substrate a decodable bar code symbol, the decodable dataform encoding said edited configuration file. There is also described (H4) The system of claim H1, wherein said host computer is configured to be commanded to encode on a physically transportable medium a decodable dataform, the decodable dataform encoding said edited configuration file, the host computer having an information entry area enabling a user to designate whether content should be removed from said edited configuration file prior to being encoded.

There is also described (I1) A system comprising: (a) a host computer for use in building a data package, the host computer having a display, the host computer being configured to display a graphical user interface enabling a user to select first and second files for packaging and being configured to package into a single data package file data corresponding to a plurality of files, wherein said graphical user interface enables a user to instruct said host computer to compress file data of said first file without compressing file data of said second file, and wherein said host computer in response to receiving a user request to compress file data of said first file without compressing file data of said second file, builds a data package including file data corresponding to said first file in compressed form and file data corresponding to said second file in uncompressed form, the host computer also having a bar code button and being configured so that when said bar code button is actuated, said host computer encodes said data package into one or more decodable bar code symbols; and (b) a hand held data collection terminal having a bar code reader device, said hand held data collection terminal being configured to decode said at least one bar code symbol encoded by said host computer to recover said data package, said hand held data collection terminal further being configured to process said data package recovered when said one or more bar code symbols are decoded.

There is also described (J1) A system comprising: (a) a host computer for use in building a data package, the host computer having a display, the host computer being configured to display a graphical user interface enabling a user to select first and second files for packaging and being configured to package into a single data package file data corresponding to a plurality of files, wherein said graphical user interface enables a user to instruct said host computer to encrypt said first file without encrypting said second file, and wherein said host computer in response to receiving a user instruction to encrypt said first file without encrypting said second file, builds a data package including file data of said first file in encrypted form and file data of said second file in unencrypted form, the host computer also having a bar code button and being configured so that when said bar code button is actuated, said host computer encodes said data package into one or more decodable bar code symbols; (b) a hand held data collection terminal having a bar code reader device, said hand held data collection terminal being configured to decode said at least one bar code symbol encoded by said host computer to recover said data package, said hand held data collection terminal further being configured to process said data package recovered when said one or more bar code symbols are decoded. There is also described (J2) The system of claim J1, wherein said hand held data collection terminal is configured so that when processing data indicating that said first file is encrypted prompts a user to enter password data into said data collection terminal, and is further configured so that when data collection terminal processes data indicating that said second file is unencrypted avoids prompting a user to enter password information into said data collection terminal. There is also described (J3) The system of claim J1, wherein said encrypted first file is packaged in said package in an order after said unencrypted second file.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. A data collection system comprising:
at least one portable data collection terminal; and
a computer spaced apart from said hand held portable data collection terminal, said computer comprising an encoder, said computer being configured to display a graphical user interface (GUI) prompting an operator of said data collection system to enter configuration data for reconfiguring said portable data collection terminal, said computer further being configured to build a data package based on configuration data entered by said operator via said GUI;
wherein said computer is configured to encode said data package into a tag by transferring an encoding command to said encoder; and
wherein said at least one portable data collection terminal is configured, responsive to reading said tag, to reconfigure one or more of: a device of said portable data collection terminal, a subsystem of said portable data collection terminal, an application executed by said portable data collection terminal, a peripheral device detachably attached to said portable data collection terminal.

2. The data collection system of claim 1, wherein said data package includes a configuration file provided by an extensible markup language (XML) document.

3. The data collection system of claim 1, wherein said data package includes a configuration file provided by an extensible markup language (XML) document comprising desired parameter settings for said at least one portable data collection terminal.

4. The data collection system of claim 1, wherein said at least one portable data collection terminal is configured to operate in one of: continuous read mode, active read mode.

5. The data collection system of claim 1, wherein said data package includes at least one of: file data corresponding to one or more files, command data, encryption selection data, compression selection data, and action indicators.

6. The data collection system of claim 1, wherein said data package includes an XML document and file data corresponding to a file having a type other than XML.

7. The data collection system of claim 1, wherein said at least one portable data collection terminal is configured, responsive to reading said tag, to reconfigure one of: a device of said portable data collection terminal, a subsystem of said portable data collection terminal, by de-packaging said data package to extract a configuration file including at least one parameter setting and performing one of: (i) passing said at least one parameter setting to a hardware component associated with said device without modifying a program running said device; (ii) passing said at least one parameter setting to a program controlling operation of said device; (iii) passing said at least one parameter setting to a file that is accessed by a program running said device; (iv) passing said at least one parameter setting to a memory location other than a file memory location that is accessed by a program running said device; and (v) retaining said configuration file in such manner that said at least one parameter setting is accessed by a program running said device.

8. The data collection system of claim 1, comprising a physical communication link between said computer and said portable data collection terminal provided by a USB, Ethernet, 802.11 interface, and/or IrDA.

9. The data collection system of claim 1, wherein said portable data collection terminal comprises a radio communication interface provided by an IEEE 802.11 radio transceiver device, a Bluetooth radio transceiver device, a WIMAX radio transceiver device, and/or a cellular radio transceiver device.

10. The data collection system of claim 1, wherein:
said computer is communicatively coupled to said portable data collection terminal over a network; and
said computer is configured to transfer the encoding command to said portable data collection terminal utilizing a data communication protocol supported by said network.

11. The data collection system of claim 10, wherein said network is provided by an IP network.

12. The data collection system of claim 10, wherein said network is provided by a wired network and/or a wireless network.

13. The data collection system of claim 10, wherein said data communication protocol is provided by a file transport protocol (FTP).

14. A data collection system comprising:
a portable data collection terminal having a radio transceiver device for reading and/or writing encoded information; and
a computer spaced apart from the portable data collection terminal, the computer being configured to:
display a graphical user interface (GUI) prompting an operator of the data collection system to enter configuration data for reconfiguring the portable data collection terminal;

build a data package based on configuration data entered by the operator via the GUI; and encode the data package into a tag by transferring an encoding command to the portable data collection terminal; and a physical and/or wireless communication link between the computer and the portable data collection terminal;

wherein the data package comprises a configuration file provided by an extensible markup language (XML) document.

15. The data collection system of claim 14, comprising a physical communication link between the computer and the portable data collection terminal provided by a USB, Ethernet, 802.11 interface, and/or IrDA.

16. The data collection system of claim 14, wherein the portable data collection terminal comprises a radio communication interface provided by an IEEE 802.11 radio transceiver device, a Bluetooth radio transceiver device, a WIMAX radio transceiver device, and/or a cellular radio transceiver device.

17. The data collection system of claim 14, wherein:

the computer is communicatively coupled to the portable data collection terminal over a network; and the computer is configured to transfer the encoding command to the portable data collection terminal utilizing a data communication protocol supported by the network.

18. The data collection system of claim 17, wherein the network is provided by a wired network and/or a wireless network.

19. The data collection system of claim 14, wherein the data package comprises a configuration file provided by an extensible markup language (XML) document comprising desired parameter settings for the portable data collection terminal.

20. The data collection system of claim 14, wherein the data package comprises file data corresponding to one or more files, command data, encryption selection data, compression selection data, and/or action indicators.

* * * * *